(12) United States Patent
Ciuperca

(10) Patent No.: US 8,545,749 B2
(45) Date of Patent: *Oct. 1, 2013

(54) CONCRETE MIX COMPOSITION, MORTAR MIX COMPOSITION AND METHOD OF MAKING AND CURING CONCRETE OR MORTAR AND CONCRETE OR MORTAR OBJECTS AND STRUCTURES

(71) Applicant: Romeo Ilarian Ciuperca, Norcross, GA (US)

(72) Inventor: Romeo Ilarian Ciuperca, Norcross, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/626,540

(22) Filed: Sep. 25, 2012

(65) Prior Publication Data

US 2013/0119576 A1    May 16, 2013

Related U.S. Application Data

(60) Provisional application No. 61/558,467, filed on Nov. 11, 2011.

(51) Int. Cl.
*B28B 1/14* (2006.01)
*C04B 7/19* (2006.01)

(52) U.S. Cl.
USPC ............ 264/333; 264/299; 264/327; 106/707; 106/709; 106/714; 106/738

(58) Field of Classification Search
None
See application file for complete search history.

(56) References Cited

U.S. PATENT DOCUMENTS

| | | |
|---|---|---|
| 2,057,732 A | 10/1936 | Navarre |
| 3,260,495 A | 7/1966 | Buyken |
| 3,596,351 A | 8/1971 | Tilton et al. |
| 3,649,725 A | 3/1972 | Olson |
| 3,985,329 A | 10/1976 | Liedgens |
| 3,996,713 A | 12/1976 | Haeussler |
| 4,157,638 A | 6/1979 | Della-Donna |
| 4,283,896 A | 8/1981 | Fricker et al. |
| 4,349,398 A | 9/1982 | Kearns et al. |
| 4,370,840 A | 2/1983 | Bisbee et al. |
| 4,426,061 A | 1/1984 | Taggart |

(Continued)

FOREIGN PATENT DOCUMENTS

| | | |
|---|---|---|
| DE | 20205592 | 8/2002 |
| EP | 2065530 A2 | 3/2009 |

(Continued)

OTHER PUBLICATIONS

Office Action dated Jan. 4, 2013, U.S. Appl. No. 12/753,220, filed Apr. 2, 2010.

(Continued)

*Primary Examiner* — Benjamin Schiffman
(74) *Attorney, Agent, or Firm* — Robert E. Richards

(57) ABSTRACT

The invention comprises a method of making a cement-based object or structure having a compressive strength greater than about 1,000 psi. The method comprises placing a cement-based material in an insulated concrete form, wherein the insulated concrete form has an R-value of at least 1.5, wherein the cement-based material comprises approximately 10% to approximately 80% by weight portland cement, and at least one of approximately 10% to approximately 90% by weight slag cement and approximately 5% to approximately 80% by weight fly ash. The invention also comprises a method of making a cement-based object or structure. The invention further comprises objects or structures made by the foregoing methods.

30 Claims, 27 Drawing Sheets

(56) References Cited

U.S. PATENT DOCUMENTS

| | | |
|---|---|---|
| 4,489,121 A | 12/1984 | Luckanuck |
| 4,628,653 A | 12/1986 | Nash |
| 4,744,849 A | 5/1988 | Michaud-Soret |
| 4,765,109 A | 8/1988 | Boeshart |
| 4,829,733 A | 5/1989 | Long |
| 4,885,888 A | 12/1989 | Young |
| 4,889,310 A | 12/1989 | Boeshart |
| 4,907,386 A | 3/1990 | Ekroth |
| 4,974,381 A | 12/1990 | Marks |
| 5,095,674 A | 3/1992 | Huettemann |
| 5,107,648 A | 4/1992 | Roby |
| 5,171,118 A | 12/1992 | Rothenbuhler |
| 5,217,339 A | 6/1993 | O'Connor et al. |
| 5,323,578 A | 6/1994 | Chagnon et al. |
| D357,855 S | 5/1995 | Keith et al. |
| 5,440,845 A | 8/1995 | Tadros et al. |
| 5,497,592 A | 3/1996 | Boeshart |
| 5,549,956 A | 8/1996 | Handwerker |
| 5,570,550 A | 11/1996 | Roby |
| 5,595,171 A | 1/1997 | Makin |
| 5,606,832 A | 3/1997 | Keith et al. |
| 5,611,182 A | 3/1997 | Spude |
| 5,624,491 A | 4/1997 | Liskowitz et al. |
| 5,707,179 A | 1/1998 | Bruckelmyer |
| 5,765,318 A | 6/1998 | Michelsen |
| 5,780,367 A | 7/1998 | Handwerker |
| 5,809,723 A | 9/1998 | Keith et al. |
| 5,809,725 A | 9/1998 | Cretti |
| 5,809,726 A | 9/1998 | Spude |
| 5,809,728 A | 9/1998 | Tremelling |
| 5,819,489 A * | 10/1998 | McKinney ............. 52/435 |
| 5,852,907 A | 12/1998 | Tobin et al. |
| 5,855,978 A | 1/1999 | Handwerker |
| 5,874,150 A | 2/1999 | Handwerker |
| 5,992,114 A | 11/1999 | Zelinsky et al. |
| 5,996,297 A | 12/1999 | Keith et al. |
| 6,026,620 A | 2/2000 | Spude |
| 6,079,176 A | 6/2000 | Westra et al. |
| 6,088,985 A | 7/2000 | Clark |
| 6,134,861 A | 10/2000 | Spude |
| 6,138,981 A | 10/2000 | Keith et al. |
| 6,230,462 B1 | 5/2001 | Beliveau |
| 6,234,736 B1 | 5/2001 | Miescher |
| 6,263,638 B1 | 7/2001 | Long, Sr. |
| 6,272,805 B1 | 8/2001 | Ritter et al. |
| 6,276,104 B1 | 8/2001 | Long, Sr. et al. |
| 6,279,285 B1 | 8/2001 | Kubica |
| 6,293,067 B1 | 9/2001 | Meendering |
| 6,314,694 B1 | 11/2001 | Cooper et al. |
| 6,318,040 B1 | 11/2001 | Moore, Jr. |
| 6,336,301 B1 | 1/2002 | Moore, Jr. |
| 6,360,505 B1 | 3/2002 | Johns |
| 6,412,245 B1 | 7/2002 | Lane et al. |
| 6,426,029 B1 | 7/2002 | Hiscock et al. |
| 6,609,340 B2 | 8/2003 | Moore, Jr. et al. |
| 6,612,083 B1 | 9/2003 | Richards |
| 6,647,686 B2 | 11/2003 | Dunn et al. |
| 6,688,066 B1 | 2/2004 | Cottier et al. |
| 6,705,055 B2 | 3/2004 | Ritter et al. |
| 6,711,862 B1 | 3/2004 | Long |
| 6,725,616 B1 | 4/2004 | Pease |
| 6,761,007 B2 | 7/2004 | Lancelot, III et al. |
| 6,817,150 B1 | 11/2004 | Boeshart |
| 6,818,058 B2 | 11/2004 | Ronin |
| 6,898,908 B2 | 5/2005 | Messenger et al. |
| 6,898,912 B2 | 5/2005 | Bravinski |
| 6,915,613 B2 | 7/2005 | Wostal et al. |
| 6,935,081 B2 | 8/2005 | Dunn et al. |
| 6,945,506 B2 | 9/2005 | Long, Sr. |
| 6,948,289 B2 | 9/2005 | Bravinski |
| 7,000,359 B2 | 2/2006 | Meyer |
| 7,124,547 B2 | 10/2006 | Bravinski |
| 7,183,524 B2 | 2/2007 | Naylor et al. |
| 7,206,726 B2 | 4/2007 | Seeber et al. |
| 7,230,213 B2 | 6/2007 | Naylor |
| 7,368,150 B2 * | 5/2008 | Pritchett ............. 427/412 |
| 7,409,800 B2 | 8/2008 | Budge |
| 7,491,268 B2 | 2/2009 | Hoffis |
| 7,625,827 B2 | 12/2009 | Egan et al. |
| 7,765,761 B2 | 8/2010 | Paradis |
| 7,818,935 B2 | 10/2010 | Velickovic |
| 2002/0014048 A1 | 2/2002 | Meendering |
| 2002/0017070 A1 | 2/2002 | Batch |
| 2002/0092253 A1 | 7/2002 | Beliveau |
| 2003/0115831 A1 | 6/2003 | Long, Sr. |
| 2004/0020147 A1 | 2/2004 | Martella et al. |
| 2005/0102968 A1 | 5/2005 | Long, Sr. et al. |
| 2005/0108985 A1 | 5/2005 | Bravinski |
| 2005/0255284 A1 * | 11/2005 | Pritchett ............. 428/74 |
| 2006/0080923 A1 | 4/2006 | Fleischhacker |
| 2007/0062143 A1 | 3/2007 | Noushad |
| 2007/0094974 A1 | 5/2007 | Velickovic |
| 2007/0095255 A1 | 5/2007 | Abbate et al. |
| 2008/0221815 A1 | 9/2008 | Trost et al. |
| 2008/0313991 A1 | 12/2008 | Chouinard |
| 2009/0000241 A1 | 1/2009 | Long, Sr. |
| 2009/0202307 A1 | 8/2009 | Au et al. |
| 2009/0218474 A1 | 9/2009 | Bowman |
| 2009/0229214 A1 | 9/2009 | Nelson |
| 2010/0212552 A1 | 8/2010 | Stratton et al. |
| 2010/0232877 A1 | 9/2010 | Sanvik et al. |
| 2010/0255277 A1 | 10/2010 | Platt et al. |
| 2010/0319295 A1 | 12/2010 | Nelson |
| 2011/0057090 A1 | 3/2011 | Spude et al. |
| 2011/0061329 A1 | 3/2011 | Tadros et al. |
| 2012/0058299 A1 | 3/2012 | Serwin |

FOREIGN PATENT DOCUMENTS

| | | |
|---|---|---|
| JP | 7-224478 | 8/1995 |
| JP | 7224478 | 8/1995 |
| JP | 10-46716 | 2/1998 |
| JP | 10046716 | 2/1998 |
| JP | 11-256734 | 9/1999 |
| JP | 11256734 | 9/1999 |
| JP | 11-350732 | 12/1999 |
| JP | 11350732 | 12/1999 |
| JP | 2000-240214 | 9/2000 |
| JP | 2002128559 | 5/2002 |
| WO | 9512042 | 8/1995 |
| WO | 9735071 | 9/1997 |
| WO | 99/18302 | 4/1999 |
| WO | 9918302 A1 | 4/1999 |
| WO | 9953154 | 10/1999 |
| WO | 2005113228 A2 | 12/2005 |
| WO | 2009072795 A2 | 6/2009 |

OTHER PUBLICATIONS

Reward Wall Systems—iForm Installation Procedures (Mar. 2011).
Transform Manual (Mar. 12, 2011).
PCT/US/2011/030512 ISR and Written Opinion, Jan. 2, 2012.
Tilt-Up Concrete Structures, Reported by ACI Committee 551 (1997, 2003).
Concrete & Masonry, Power Blanket (2009-2012).
Insulation Solutions Brochure, Space Age Reflective Insulation.
Insul-Tarp Specification Information (Oct. 2009).
Powerblanket, Cold Weather Got You Stuck.
Portland Cement Association, Supplementary Cementing Materials for Use in Blended Cements (1996).
Mehta, High-Performance, High-Volume Fly Ash Concrete for Sustainable Development.
Fly Ash for Insulating Concrete Form Construction (Mar. 2005).
Slag Cement Association, Collection of Articles (2002, 2003).
Wikipedia, Autoclaved aerated concrete.
International Search Report and Written Opinion dated Dec. 27, 2012, PCT/US12/57103 filed Sep. 25, 2012 corresponding to U.S. Appl. No. 13/626,540, filed Sep. 25, 2012.
International Search Report and Written Opinion dated Dec. 17, 2012, PCT/US2012/056811 corresponding to U.S. Appl. No. 13/247,133, filed Sep. 28, 2011.
PCT International Search Report and Written Opinion, dated Dec. 3, 2012 in PCT/US2012/056811, filed Sep. 24, 2012, which claims priority to U.S. Appl. No. 13/247,133, filed Sep. 28, 2011.

Response to Office Action dated Mar. 25, 2013, U.S. Appl. No. 12/753,220, filed Apr. 4, 2010.
Response to Office Action dated Jan. 28, 2013, U.S. Appl. No. 13/626,087, filed Sep. 25, 2012.
Response to Office Action dated Mar. 7, 2013, U.S. Appl. No. 13/626,622, filed Sep. 25, 2012.
Notice of Allowance mailed May 9, 2013, U.S. Appl. No. 13/626,075, filed Sep. 25, 2012.
Aso, http://www.aso-cement.jp/en/products/product_ordinary.html, Apr. 2012.
Aso, http://www.aso-cement.jp/en/products/product_blast.html, Apr. 2012.
Palmer, et al., Separation of Fly Ash Using Density Gradient Centrifugation, 1995, Coal Science, vol. 2, pp. 1999-2.
Office Action dated Jan. 28, 2013, U.S. Appl. No. 13/626,087, filed Sep. 25, 2012.
Response to Office Action filed Jan. 30, 2013 in U.S. Appl. No. 12/753,220, filed Apr. 4, 2010.
Office Action dated Mar. 25, 2013, U.S. Appl. No. 12/753,220, filed Apr. 2, 2010.
Response to Office Action dated Dec. 27, 2013, U.S. Appl. No. 13/626,075, filed Sep. 25, 2012.
Office Action dated May 14, 2013, U.S. Appl. No. 13/626,103, filed Sep. 25, 2012.
Office Action dated Mar. 7, 2013, U.S. Appl. No. 13/626,622, filed Sep. 25, 2012.
Response to Office Action dated Feb. 14, 2013, U.S. Appl. No. 13/247,256, filed Sep. 28, 2011.
Office Action dated Feb. 14, 2014, U.S. Appl. No. 13/247,256, filed Sep. 28, 2011.
Curing Concrete, Design and Control of Concrete Mixtures, Feb. 1, 2002.
Romeo Ilarian Ciuperca, U.S. Appl. No. 12/753,220, filed Apr. 2, 2010.
Office Action dated Aug. 21, 2012; U.S. Appl. No. 12/753,220, filed Apr. 2, 2010.
Second Preliminary Amendment and Response to Office Action dated Oct. 21, 2012, U.S. Appl. No. 12/753,220, filed Apr. 2, 2010.
Office Action dated Aug. 21, 2012; U.S. Appl. No. 13/247,133, filed Sep. 28, 2011.
Romeo Ilarian Ciuperca, U.S. Appl. No. 13/247,256, filed Sep. 28, 2011.
Office Action dated Nov. 9, 2012, U.S. Appl. No. 13/247,256, filed Sep. 28, 2011.
Amendment and Response to Office Action dated Dec. 4, 2012, U.S. Appl. No. 13/247,256, filed Sep. 28, 2011.
Romeo Ilarian Ciuperca, U.S. Appl. No. 13/626,075, filed Sep. 25, 2012.
Romeo Ilarian Ciuperca, U.S. Appl. No. 13/626,087, filed Sep. 25, 2012.
Romeo Ilarian Ciuperca, U.S. Appl. No. 13/626,103, filed Sep. 25, 2012.
Romeo Ilarian Ciuperca, U.S. Appl. No. 13/626,622, filed Sep. 25, 2012.
Office Action dated Dec. 28, 2012, U.S. Appl. No. 13/626,103, filed Sep. 25, 2012.
Office Action dated Dec. 27, 2012, U.S. Appl. No. 13/626,075, filed Sep. 25, 2012.

* cited by examiner

CONCRETE MIX COMPOSITION, MORTAR MIX COMPOSITION AND METHOD OF MAKING AND CURING CONCRETE OR MORTAR AND CONCRETE OR MORTAR OBJECTS AND STRUCTURES

CROSS-REFERENCE TO RELATED APPLICATIONS

The present application claims the benefit of the filing date of U.S. provisional patent application Ser. No. 61/558,467 filed Nov. 11, 2011.

FIELD OF THE INVENTION

The present invention generally relates to cement-based materials. The present invention also relates to curing concrete to accelerated concrete maturity or equivalent age of concrete to achieve improved physical properties. More particularly, this invention relates to a method of casting and curing a concrete or mortar composition that includes a relatively low percentage of portland cement by mass, by accelerating maturity or equivalent age of concrete, which produces a concrete of similar or greater strength than conventional concrete. The present invention also relates to a method of casting and curing a concrete or mortar composition that includes a relatively high percentage of recycled material by mass, by accelerating maturity or equivalent age of concrete, which produces a concrete of similar or greater strength than conventional concrete. The present invention also relates to a method of casting and curing a concrete composition that includes a relatively low percentage of portland cement and a relatively high percentage of recycled supplementary cementitious material, by accelerating maturity or equivalent age of concrete, yet has similar or greater strength than conventional concrete. The present invention also relates to concrete mixes in accordance with the present invention and to concrete objects or structures made by the present invention.

BACKGROUND OF THE INVENTION

Concrete is a composite material consisting of a mineral-based hydraulic binder which acts to adhere mineral particulates together in a solid mass; those particulates may consist of coarse aggregate (rock or gravel), fine aggregate (natural sand or crushed fines), and/or unhydrated or unreacted cement. Concrete dates back at least to Roman times. The invention of concrete allowed the Romans to construct building designs, such as arches, vaults and domes, which would not have been possible without the use of concrete. Roman concrete, or opus caementicium, was made from a hydraulic mortar and aggregate or pumice. The hydraulic mortar was made from quicklime, gypsum or pozzolana and combinations thereof. Quicklime, also known as burnt lime, is calcium oxide; gypsum is calcium sulfate dihydrate and pozzolana is a fine, sandy volcanic ash (with properties that were first discovered in Pozzuoli, Italy). By using concrete, the Romans were able to build arches, vaults and other structures that were not possible to build before. However the concrete made with volcanic ash as the pozzolanic agent was slow to set and gain strength. Most likely the concrete was build up in multiple layers on forms that had to stay in place for a very long time. Although the concrete was slow to set and gain strength, over along periods of time it achieved great strength and was extremely durable. There are still Roman concrete structures standing today as a testimony to the quality of the concrete produced over 2000 years ago.

Due to the slow setting and great length of time that it took for the early concrete to gain strength and forms to be removed, it never gained broad acceptance. In fact, it appears that it ceased to be used after the fall of the Roman Empire. Stone and clay brick masonry became the preferred method of construction for most of human history.

In the late 1700's different types of Roman Cements were patented and in 1824 Joseph Aspin filed a patent for the method of making what is known as portland cement. The new manufactured cement resulted in faster hardening cement with a higher compressive strength. During the 19th century there were many improvements made to the process of manufacture of portland cement. The concrete made with the portland cement allowed the concrete to set fast and to gain strength sufficient to support itself in a short amount of time. Therefore, the concrete forms could be removed quickly and construction schedules could be shortened.

Modern concrete is composed of one or more: hydraulic cements, coarse aggregates, fine aggregates and of course water. Optionally, modern concrete can include other supplementary cementitious materials, inert fillers, property modifying chemical admixtures and coloring agents. The hydraulic cement is typically portland cement. Other cementitious materials include fly ash, slag cement and other natural pozzolanic materials. Mortars are also made from cementitious material, aggregate, water and optionally lime.

Portland cement is the most commonly used hydraulic cement in use around the world today. Portland cement is typically made from limestone, as well as clay, sand, or shale, among other raw materials. The raw materials for portland cement production are proportioned to obtain a desired mixture of minerals containing calcium oxide, silicon oxide, aluminum oxide, ferric oxide, and magnesium oxide. The raw materials are first crushed and ground to form a fine powder. The powder is then heated in a kiln to a peak temperature of 1,400-1,500° C., which results in sintering the powder which produces lumps or nodules referred to as clinkers. The heating process, among other things, drives off relatively large amounts of carbon dioxide. The production of one ton of portland cement releases one ton of carbon dioxide ($CO_2$) into the atmosphere, accounting for 5 to 7 percent or more of the world's annual carbon dioxide emissions. The portland cement clinker is then ground to a fine powder with the addition of a small amount of calcium sulfate, usually derived from gypsum or anhydrite, as well as limestone powder in some cases. The finished powder is referred to as portland cement. Concrete or mortar made with portland cement sets relatively quickly and gains high compressive strength in a relatively short amount of time. Although great improvements have been made to the processes and efficiencies of portland cement manufacture, it is still a very expensive and highly polluting industrial process.

Fly ash is a by-product of the combustion of pulverized coal in electric power generation plants. When the pulverized coal is ignited in the combustion chamber, much of the carbon and volatile materials are burned off. However, some of the mineral impurities of clay, shale, feldspars, etc., are fused in suspension and carried out of the combustion chamber in the exhaust gases. As the exhaust gases cool, the fused materials solidify into spherical glassy particles called fly ash. When mixed with lime and water fly ash may form compounds similar to those formed from hydration of portland cement. Two classifications of fly ash are described in ASTM C 618, based upon composition, with their composition known to be related to the type of coal burned. Class F fly ash is normally produced from burning anthracite or bituminous coal that meets the applicable requirements. This Class of fly ash has pozzolanic properties and will have a minimum silicon dioxide plus aluminum oxide plus iron oxide of 70%. Class C fly ash is normally produced from subbituminous coal that meets the applicable requirements. This Class of fly ash, in addition to having pozzolanic properties, also has some cementitious properties and will have a minimum silicon dioxide plus aluminum oxide plus iron oxide content of 50%. Class C fly ash is used at dosages of 15% to 40% by mass of the cementitious materials in concrete, with the balance being portland cement. Class F fly ash is generally used at dosages of 15% to 40%, with the balance being portland cement. Use of fly ash in concrete in the U.S. is governed largely by ASTM Standard C 618. This standard prohibits the use of fly ash with too much residual carbon, which indicates that the coal was not burned thoroughly enough. Residual carbon impedes air entrainment and reduces the concrete's freeze-thaw resistance and may affect other properties as well. It is generally accepted that fly ash creates concrete with a higher compressive strength, but that this happens slowly over a longer period of time than concrete without fly ash. Fly ash-containing concretes also have to be managed differently as they cure, because they tend to cure and gain strength more slowly than mixes with more or a greater fraction of portland cement. Due to the slow compressive strength gain, concrete forms have to stay in place for many more days and perhaps weeks compared to concrete made with portland cement. Depending on the weather and ambient temperature, fly ash may not gain much strength at all in cold climates or in winter.

In the past, fly ash produced from coal combustion was simply entrained in flue gases and dispersed into the atmosphere. This created environmental and health concerns that prompted laws which have reduced fly ash emissions to less than 1 percent of ash production. Worldwide, more than 65% of fly ash produced from coal power stations is disposed of in landfills and ash ponds.

The recycling of fly ash has become an increasing concern in recent years due to increasing landfill costs and current interest in sustainable development. As of 2005, U.S. coal-fired power plants reported producing 71.1 million tons of fly ash, of which 29.1 million tons were reused in various applications. If the nearly 42 million tons of unused fly ash had been recycled, it would have reduced the need for approximately 27,500 acre·ft (33,900,000 m$^3$) of landfill space. Other environmental benefits to recycling fly ash include reducing the demand for virgin materials that would need quarrying and substituting for materials that may be energy-intensive to create, such as portland cement.

As of 2006, about 125 million tons of coal-combustion byproducts, including fly ash, were produced in the U.S. each year, with about 43 percent of that amount used in commercial applications, according to the American Coal Ash Association. As of early 2008, the United States Environmental Protection Agency hoped that figure would increase to 50 percent as of 2011. More recently, there has been reduced interest in reusing fly ash. Of course, it is obvious that the more fly ash can be recycled, the better for the environment. Incorporation into concrete is one of the best way to utilize fly ash since once the concrete hardens the fly ash is encapsulated in the concrete and cannot leach out or escape into the environment. Furthermore, since there is such a large oversupply of fly ash, generally the cost is relatively low.

Fly ash can be used in concrete in two different ways: as a partial replacement for hydraulic cement or as filler. The first use takes advantage of the pozzolanic properties of fly ash, which, when it reacts with lime or calcium hydroxide, can enhance the strength of cementitious composites. However, fly ash is relatively inert and the increase in compressive strength can take up to 60 to 90 days or longer to materialize. Also, since fly ash is just a by-product from the power industry, the variable properties of fly ash have always been a major concern to the end users in the concrete industry, as variations in concrete properties at early and late ages may result.

The incorporation of fly ash in concrete improves workability and thereby reduces the water requirement with respect to conventional concrete. This is most beneficial where concrete is pumped into place. Among numerous other effects are reduced bleeding, reduced segregation, reduced permeability, increased plasticity, lowered heat of hydration, and increased setting times (ACI Committee 226, 1987, supra). Also, the slump is higher when fly ash is used (Ukita et al., 1989, SP-114, American Concrete Institute, Detroit, pp. 219-240). Comprehensive research demonstrated that high volume fly ash concretes showed higher long-term strength development, lower water and gas permeability, and higher chloride ion resistance in comparison with portland cement concretes without fly ash. See U.S. Pat. No. 6,818,058.

However, the prior art recognizes that the use of fly ash in concrete has many drawbacks. For example, the addition of fly ash to concrete results in a product with low air entrainment and low early strength development. As noted above, a critical drawback of the use of fly ash in concrete is that initially the fly ash significantly reduces the compressive strength of the concrete. Tests conducted by Ravindrarajah and Tam (1989, Fly Ash, Silica Fume, Slag, and Natural Pozzolans in Concrete, SP-114, American Concrete Institute, Detroit, pp. 139-155) showed that the compressive strength of fly ash concrete at early ages are lower than those for the control concrete. Most of the reported studies tend to show a lower concrete strength due to the presence of fly ash when used as a partial replacement for portland cement; none has yet suggested a solution to actually enhance the property of concrete economically when using fly ash. Yet, for fly ash to be used as a partial replacement for cement, it must be comparable to cement in terms of strength contribution at a point useful in construction. As a practical matter, this means that the fly ash concrete must reach an acceptable compressive strength within days to be comparable to conventional or ordinary portland cement mixes.

Other widely used pozzolans are slag cement (also known as ground granulated blast furnace slag or GGBFS) and silica fume. Blast furnace slag is the non-metallic by-product of iron or steel production, generally consisting of silicon, calcium, aluminum, magnesium and oxygen. When iron is manufactured using a blast furnace, two products collect in the hearth—molten iron and slag. The slag floats to the top of the iron. The slag is skimmed off and fed to a granulator. In the granulator the molten slag is rapidly quenched with water. The resulting granules are essentially glassy, non-metallic silicates and aluminosilicates of calcium. The glass content of the slag generally determines its cementitious character or suitability for use in hydraulic cement. Generally, the higher the glass content the greater the cementitious properties of the slag. See U.S. Pat. No. 7,491,268. Ground slag suitable for use as hydraulic cement is described in ASTM C 989. For each metric ton of pig iron produced, there is approximately ⅓ of a metric ton of slag produced. In 2009 worldwide pig iron production was 1.211 billion tons. There was an estimated 400 million tons of slag produced. If slag is not granulated by quenching with water or steam and allowed to cool naturally, then it becomes an amorphous type aggregate. Aggregate made from slag is used for roadbeds and other filler application, but relatively little is used for the manufacture of slag cement due to relatively low demand for this waste material. In the past, amorphous slag was piled up close to steel plants creating a so called "brown fields." Unfortunately, around the Great Lakes slag was even disposed of by dumping in the bottom of lakes. More recently, the U.S. has spent large sums of money to clean up these brown fields. Unfortunately, around the world relatively large amounts of amorphous slag sit in landfills close to iron furnace plants.

Concrete made with slag cement will have higher compressive and flexural strength growth over the lifetime of the concrete compared with conventional or ordinary portland cement concrete mixes. Slag cement improves the tensile strength capacity of concrete. Although when combined with relatively large amounts of portland cement slag cement sets faster than the fly ash, it is still slow to set and to gain strength when compared to conventional portland cement concrete. Hence, there is relatively low demand for the use of slag cement in concrete or mortar mixes. Therefore depending on the application, only a relatively small percentage of the portland cement is replaced with slag cement in concrete or mortar.

When water is added to hydraulic cement, a sequence of chemical reactions known collectively as "hydration" takes place. Hydration is an exothermic reaction, which means that the reaction produces heat. Thus, when concrete is initially mixed, it heats up due to a sequence of chemical reactions. But, in a relatively short amount of time, the heat produced decreases rapidly. The hydration reaction is temperature dependent. Therefore, the more heat, (i.e., higher ambient and/or concrete temperature), the faster the reaction; the less heat (i.e., colder), the slower the reaction. Thus, to cure concrete properly, two elements are necessary, appropriate temperature and availability of moisture. There is a direct relationship between the concrete temperature and the strength of the concrete in a given amount of time.

Maturity of concrete is measured as "equivalent age" and is given in temperature degrees×hours (either ° C.-Hrs or ° F.-Hrs). Maturity of concrete has became a useful tool in predicting the strength of concrete, particularly at ages earlier than 28 days and is related to the time and curing conditions, especially temperature. In this way, the maturity concept is also related to the rate of hydration and the rate of strength gain for a particular mix design.

Concrete slabs, walls, columns, various types of precast panels, precast structures, concrete pavers, artificial stone and other concrete structures, traditionally have been made by building a form. The forms are usually made from plywood, wood, metal and other structural members. Unhardened (i.e., plastic) concrete is poured into the space defined by opposed spaced form members or laying flat supported on the ground. Once the concrete develops sufficiently strength, the forms are removed leaving a concrete slab, walls, columns, precast panels and structures, pavers, artificial stone or other concrete structure or structural member; however, the concrete at this point is usually not completely cured. The unprotected concrete wall is then exposed to the elements during the remainder of the curing process. Since concrete is exposed to ambient temperatures, the initial heat of hydration is lost rather quickly to the surroundings, generally overnight. From that point on the concrete internal temperature follows very closely the ambient temperature. The exposure of the concrete to the elements, especially temperature variations, makes the curing of concrete, and the ultimate strength it can achieve, as unpredictable as the weather.

There is a disconnect between the type of forms in which concrete is cast and the curing to which it is subjected and the desired rate of rapid strength gain. Conventional concrete forms are designed to withstand a certain amount of pressure with the proper safety factor and be economical and easy to use. They seem to only serve the purpose of holding the plastic concrete mix in the desired form until it has generally hardened to around 2000 psi so that the forms can be stripped and reused. Since concrete forms are relatively expensive, concrete mixes are designed to set fast and achieve the necessary compressive strength to allow the forms to be stripped in approximately 1 to 3 days. Concrete curing, strength gain and internal concrete temperature have never been a concern for the concrete form manufacturers. Due to these constraints, and particularly the slow rate of strength gain of concrete or mortar made with fly ash or slag cement, the use of fly ash or slag cement in concrete has generally been limited to 20-30% of the cementitious material, with the balance being portland cement.

Concrete cures over a relatively long period of time. If it is desired for the concrete to cure more quickly or to have higher earlier strength, additives such as chemical accelerating admixtures can be added to the concrete mix. However, such additives are relatively expensive which significantly increases the cost of the concrete. If stronger concrete is required, the fraction of portland cement in the concrete is typically increased. However, portland cement is a major contributor to greenhouse gasses and is highly energy intensive to produce. Thus, portland cement and traditional concrete mixes are not very environmentally friendly.

Insulated concrete form systems are known in the prior art and typically are made from a plurality of modular form members. U.S. Pat. Nos. 5,497,592; 5,809,725; 6,668,503; 6,898,912 and 7,124,547 (the disclosures of which are all incorporated herein by reference) are exemplary of prior art modular insulated concrete form systems. Applicant's co-pending applications disclose insulated concrete form systems. See U.S. patent application Ser. Nos. 12/753,220 filed Apr. 2, 2010; 13/247,133 filed Sep. 28, 2011 and 13/247,256 filed Sep. 28, 2011 (the disclosures of which are both incorporated herein by reference in their entirety).

It is critically important in construction to have concrete or mortar that predictably achieves required performance characteristics; e.g., a minimum compressive strength within 1 to 3 days, to permit the forms to be stripped, and 7 to 14 days to place loads on the structure. Portland cement concrete achieves approximately 90%-95% of the ultimate compressive strength in the first 28 days. Therefore most concrete specifications are based on a 28-day strength. A corollary is that a construction or civil engineer must be able to predict the compressive strength of a concrete or mortar mixture after a given period of time. However, the prior art concrete or mortar mixtures that contain fly ash or slag cement lack predictability with respect to rate of compressive strength development and ultimate compressive strength, and generally have much lower early compressive strength than concrete or mortar mixtures that lack fly ash or slag cement. Therefore, there has been a disincentive to use fly ash or slag cement in such hardenable mixtures.

As previously noted, concrete quality is most commonly assessed based upon its 28-day strength, as measured through standard compression testing of concrete. Compression tests may be performed on concrete cast in the field, commonly tested as cylinders in North America, Australia, New Zealand, and France but as cubes elsewhere, including Great Britain and Germany. When cast in the field as cylinders, the concrete is placed in several lifts into a cylindrical mold with length-to-diameter ratio of 2.0, where the minimum cylinder diameter is at least three times the maximum aggregate size. The concrete is well-compacted typically through tamping, rodding, and/or use of vibration. After finishing, the cylinders are cured in a specified manner, often moist cured at 73.5±3.5° F. (23.0±2.0° C.) such as described by ASTM C192. Both of these common practices—the consolidation and curing processes—minimize variability and maximize strength development in concrete cylinders. Testing is also performed according to standard procedures, such as by ASTM C39, most commonly at 28 days but also at earlier and later ages when specified. Compressive strength measured on field-cast cylinders should be viewed as an assessment of the potential quality of the concrete and is not necessarily representative of the strength achieved in the same concrete cast as a structural element in the field. In the field, the compaction and curing conditions can be substantially different from those specified in ASTM C192, resulting in concrete with substantially lower strength than indicated from testing of cast cylinders.

When assessments of the strength or quality of concrete as-cast are of interest, compression testing can be performed on cylindrical concrete samples obtained from field structures. These concrete cores can be obtained by drilling into the hardened concrete with a diamond bit, as described in ASTM C42. Cores may be obtained in varying diameters and lengths, with an objective to obtain a length-to-diameter ratio of 2.0 and to achieve a diameter, which is at least three times the maximum aggregate size. However, it may not always be possible—due to reinforcement congestion, for example—to obtain cores meeting these specifications. As a result, the strength measured on these cores, then, may not reflect the actual strength of the as-cast concrete in the field. Other factors may also influence the strength measured in cores, generally resulting in a decrease in measured strength compared to actual strength. Such factors include the moisture content in the core and the uniformity or lack thereof in the moisture state, the state of stress in the structural element (i.e., in regions of tension, microcracking will decrease measured core strength) from where the core was obtained, the orientation of the core relative to the horizontal plane of placement (i.e., strengths may be lower near the top of a structure, due to bleeding or segregation), and damage induced in the core during cutting, extraction, and preparation (i.e., sawing to length, end grinding) for testing, among other factors. Thus, while core strengths are generally presumed to more accurately reflect the in-place concrete strength than standard-cured cast cylinders, the strength of the cores should not necessarily be presumed to be equivalent to the in-place concrete strength.

Predictions of concrete strength may also be made by applying the maturity concept, previously discussed. ASTM C918 describes how a maturity relationship can be developed for a particular mix design such that the strength can be anticipated based upon curing history, including temperature and age, and early measures of strength. However, it is important to recognize that accurate predictions can only be made if the concrete mix proportions and constituent materials, including type and composition of cementitious materials, aggregates, and any chemical admixtures, are exactly the same as those used to develop the maturity relationship. ASTM C192-07 provides some caution against predictions of strength based upon early age test results and maturity relationships: "Use of the results from this test method to predict specification compliance of strengths at later ages must be applied with caution because strength requirements in existing specifications and codes are not based upon early-age testing." It is clear that the maturity relationship is complex and that predicted strengths should be viewed as only an indicator of in situ concrete strength.

Since both fly ash and slag cement are recycled materials, it would be desirable to produce a concrete composition that could employ relatively high amounts of these recycled materials. It would also be desirable to use reduced amounts of portland cement in concrete mixtures so as to reduce the amount of greenhouse gases that result from its manufacture. The challenge to the concrete industry has been to achieve these desired results without adversely affecting the compressive strength or other desirable properties of the finished concrete. It is believed that prior to the present invention, no one has been able to achieve these results. It would also be desirable to provide a concrete mix and a system for curing concrete that accelerates the maturity or equivalent age of concrete.

SUMMARY OF THE INVENTION

The present invention satisfies the foregoing needs by providing an improved cement-based materials, such as concrete or mortar mix compositions, and an improved method for curing cement-based materials.

In a disclosed embodiment, the present invention comprises a method of making a cement-based object or structure having a compressive strength greater than about 1,000 psi. The method comprises placing a cement-based material in an insulated concrete form wherein the insulated concrete form has insulating properties equivalent to at least approximately 0.5 inch of polystyrene foam or an insulating value of at least R 1.5. The cement-based material comprises cementitious material and aggregate; wherein the cementitious material comprises approximately 10% to approximately 80% by weight portland cement, approximately 20% to approximately 90% by weight slag cement, and 0% to approximately 80% by weight fly ash; and water sufficient to hydrate the cementitious material. In a further disclosed embodiment, the method also comprises allowing the cement-based material to at least partially cure in the insulated concrete form.

In a disclosed embodiment, the present invention comprises a method of making a cement-based object or structure having a compressive strength greater than about 1,000 psi. The method comprises placing a cement-based material in an insulated concrete form wherein the insulated concrete form has insulating properties equivalent to at least approximately 0.5 inch of polystyrene foam or an insulating value of at least R 1.5. The cement-based material comprises cementitious material and aggregate; wherein the cementitious material comprises 10% to approximately 70% by weight portland cement, 10% to approximately 90% by weight slag cement, and 0% to approximately 80% by weight fly ash; and water sufficient to hydrate the cementitious material. In a further disclosed embodiment, the method also comprises allowing the cement-based material to at least partially cure in the insulated concrete form.

In a disclosed embodiment, the present invention comprises a method of making a cement-based object or structure having a compressive strength greater than about 1,000 psi. The method comprises placing a cement-based material in an insulated concrete form wherein the insulated concrete form has insulating properties equivalent to at least approximately 0.5 inch of polystyrene foam or an insulating value of at least R 1.5. The cement-based material comprises cementitious material and aggregate; wherein the cementitious material comprises approximately 10% to approximately 60% by weight portland cement, approximately 10% to approximately 90% by weight slag cement, and 0% to approximately 80% by weight fly ash; and water sufficient to hydrate the hydraulic cement. In a further disclosed embodiment, the method also comprises allowing the cement-based material to at least partially cure in the insulated concrete form.

In another disclosed embodiment, the present invention comprises a method of making a cement-based object or structure having a compressive strength greater than about 1,000 psi. The method comprises placing a cement-based material in an insulated concrete form wherein the insulated concrete form has insulating properties equivalent to at least approximately 0.5 inch of polystyrene foam or an insulating value of at least R 1.5. The cement-based material comprises cementitious material and aggregate; wherein the cementitious material comprises approximately 10% to approximately 50% by weight portland cement, approximately 10% to approximately 90% by weight slag cement, and 0% to approximately 80% by weight fly ash; and water sufficient to hydrate the cementitious material. In a further disclosed embodiment, the method also comprises allowing the cement-based material to at least partially cure in the insulated concrete form.

In another disclosed embodiment, the present invention comprises a method of making a cement-based object or structure having a compressive strength greater than about 1,000 psi. The method comprises placing a cement-based material in an insulated concrete form wherein the insulated concrete form has insulating properties equivalent to at least approximately 0.5 inch of polystyrene foam or an insulating value of at least R 1.5. The concrete mix comprises cementitious material and aggregate; wherein the cementitious material comprises approximately 10% to approximately 40% by weight portland cement, approximately 10% to approximately 90% by weight slag cement, and 0% to approximately 80% by weight fly ash; and water sufficient to hydrate the cementitious material. In a further disclosed embodiment, the method also comprises allowing the cement-based material to at least partially cure in the insulated concrete form.

In another disclosed embodiment, the present invention comprises a method of making a cement-based object or structure having a compressive strength greater than about 1,000 psi. The method comprises placing a cement-based material in an insulated concrete form wherein the insulated concrete form has insulating properties equivalent to at least approximately 0.5 inch of polystyrene foam or an insulating value of at least R 1.5. The concrete mix comprises cementitious material and aggregate; wherein the cementitious material comprises approximately 10% to less than approximately 50% by weight portland cement, approximately 20% to approximately 90% by weight slag cement, and 0% to approximately 80% by weight fly ash; and water sufficient to hydrate the cementitious material. In a further disclosed embodiment, the method also comprises allowing the cement-based material to at least partially cure in the insulated concrete form.

In another disclosed embodiment, the present invention comprises a method of making a cement-based object or structure having a compressive strength greater than about 1,000 psi. The cement-based structure or object comprises an insulated concrete form or mold, wherein the insulated concrete form or mold has insulating properties equivalent to at least approximately 0.5 inch of polystyrene foam or an insulating value of at least R 1.5; and a cement-based material within the insulated concrete form. The cement-based material within the insulated concrete form or mold comprises cementitious material and aggregate; wherein the cementitious material comprises less than 50% by weight portland cement, approximately 10% to approximately 90% by weight slag cement, and approximately 5% to approximately 80% by weight fly ash.

In another disclosed embodiment, the present invention comprises a cement-based object or structure having a compressive strength greater than about 1,000 psi. The cement-based material object or structure comprises an insulated concrete form, wherein the insulated concrete form has insulating properties equivalent to at least approximately 0.5 inch of polystyrene foam or an insulating value of at least R 1.5; and a cement-based material within the insulated concrete form. The cement-based material within the insulated concrete form comprises cementitious material and aggregate; wherein the cementitious material comprises less than 50% by weight portland cement, approximately 20% to approximately 90% by weight slag cement, and approximately 10% to approximately 80% by weight fly ash.

In another disclosed embodiment, the present invention comprises a method of making a cement-based object or structure having a compressive strength greater than about 1,000 psi, the method comprising placing a cement-based material in an insulated concrete form, wherein the insulated concrete form has insulating properties equivalent to at least approximately 0.5 inches of polystyrene foam or an insulating value of at least R 1.5, wherein the cement-based material comprises portland cement, slag cement and fly ash and wherein the weight ratio of portland cement to slag cement to fly ash is approximately 1 to 1 to 1.

In another disclosed embodiment, the present invention comprises a method of making a cement-based object or structure having a compressive strength greater than about 1,000 psi, the method comprising placing a cement-based material in an insulated concrete form, wherein the insulated concrete form has insulating properties equivalent to at least approximately 0.5 inches of polystyrene foam or an insulating value of at least R 1.5, wherein the cement-based material comprises portland cement, slag cement and fly ash and wherein at three to seven days the cement-based material in the insulated concrete form has a compressive strength at least 25% greater than the same cement-based material would have after the same amount of time in a non-insulated concrete form under the same conditions.

In another disclosed embodiment, the present invention comprises a method of making a cement-based object or structure having a compressive strength greater than about 1,000 psi, the method comprising placing a cement-based material in an insulated concrete form, wherein the insulated concrete form has insulating properties equivalent to at least approximately 0.5 inches of polystyrene foam or an insulating value of at least R 1.5, wherein the cement-based material comprises portland cement, slag cement and fly ash and wherein at three to seven days the mortar mix in the insulated concrete form has a compressive strength at least 25% greater than the same mortar mix would have after the same amount of time in a non-insulated concrete form under the same conditions.

In another disclosed embodiment, the present invention comprises a cement-based object or structure having a compressive strength greater than about 1,000 psi. The cement-based object or structure comprises an insulated concrete form, wherein the insulated concrete form has insulating properties equivalent to at least approximately 0.5 inches of polystyrene foam or an insulating value of at least R 1.5; and a cement-based material within the insulated concrete form. The cement-based material within the insulated concrete form comprises cementitious material and aggregate; wherein the cementitious material comprises approximately 10% to approximately 50% by weight portland cement, approximately 20% to approximately 90% by weight slag cement, and 5% to approximately 80% by weight fly ash.

In another disclosed embodiment, the present invention comprises a cement-based object or structure having a compressive strength greater than about 1,000 psi. The concrete-based object or structure comprises an insulated concrete form, wherein the insulated concrete form has insulating properties equivalent to at least approximately 0.5 inch of polystyrene foam or an insulating value of at least R 1.5; and a cement-based material within the insulated concrete form. The cement-based material within the insulated concrete form comprises cementitious material and aggregate; wherein the cementitious material comprises approximately 10% to approximately 90% by weight portland cement; at least one of approximately 10% to approximately 90% by weight slag cement or approximately 5% to approximately 80% by weight fly ash; and water sufficient to hydrate the cementitious material.

In a disclosed embodiment, the present invention comprises a method of making a cement-based object or structure having a compressive strength greater than about 1,000 psi. The method comprises placing a cement-based material in an insulated concrete form wherein the insulated concrete form has insulating properties equivalent to at least approximately 0.5 inch of polystyrene foam or an insulating value of at least R 1.5. The cement-based material comprises cementitious material and aggregate; wherein the cementitious material comprises approximately 10% to approximately 90% by weight portland cement; at least one of approximately 10% to approximately 90% by weight slag cement or approximately 5% to approximately 80% by weight fly ash; and water sufficient to hydrate the cementitious material.

In a disclosed embodiment, the present invention comprises a method of making a cement-based object or structure having a compressive strength greater than about 1,000 psi. The method comprises placing a cement-based material in an insulated concrete form wherein the insulated concrete form has insulating properties equivalent to at least approximately 0.5 inch of polystyrene foam or an insulating value of at least R 1.5. The cement-based material comprises aggregate and cementitious material; wherein the cementitious material comprises approximately 10% to approximately 80% by weight portland cement and the remaining cementitious material comprising one or more supplementary cementitious materials; and water sufficient to hydrate the cementitious material.

Accordingly, it is an object of the present invention to provide an improved concrete mix.

Another object of the present invention is to provide an improved mortar mix.

Another object of the present invention is to provide an improved concrete object or structure.

A further object of the present invention is to provide an improved system for curing concrete.

Another object of the present invention is to provide an improved system for curing mortar.

Another object of the present invention is to produce concrete mixes or mortar mixes by substituting for at least a portion of the portland cement with relatively large amounts of supplementary cementitious materials, such as fly ash, slag cement, rice husk ash, and silica fume, while having strength properties equal to or better than conventional portland cement mixes thereby effectively reducing $CO_2$ emissions.

A further object of the present invention is to provide an accelerated concrete curing system to improve the maturity and equivalent age of concrete, especially concrete formulations that use relatively large amounts of supplementary cementitious materials, such as slag cement, fly ash, silica fume and the like.

Yet another object of the present invention is to provide an accelerated concrete curing system to improve the maturity and equivalent age of concrete, especially concrete formulations that use relatively large amounts of inert or filler materials, such as limestone powder, calcium carbonate, titanium dioxide, quartz or other finely divided minerals that densify the hydrated cement paste.

A further object of the present invention is to provide an accelerated concrete curing system to improve the maturity and equivalent age for concrete formulations that use relatively large amounts of recycled industrial waste material, such as slag cement, fly ash, silica fume, pulverized glass, ground or shredded rubber, synthetic fibers, glass, cellulose, carbon or steel fibers, and/or rice husk ash, in combination with inert or filler material, such as ground limestone, calcium carbonate, titanium dioxide, or quartz, while producing concrete having an ultimate strength equivalent to, or better than, concrete made with conventional amounts of portland cement.

Yet another object of the present invention is to reduce the amount of slag and fly ash in ponds or landfills.

Another object of the present invention is to provide a more environmentally friendly concrete.

Another object of the present invention is to provide a concrete or mortar curing system that requires less portland cement.

Still another object of the present invention is to provide a concrete or mortar curing system that is more environmentally friendly.

Another object of the present invention is to provide a concrete or mortar curing system that reduces greenhouse gas emissions.

Another object of the present invention is to provide a concrete or mortar curing system that using increased amount of recycled materials.

A further object of the present invention is to provide a concrete or mortar curing system that produces a concrete or mortar with a more refined structure or microstructure.

Another object of the present invention is to provide a concrete or mortar curing system that produces concrete or mortar that is less water permeable.

Another object of the present invention is to provide a concrete curing system that produces concrete that has a longer service life.

A further object of the present invention is to provide a concrete curing system that is more blast resistant.

Another object of the present invention is to provide a concrete curing system that produces concrete with less concrete shrinkage, curling and/or cracking.

Still another object of the present invention is to concrete mixes or mortar mixes that can be used to create improved precast concrete objects or structures, such as panels, decks, beams, parking decks, bridge decks, wall cladding, pipe, vaults, pavers, brick, artificial stone and architectural concrete objects.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Figure 1:
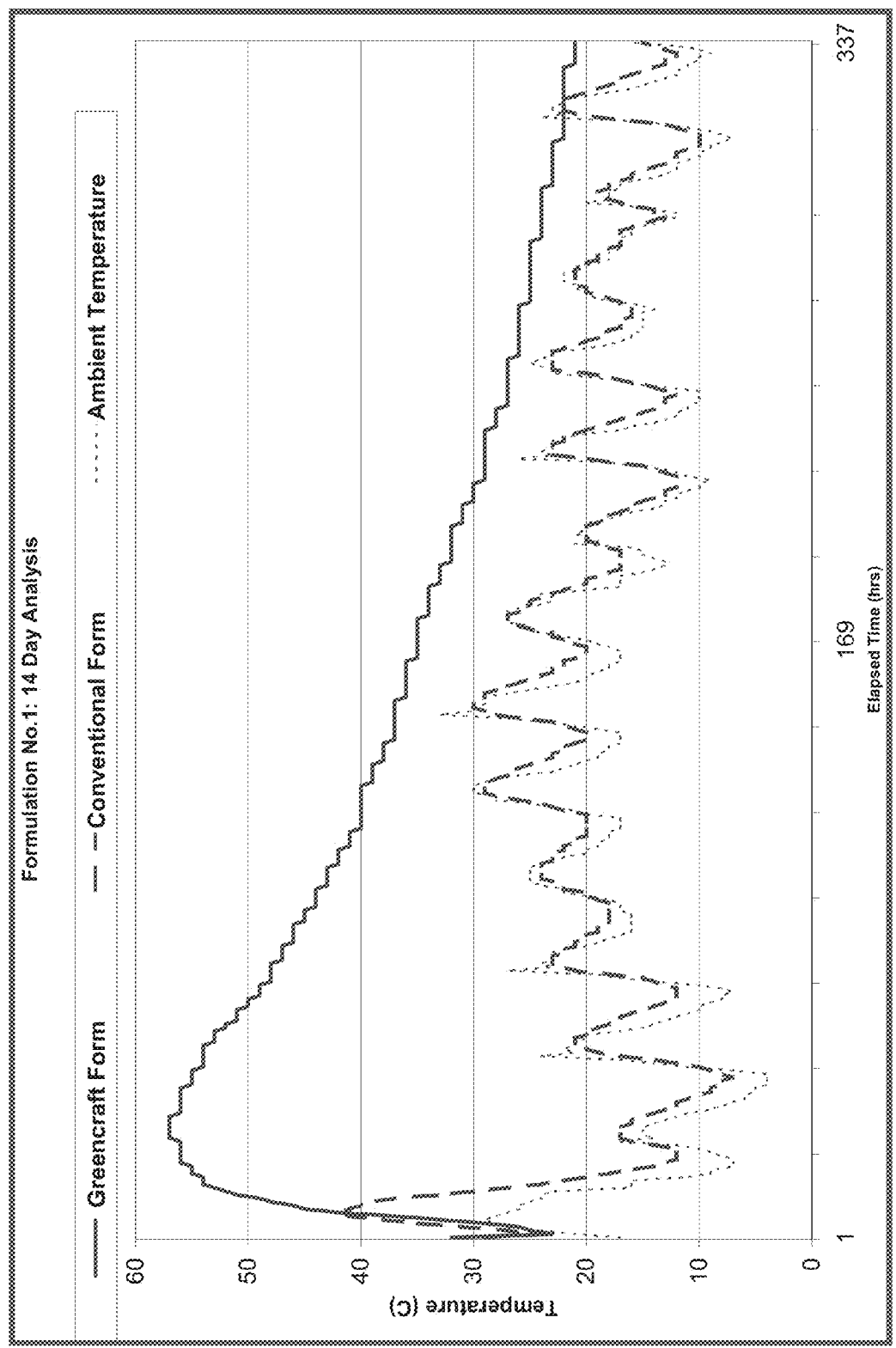
FIG. 1 is a graph of the internal concrete temperature of concrete having a cement mixture of approximately 540 lbs of portland cement (approximately 80% by weight) and 120 lbs of fly ash (approximately 20% by weight) per cubic yard of concrete. The graph shows the internal temperature of this concrete in both a vertical insulated concrete form (i.e., a Greencraft form) and a vertical conventional form over a 14-day period. The ambient temperature is also shown.

The present invention comprises a concrete mix for use in insulated concrete forms. An insulated concrete form provides the necessary conditions for the concrete mix to cure more quickly and to achieve its maximum, or near maximum, strength potential. The insulated concrete form retains the heat of hydration produced by the concrete mix, thereby accelerating the hydration reaction, the maturity or equivalent age and the corresponding strength gain. The insulated concrete form also prevents, or reduces, short term temperature variations, such as hourly or day-to-night temperature changes due to ambient temperature fluctuations, thereby eliminating, or reducing, cracking or micro-cracking of the concrete before the concrete reaches sufficient strength for form removal, if the forms are to be removed. Furthermore, the insulated concrete form prevents a sharp drop of the temperature of the concrete mix after the initial heat generated by the hydration reaction, thereby eliminating, or reducing, concrete thermal effects, which can also produce cracking and reduce other desirable physical properties. While these benefits are experienced to some degree by conventional portland cement-based concrete mixes, the concrete mixes of the present invention unexpectedly show enhanced physical properties when cured, or at least partially cured, in insulated concrete forms compared to the same concrete mix cured in a conventional form.

The concrete mix of the present invention comprises cementitious material and aggregate. The plastic concrete mix in accordance with the present invention comprises cementitious material, aggregate and water sufficient to hydrate the cementitious material. The amount of cementitious material used relative to the total weight of the concrete varies depending on the application and/or the strength of the concrete desired. Generally speaking, however, the cementitious material comprises approximately 25% to approximately 40% by weight of the total weight of the concrete, exclusive of the water, or 500 lbs/yd³ of concrete (295 kg/m³) to 1,100 lbs/yd³ of concrete (650 kg/m³) of concrete. The water-to-cementitious material weight ratio is usually approximately 0.25 to approximately 0.7. Relatively low water-to-cementitious material ratios lead to higher strength but lower workability, while relatively high water-to-cementitious material ratios lead to lower strength, but better workability. Aggregate usually comprises 70% to 80% by volume of the concrete. However, the relative amount of cementitious material to aggregate to water is not a critical feature of the present invention; conventional amounts can be used. The novelty and nonobvious aspects of the present invention partially resides in the fact that when the heat of hydration is retained by an insulated form the concrete is cured much faster and achieves the equivalent age of later stages of concrete formed in a conventional form much faster early on. In turn, this allows the use of far greater amounts of recycled supplemental cementitious materials, such as fly ash, slag cement, rice husk ash, and the like, in lieu of ordinary portland cement with equal or better concrete properties than conventional mixes formed and cured in conventional forms using conventional methods. Also, the novelty and nonobvious aspects of the present invention partially resides in the composition of the cementitious material and the associated curing of concrete containing that cementitious material in an insulated concrete form. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more.

The aggregate used in the concrete used with the present invention is not critical and can be any aggregate typically used in concrete. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The reinforcement of the concrete used with the present invention is not a critical aspect of the present invention and thus any type of reinforcement required by design requirements can be used. Such types of concrete reinforcement include, but are not limited to, deformed steel bars, cables, post tensioned cables, pre-stressed cables, fibers, steel fibers, mineral fibers, synthetic fibers, carbon fibers, steel wire fibers, mesh, lath, and the like.

The preferred cementitious material for use with the present invention comprises portland cement; preferably portland cement and one of slag cement or fly ash; and more preferably portland cement, slag cement and fly ash. Slag cement is also known as ground granulated blast-furnace slag (GGBFS). The cementitious material preferably comprises a reduced amount of portland cement and increased amounts of recycled supplementary cementitious materials; i.e., slag cement and/or fly ash. This results in cementitious material and concrete that is more environmentally friendly. The portland cement can also be replaced, in whole or in part, by one or more cementitious materials other than portland cement, slag cement or fly ash. Such other cementitious or pozzolanic materials include, but are not limited to, silica fume; metakaolin; rice hull (or rice husk) ash; ground burnt clay bricks; brick dust; bone ash; animal blood; clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements and other pozzolanic materials. The portland cement can also be replaced, in whole or in part, by one or more inert or filler materials other than portland cement, slag cement or fly ash. Such other inert or filler materials include, but are not limited to limestone powder; calcium carbonate; titanium dioxide; quartz; or other finely divided minerals that densify the hydrated cement paste.

The preferred cementitious material of the present invention comprises 0% to approximately 80% by weight portland cement. The range of 0% to approximately 80% by weight portland cement includes all of the intermediate percentages; namely, 5%, 10%, 15%, 20%, 25%, 30%, 35%, 40%, 45%, 50%, 55%, 60%, 65%, 70%, and 75%. The cementitious material of the present invention can also comprise 0% to approximately 70% by weight portland cement, preferably 0% to approximately 60% by weight portland cement, more preferably 0% to approximately 60% by weight portland cement, most preferably 0% to approximately 50% by weight portland cement, especially 0% to approximately 40% by weight portland cement, more especially 0% to approximately 30% by weight portland cement, most especially 0% to approximately 20% by weight portland cement or 0% to approximately 10% by weight portland cement. In one disclosed embodiment, the cementitious material comprises approximately 10% to approximately 45% by weight portland cement, more preferably approximately 10% to approximately 40% by weight portland cement, most preferably approximately 10% to approximately 35% by weight portland cement, especially approximately 33⅓% by weight portland cement, most especially approximately 10% to approximately 30% by weight portland cement. Thus, in another disclosed embodiment of the present invention, the cementitious material can comprise approximately 5%, approximately 10%, approximately 15%, approximately 20%, approximately 25%, approximately 30%, approximately 35%, approximately 40%, approximately 45% or approximately 50% by weight portland cement or any subcombination thereof.

The preferred cementitious material for use in one disclosed embodiment of the present invention also comprises 0% to approximately 90% by weight slag cement, preferably approximately 10% to approximately 90% by weight slag cement, preferably approximately 20% to approximately 90% by weight slag cement, more preferably approximately 30% to approximately 80% by weight slag cement, most preferably approximately 30% to approximately 70% by weight slag cement, especially approximately 30% to approximately 60% by weight slag cement, more especially approximately 30% to approximately 50% by weight slag cement, most especially approximately 30% to approximately 40% by weight slag cement. In another disclosed embodiment the cementitious material comprises approximately 33⅓% by weight slag cement. In another disclosed embodiment of the present invention, the cementitious material can comprise approximately 5% by weight slag cement, approximately 10% by weight slag cement, approximately 15% by weight slag cement, approximately 20% by weight slag cement, approximately 25% by weight slag cement, approximately 30% by weight slag cement, approximately 35% by weight slag cement, approximately 40% by weight slag cement, approximately 45% by weight slag cement, approximately 50% by weight slag cement, approximately 55% by weight slag cement, approximately 60% by weight slag cement, approximately 65%, approximately 70% by weight slag cement, approximately 75% by weight slag cement, approximately 80% by weight slag cement, approximately 85% by weight slag cement or approximately 90% by weight slag cement or any sub-combination thereof.

The preferred cementitious material for use in one disclosed embodiment of the present invention also comprises 0% to approximately 80% by weight fly ash, preferably approximately 10% to approximately 80% by weight fly ash, preferably approximately 10% to approximately 75% by weight fly ash, preferably approximately 10% to approximately 70% by weight fly ash, preferably approximately 10% to approximately 65% by weight fly ash, preferably approximately 10% to approximately 60% by weight fly ash, preferably approximately 10% to approximately 55% by weight fly ash, preferably approximately 10% to approximately 50% by weight fly ash, preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash, approximately 50% by weight fly ash, approximately 55% by weight fly ash, approximately 60% by weight fly ash, approximately 65% by weight fly ash, approximately 70% by weight fly ash, approximately 75% by weight fly ash, approximately 80% by weight fly ash or any sub-combination thereof. Preferably the fly ash has an average particle size of <10 µm; more preferably 90% or more of the particles have a particles size of <10 µm.

The cementitious material for use in one disclosed embodiment of the present invention can optionally include 0.1% to approximately 10% by weight Wollastonite. Wollastonite is a calcium inosilicate mineral ($CaSiO_3$) that may contain small amounts of iron, magnesium, and manganese substituted for calcium. In addition the cementitious material can optionally include 0.1-25% calcium oxide (quick lime), calcium hydroxide (hydrated lime), calcium carbonate or latex or polymer admixtures, either mineral or synthetic, that have reactive hydroxyl groups.

The cementitious material for use in one disclosed embodiment of the present invention can also optionally include fillers, such as limestone powder; calcium carbonate; titanium dioxide; quartz; or other finely divided minerals that densify the hydrated cement paste. Specifically, inert fillers optionally can be used in the cementitious material of the present invention in amounts of 0% to approximately 40% by weight; preferably, approximately 5% to approximately 30% by weight. In one disclosed embodiment, the cementitious material for use with the present invention comprises 0% to approximately 75% by weight portland cement, approximately 10% to approximately 90% by weight slag cement, approximately 5% to approximately 80% by weight fly ash and 0% to approximately 40% by weight inert filler. In another disclosed embodiment, the cementitious material for use with the present invention comprises approximately 10% to approximately 80% by weight portland cement; at least one of approximately 10% to approximately 90% by weight slag cement and approximately 5% to approximately 80% by weight fly ash; and 5% to approximately 40% by weight inert filler.

In one disclosed embodiment, the cementitious material in accordance with the present invention comprises approximately equal parts by weight of portland cement, slag cement and fly ash; i.e., approximately 33⅓% by weight portland cement, approximately 33⅓% by weight slag cement and approximately 33⅓% by weight fly ash. In another disclosed embodiment, a preferred cementitious material in accordance with the present invention has a weight ratio of portland cement to slag cement to fly ash of 1:1:1. In another disclosed embodiment, the hydraulic cement in accordance with the present invention has a weight ratio of portland cement to slag cement to fly ash of approximately 0.85-1.05:0.85-1.05:0.85-1.05, preferably approximately 0.9-1.1:0.9-1.1:0.9-1.1, more preferably approximately 0.95-1.05:0.95-1.05:0.95-1.05.

In one disclosed embodiment, the cementitious material for use with the present invention comprises approximately 10% to approximately 80% by weight portland cement, approximately 10% to approximately 90% by weight slag cement, and approximately 5% to approximately 80% by weight fly ash. In another disclosed embodiment, the cementitious material for use with the present invention comprises approximately 10% to approximately 70% by weight portland cement, approximately 10% to approximately 90% by weight slag cement, and approximately 5% to approximately 80% by weight fly ash. In another disclosed embodiment, the cementitious material for use with the present invention comprises approximately 10% to approximately 60% by weight portland cement, approximately 10% to approximately 90% by weight slag cement, and approximately 5% to approximately 80% by weight fly ash. In another disclosed embodiment, the cementitious material for use with the present invention comprises approximately 10% to approximately 50% by weight portland cement, approximately 10% to approximately 90% by weight slag cement, and approximately 5% to approximately 80% by weight fly ash. In another disclosed embodiment, the cementitious material for use with the present invention comprises less than 50% by weight portland cement, approximately 10% to approximately 90% by weight slag cement, and approximately 5% to approximately 80% by weight fly ash. In another disclosed embodiment, the cementitious material for use with the present invention comprises approximately 10% to approximately 45% by weight portland cement, approximately 10% to approximately 90% by weight slag cement, and approximately 5% to approximately 80% by weight fly ash. In another disclosed embodiment, the cementitious material for use with the present invention comprises approximately 10% to approximately 40% by weight portland cement, approximately 10% to approximately 90% by weight slag cement, and approximately 5% to approximately 80% by weight fly ash. In another disclosed embodiment, the cementitious material for use with the present invention comprises approximately 10% to approximately 35% by weight portland cement, approximately 10% to approximately 90% by weight slag cement, and approximately 5% to approximately 80% by weight fly ash.

In one disclosed embodiment, the cementitious material for use with the present invention comprises 0% to approximately 100% by weight portland cement, approximately 10% to approximately 90% by weight slag cement, and approximately 5% to approximately 80% by weight fly ash. In one disclosed embodiment, the cementitious material for use with the present invention comprises 0% to approximately 80% by weight portland cement, approximately 10% to approximately 90% by weight slag cement, and approximately 5% to approximately 80% by weight fly ash. In another disclosed embodiment, the cementitious material for use with the present invention comprises 0% to approximately 70% by weight portland cement, approximately 10% to approximately 90% by weight slag cement, and approximately 5% to approximately 80% by weight fly ash. In another disclosed embodiment, the cementitious material for use with the present invention comprises 0% to approximately 60% by weight portland cement, approximately 10% to approximately 90% by weight slag cement, and approximately 5% to approximately 80% by weight fly ash. In another disclosed embodiment, the cementitious material for use with the present invention comprises 0% to approximately 50% by weight portland cement, approximately 10% to approximately 90% by weight slag cement, and approximately 5% to approximately 80% by weight fly ash. In another disclosed embodiment, the cementitious material for use with the present invention comprises 0% to approximately 45% by weight portland cement, approximately 10% to approximately 90% by weight slag cement, and approximately 5% to approximately 80% by weight fly ash. In another disclosed embodiment, the cementitious material for use with the present invention comprises 0% to approximately 40% by weight portland cement, approximately 10% to approximately 90% by weight slag cement, and approximately 5% to approximately 80% by weight fly ash. In another disclosed embodiment, the cementitious material for use with the present invention comprises 0% to approximately 35% by weight portland cement, approximately 10% to approximately 90% by weight slag cement, and approximately 5% to approximately 80% by weight fly ash.

In another disclosed embodiment, the cementitious material for use with the present invention comprises approximately 10% to approximately 70% by weight portland cement and at least one of approximately 10% to approximately 90% by weight slag cement and approximately 5% to approximately 80% by weight fly ash. In another disclosed embodiment, the cementitious material for use with the present invention comprises approximately 10% to approximately 60% by weight portland cement and at least one of approximately 10% to approximately 90% by weight slag cement and approximately 5% to approximately 80% by weight fly ash. In another disclosed embodiment, the cementitious material for use with the present invention comprises approximately 10% to approximately 50% by weight portland cement and at least one of approximately 10% to approximately 90% by weight slag cement and approximately 5% to approximately 80% by weight fly ash. In another disclosed embodiment, the cementitious material for use with the present invention comprises approximately 10% to approximately 40% by weight portland cement and at least one of approximately 10% to approximately 90% by weight slag cement and approximately 5% to approximately 80% by weight fly ash.

In another disclosed embodiment, the cementitious material for use with the present invention comprises approximately 10% to approximately 90% by weight portland cement; approximately 10% to approximately 90% by weight slag cement; 0% to approximately 80% by weight fly ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises approximately 10% to approximately 80% by weight portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 70% by weight portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 60% by weight portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 50% by weight portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight portland cement; approximately 10% to approximately 90% by weight slag cement; 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises at least one of approximately 10% to approximately 100% by weight portland cement, approximately 10% to approximately 90% by weight slag cement or approximately 5% to approximately 80% by weight fly ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises at least one of approximately 10% to approximately 80% by weight portland cement, approximately 10% to approximately 90% by weight slag cement or approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 70% by weight portland cement, approximately 10% to approximately 90% by weight slag cement or approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 60% by weight portland cement, approximately 10% to approximately 90% by weight slag cement or approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 50% by weight portland cement, approximately 10% to approximately 90% by weight slag cement or approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 45% by weight portland cement, approximately 10% to approximately 90% by weight slag cement or approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 40% by weight portland cement, approximately 10% to approximately 90% by weight slag cement or approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 35% by weight portland cement, approximately 10% to approximately 90% by weight slag cement or approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises approximately 10% to approximately 90% by weight portland cement; at least one of approximately 10% to approximately 90% by weight slag cement or approximately 5% to approximately 80% by weight fly ash; and 0.1% to 10% by weight Wollastonite. In one disclosed embodiment, the cementitious material for use with the present invention comprises approximately 10% to approximately 80% by weight portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 70% by weight portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 60% by weight portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 50% by weight portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises less than 50% by weight portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 45% by weight portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 40% by weight portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 35% by weight portland cement; at least one of approximately 10% to approximately 90% by weight slag cement or approximately 5% to approximately 80% by weight fly ash; and 0.1% to approximately 10% by weight Wollastonite.

The portland cement, slag cement and fly ash, and any other supplementary cementitious material, can be combined physically or mechanically in any suitable manner and is not a critical feature of the present invention. For example, the portland cement, slag cement and fly ash can be mixed together to form a uniform blend of dry material prior to combining with the aggregate and water. Or, the portland cement, slag cement and fly ash can be added separately to a conventional concrete mixer, such as the transit mixer of a ready-mix concrete truck, at a batch plant. The water and aggregate can be added to the mixer before the cementitious material, however, it is preferable to add the cementitious material first, the water second, the aggregate third and any makeup water last.

Chemical admixtures can also be used with the concrete of the present invention. Such chemical admixtures include, but are not limited to, accelerators, retarders, air entrainments, plasticizers, superplasticizers, pigments, corrosion inhibitors, bonding agents and pumping aid. Although chemical admixtures can be used with the concrete of the present invention, it is believed that chemical admixtures are not necessary.

Mineral admixtures or supplementary cementitious materials (SCMs) can also be used with the concrete of the present invention. Such mineral admixtures include, but are not limited to, silica fume; metakaolin; rice hull (or rice husk) ash; ground burnt clay bricks; brick dust; bone ash; animal blood; clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements and other pozzolanic materials. Although mineral admixtures can be used with the concrete of the present invention, it is believed that mineral admixtures are not necessary.

After the plastic concrete has been prepared, it is placed in an insulated concrete form or mold where it is kept until the concrete is at least partially cured, and preferably completely cured. As used herein, the term "completely cured" shall mean that the concrete has attained at least 90% of its ultimate compressive strength. Most preferably, the concrete is kept in the insulated concrete form and the insulated concrete form or mold becomes a permanent part of the concrete structure. However, for certain applications it may be desirable to remove, or partially remove, the concrete from the insulated concrete form or mold.

The insulated concrete form can be any insulated concrete form that is sufficiently strong to hold the plastic concrete. Preferred insulated concrete forms are disclosed in applicant's patent application Ser. Nos. 12/753,220 filed Apr. 2, 2010 (now Publication No. US 2011/0239566); 13/247,133 filed Sep. 28, 2011 (now Publication No. US 2013/0074432) and 13/247,256 filed Sep. 28, 2011 (now Publication No. US 2013/0074433) (the disclosures of which are all incorporated herein by reference in their entirety). Modular insulated concrete form can also be used, such as those disclosed in U.S. Pat. Nos. 5,497,592; 5,809,725; 6,668,503; 6,898,912 and 7,124,547 (the disclosures of which are all incorporated herein by reference in their entirety). It is also specifically contemplated that a conventional concrete form or mold can be made into an insulated concrete form or mold by applying expanded polystyrene foam to the exterior of the conventional form or mold; see for example, applicant's co-pending patent application entitled "Insulated Plywood Concrete Form and Method of Curing Concrete Using Same," Ser. No. 13/626,103 filed Sep. 25, 2012 and applicant's co-pending patent application entitled "Concrete Runways, Roads, Highways and Slabs on Grade and Methods of Making Same," Ser. No. 13/626,540 filed Sep. 25, 2012 (the disclosures of which are both incorporated herein by reference in their entirety). Alternatively, the insulating material can be sprayed on the exterior surface of a reusable conventional form or mold in liquid form and then foamed in situ, such as by including a blowing agent in the liquid, such as a low-boiling liquid. Polymers that can be sprayed on in liquid form and then foamed and cured in situ include, but are not limited to, polystyrene, polyurethane and other polymers well know to those skilled in the art. Thus, any form or mold known in the art for forming concrete, precast concrete, mortar or plaster structures or objects can be made into an insulated concrete form or mold by applying sufficient insulating material to the exterior of the conventional form or mold; i.e., the side of the form or mold that does not contact the concrete. An insulated blanket or electrically heated blanket can also be used for a portion of the insulated concrete form or mold. Also, a conventional concrete form or mold can be partially or completely wrapped in insulating material, an insulated blanket or an electrically heated blanket. The configuration of the form or mold is not important to the present invention. What is important is that the insulated concrete form holds in a sufficient amount of the heat of hydration such that the properties of the present invention are achieved. Thus, the form or mold or the insulating material applied to the form or mold must have sufficient insulating properties as specified below.

The insulated concrete form or mold used in a disclosed embodiment of the present invention has insulating properties equivalent to at least 0.25 inches of expanded polystyrene foam, preferably equivalent to at least 0.5 inches of expanded polystyrene foam, more preferably equivalent to at least 1 inch of expanded polystyrene foam; most preferably equivalent to at least 2 inch of expanded polystyrene foam, especially equivalent to at least 3 inch of expanded polystyrene foam, most especially equivalent to at least 4 inch of expanded polystyrene foam. There is no maximum thickness for the equivalent expanded polystyrene foam. The maximum thickness is usually dictated by economics, ease of handling and building or structure design. However, for most applications a maximum equivalence of 8 inches of expanded polystyrene foam can be used. In another embodiment of the present invention, the insulated concrete form has insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties include all of the intermediate values. Thus, the insulated concrete form used in another disclosed embodiment of the present invention has insulating properties equivalent to approximately 0.25 inches of expanded polystyrene foam, equivalent to approximately 0.5 inches of expanded polystyrene foam, equivalent to approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 5 per inch thickness. Therefore, the insulating material 344 should have an R-value of greater than 1.5, preferably greater than 4, more preferably greater than 8, especially greater than 12, most especially greater than 20. The insulating concrete form or mold preferably has an R-value of approximately 1.5 to approximately 40; more preferably between approximately 4 to approximately 40; especially approximately 8 to approximately 40; more especially approximately 12 to approximately 40. The insulating material 344 preferably has an R-value of approximately 1.5, more preferably approximately 4, most preferably approximately 8, especially approximately 20, more especially approximately 30, most especially approximately 40. Of course, different amounts of insulating materials, different amounts of equivalent insulating materials or different types of insulating materials can be used above and below a horizontal concrete slab or for the interior vertical insulated concrete form and the exterior vertical insulated concrete form in accordance with the present invention, as design requirement may require.

The insulated concrete form or mold can also be made from a refractory insulating material, such as a refractory blanket or a refractory board. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, and fireclay. Refractory insulating material is commercially available in bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA.

The insulated concrete form or mold can also be made in accordance with applicant's patent application entitled "Insulated Concrete Form and Method of Using Same," Ser. No. 13/247,133 filed Sep. 28, 2011 (now Publication No. US 2013/0074432) (the disclosure of which is incorporated herein by reference in its entirety); applicant's co-pending patent application entitled "Method for Electronic Temperature Controlled Curing of Concrete and Accelerating Concrete Maturity or Equivalent Age, Precast Concrete Structures and Objects and Apparatus for Same," Ser. No. 13/626,075, filed Sep. 25, 2012 (the disclosure of which is incorporated herein by reference in its entirety); applicant's co-pending patent application entitled "High Performance, Lightweight Precast Composite Concrete Panels and High Energy-Efficient Structures and Methods of Making Same," Ser. No. 13/626,087 filed Sep. 25, 2012 (the disclosure of which is incorporated herein by reference in its entirety); and applicant's co-pending patent application entitled "Composite Insulated Plywood, Insulated Plywood Concrete Form and Method of Curing Concrete Using Same," Ser. No. 13/626,103 filed Sep. 25, 2012 (the disclosure of which is incorporated herein by reference in its entirety).

The concrete mix cured in an insulated concrete form in accordance with the present invention produces concrete with superior early strength and ultimate strength properties compared to the same concrete mix cured in a conventional form manner without the use of any chemical additives to accelerate or otherwise alter the curing process. Thus, in one disclosed embodiment of the present invention, the cementitious material comprises at least two of portland cement, slag cement and fly ash in amounts such that at three to seven days the concrete mix in accordance with the present invention in an insulated concrete form has a compressive strength at least 25% or at least 50% greater than the same concrete mix would have after the same time in a non-insulated concrete form under the same conditions. In another disclosed embodiment, the concrete mix in an insulated concrete form has a compressive strength at least 100%, at least 150%, at least 200%, at least 250% or at least 300% greater than the same concrete mix would have after three to seven days in a conventional (i.e., non-insulated) concrete form under the same conditions.

In another disclosed embodiment of the present invention, the cementitious material comprises portland cement, slag cement and fly ash in amounts such that at three to seven days the concrete mix in accordance with the present invention in an insulated concrete form has a compressive strength at least 25% or at least 50% greater than the same concrete mix would have after the same amount of time in a non-insulated concrete form under the same conditions. In another disclosed embodiment the concrete mix in an insulated concrete form has a compressive strength at least 100%, at least 150%, at least 200%, at least 250% or at least 300% greater than the same concrete mix would have after three to seven days in a conventional (i.e., non-insulated) concrete form under the same conditions.

In another disclosed embodiment of the present invention, the cementitious material comprises portland cement and slag cement in amounts such that at three to seven days the concrete mix in accordance with the present invention in an insulated concrete form has a compressive strength at least 25% or at least 50% greater than the same concrete mix would have after the same amount of time in a non-insulated concrete form under the same conditions. In another disclosed embodiment the concrete mix in an insulated concrete form has a compressive strength at least 100%, at least 150%, at least 200%, at least 250% or at least 300% greater than the same concrete mix would have after three to seven days in a conventional (i.e., non-insulated) concrete form under the same conditions.

In another disclosed embodiment of the present invention, the cementitious material comprises portland cement and fly ash in amounts such that at three to seven days the concrete mix in accordance with the present invention in an insulated concrete form has a compressive strength at least 25% or at least 50% greater than the same concrete mix would have after the same amount of time in a non-insulated concrete form under the same conditions. In another disclosed embodiment the concrete mix in an insulated concrete form has a compressive strength at least 100%, at least 150%, at least 200%, at least 250% or at least 300% greater than the same concrete mix would have after three to seven days in a conventional (i.e., non-insulated) concrete form under the same conditions.

In another disclosed embodiment of the present invention, the cementitious material comprises any and all concrete mixes listed above in the present invention containing portland cement and any supplementary cementitious material in amounts such that at three to seven days the concrete mix in accordance with the present invention in an insulated concrete form has a compressive strength at least 25% or at least 50% greater than the same concrete mix would have after the same amount of time in a non-insulated concrete form under the same conditions. In another disclosed embodiment the concrete mix in an insulated concrete form has a compressive strength at least 100%, at least 150%, at least 200%, at least 250% or at least 300% greater than the same concrete mix would have after three to seven days in a conventional (i.e., non-insulated) concrete form under the same conditions.

In another disclosed embodiment of the present invention, the cementitious material comprises any and all concrete mixes listed above in the present invention containing portland cement and any supplementary cementitious material in amounts such that at three days the concrete mix in accordance with the present invention in an insulated concrete form has a compressive strength (as measured by ASTM 42) at least 65% of the compressive strength the same concrete mix would have after 90 days in the same insulated concrete form under the same conditions. In another disclosed embodiment at three days the concrete mix in accordance with the present invention in an insulated concrete form has a compressive strength (as measured by ASTM 42) at least 70%, preferably at least 75%, more preferably at least 80% of the compressive strength the same concrete mix would have after 90 days in the same insulated concrete form under the same conditions.

The following examples are illustrative of selected embodiments of the present invention and are not intended to limit the scope of the invention.

Example 1

Six concrete forms were set up side-by-side to form vertical wall sections. The forms were erected outside during the spring and were subjected to ambient weather and temperature conditions. Three forms were conventional 4 feet×8 feet aluminum forms. These forms were set for an eight-inch thick wall section. The other three forms were insulated concrete forms. Each insulated concrete forms was made from two 4 feet×8 feet panels of expanded polystyrene foam spaced eight inches from each other. The bottom and the side of the forms were also insulated but the top of the form was left open to the environment. The concrete mixes were batched at a local ready mix concrete batch plant and delivered to the site by way of a conventional concrete truck. An independent testing lab technician from an accredited testing lab was present to sample the concrete. Three different concrete mixes were prepared. The concrete mixes employed three different cement formulations but were otherwise similar. No concrete additives of any kind were used in any of these formulations, except a water-reducing superplasticizer admixture. Each one of these three concrete formulations was designed to be a 4000 psi compressive strength at 28 days based upon the amount of the cementitious material contained in each formulation; i.e., 650-660 lbs per cubic yard. The three cement formulations are shown in Table 1 below.

TABLE 1

| Formulation No. | Portland Cement lbs/yd$^3$ concrete | Slag Cement lbs/yd$^3$ concrete | Fly Ash lbs/yd$^3$ concrete | Total Cement Weight lbs/yd$^3$ concrete |
| --- | --- | --- | --- | --- |
| 1 | 540 |  | 120 | 660 |
| 2 | 325 |  | 325 | 650 |
| 3 | 220 | 215 | 215 | 650 |

Concrete made with Formulation No. 1 was placed in both a conventional form and an insulated concrete form (i.e., Greencraft form) at the same time. Similarly, concrete made with Formulation No. 2 was placed in both a conventional form and an insulated concrete form (i.e., Greencraft form) at the same time. And, concrete made with Formulation No. 3 was placed in both a conventional form and an insulated concrete form (i.e., Greencraft form) at the same time.

Each concrete form was fitted with a temperature sensor with an internal memory and microchip placed at approximately the middle of the eight-inch concrete receiving space defined by the form and approximately four feet from the bottom. Another temperature sensor was placed outside the form, and out of direct sunlight or heat, to record ambient temperatures adjacent the forms. The concrete temperature sensors were Intellirock II™ maturity/temperature loggers from Engius, LLC of Stillwater, Okla. The Intellirock II™ sensors were started by a concrete technician from an independent, accredited concrete testing lab. The internal temperature of the concrete and the calculated maturity values (° C. Hrs) within each form was logged every hour for 90 days.

Figure 4:
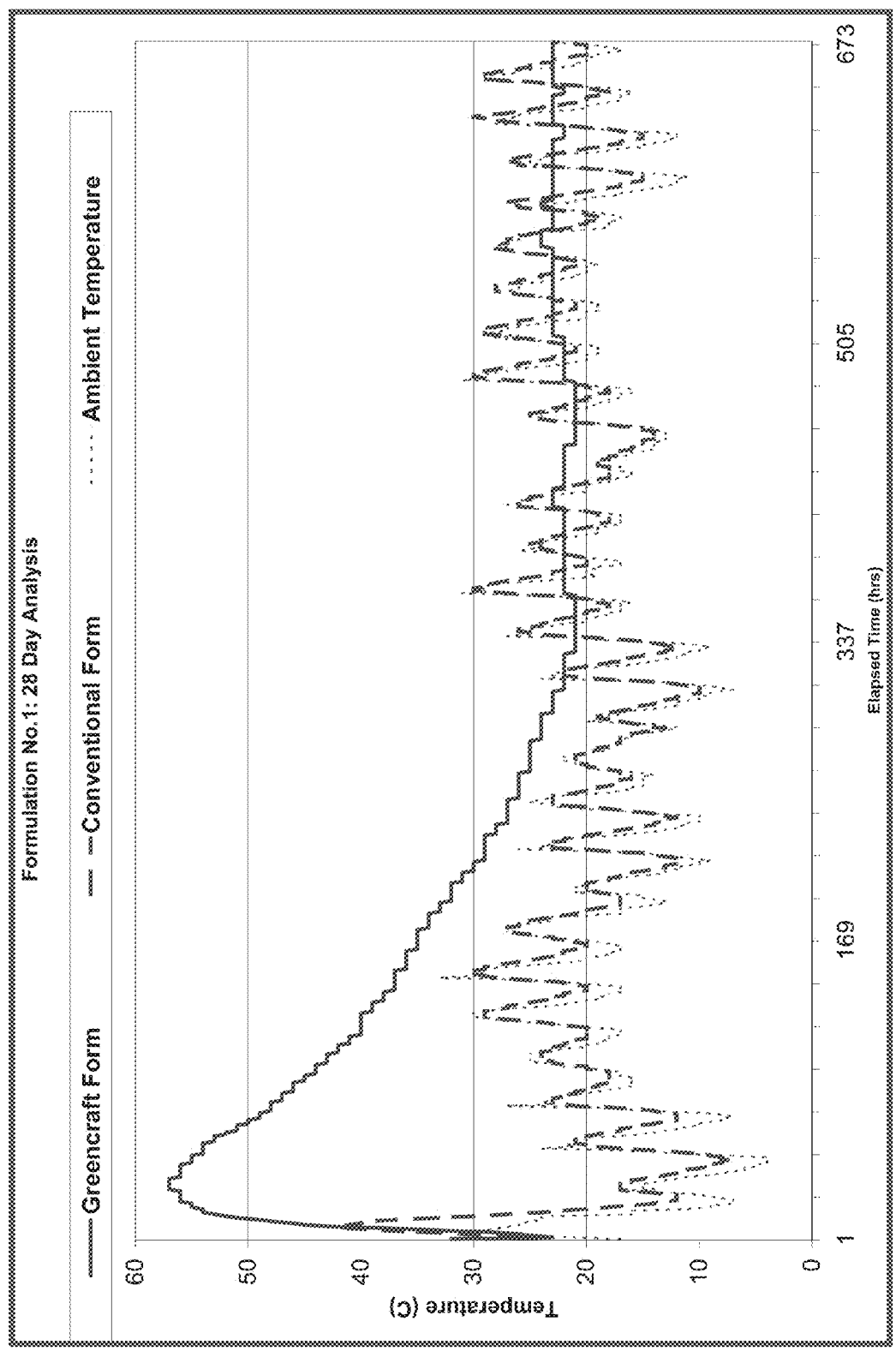
FIG. 4 is a graph of the internal concrete temperature of concrete having a cement mixture of approximately 540 lbs of portland cement (approximately 80% by weight) and 120 lbs of fly ash (approximately 20% by weight) per cubic yard of concrete. The graph shows the internal temperature of this concrete in both a vertical insulated concrete form (i.e., a Greencraft form) and a vertical conventional form over a 28-day period. The ambient temperature is also shown.
Figure 7:
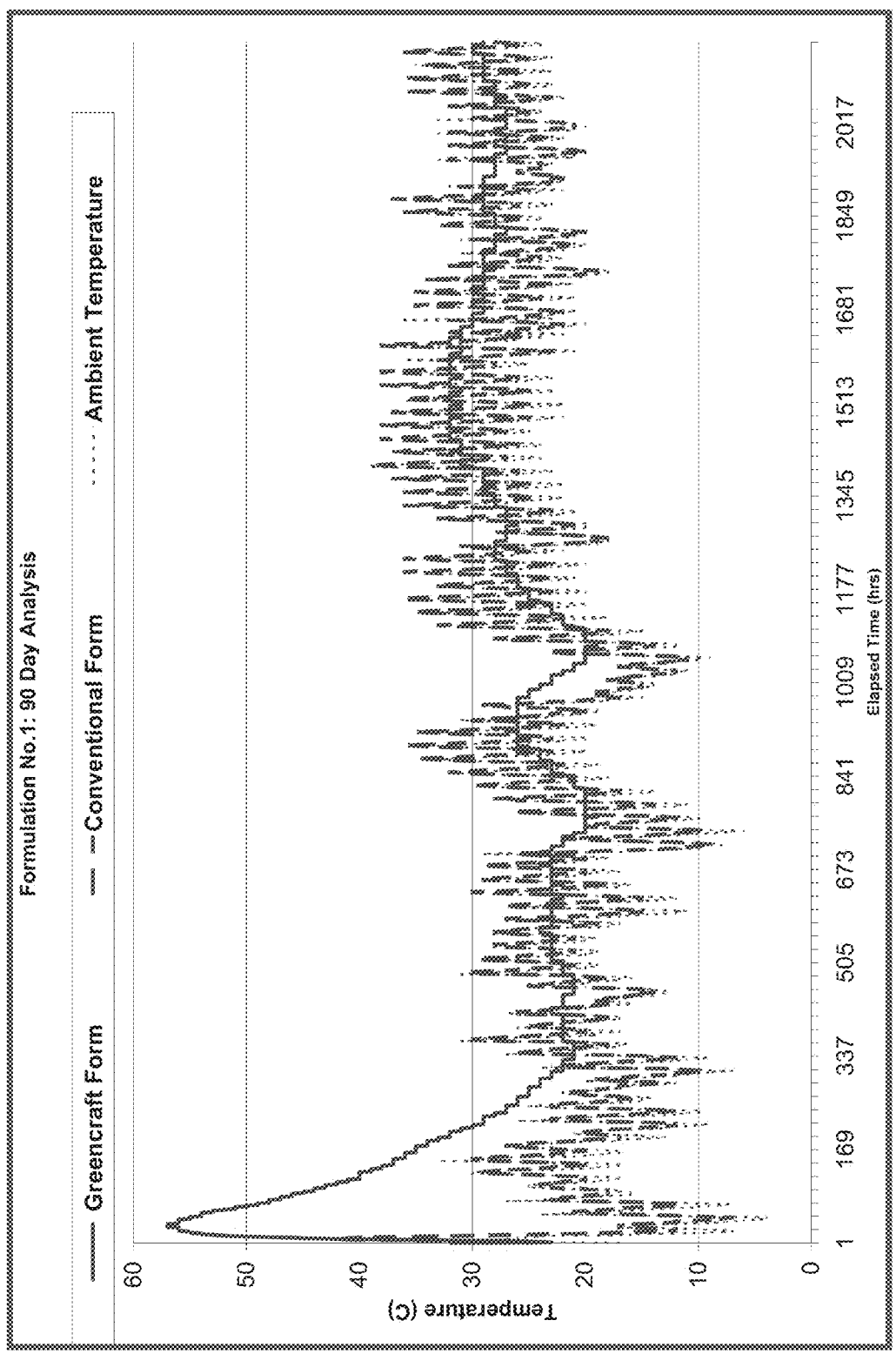
FIG. 7 is a graph of the internal concrete temperature of concrete having a cement mixture of approximately 540 lbs of portland cement (approximately 80% by weight) and 120 lbs of fly ash (approximately 20% by weight) per cubic yard of concrete. The graph shows the internal temperature of this concrete in both a vertical insulated concrete form (i.e., a Greencraft form) and a vertical conventional form over a 90-day period. The ambient temperature is also shown.

FIGS. 1, 4 and 7 are graphs of the internal concrete temperature of Formulation No. 1 in both a vertical conventional concrete form and a vertical insulated concrete form over 14 day, 28 day and 90 day periods, respectively. The ambient temperature is also shown on the graph.

As can be seen from FIGS. 1, 4 and 7, the concrete made with Formulation No. 1 within the conventional form reached a maximum temperature of approximately 42° C. relatively quickly and returned to ambient temperature within approximately one day. The concrete in the conventional concrete form then fluctuated approximately 10° C. on a daily basis closely tracking the change in ambient temperature.

The concrete made with Formulation No. 1 within the insulated concrete form reached an internal temperature of 40° C. in about the same amount of time as the concrete in the conventional form. However, while the temperature of the concrete in the conventional form began to drop from its maximum temperature, the temperature of the concrete in the insulated concrete form continued to increase for a relatively long period of time until it reached a maximum temperature of approximately 57° C. The internal temperature of the concrete in the insulated concrete form then slowly declined until it reached ambient temperature after approximately 14 days. For the remainder of the test period, the internal temperature of the concrete in the insulated concrete form fluctuated little.

Figure 2:
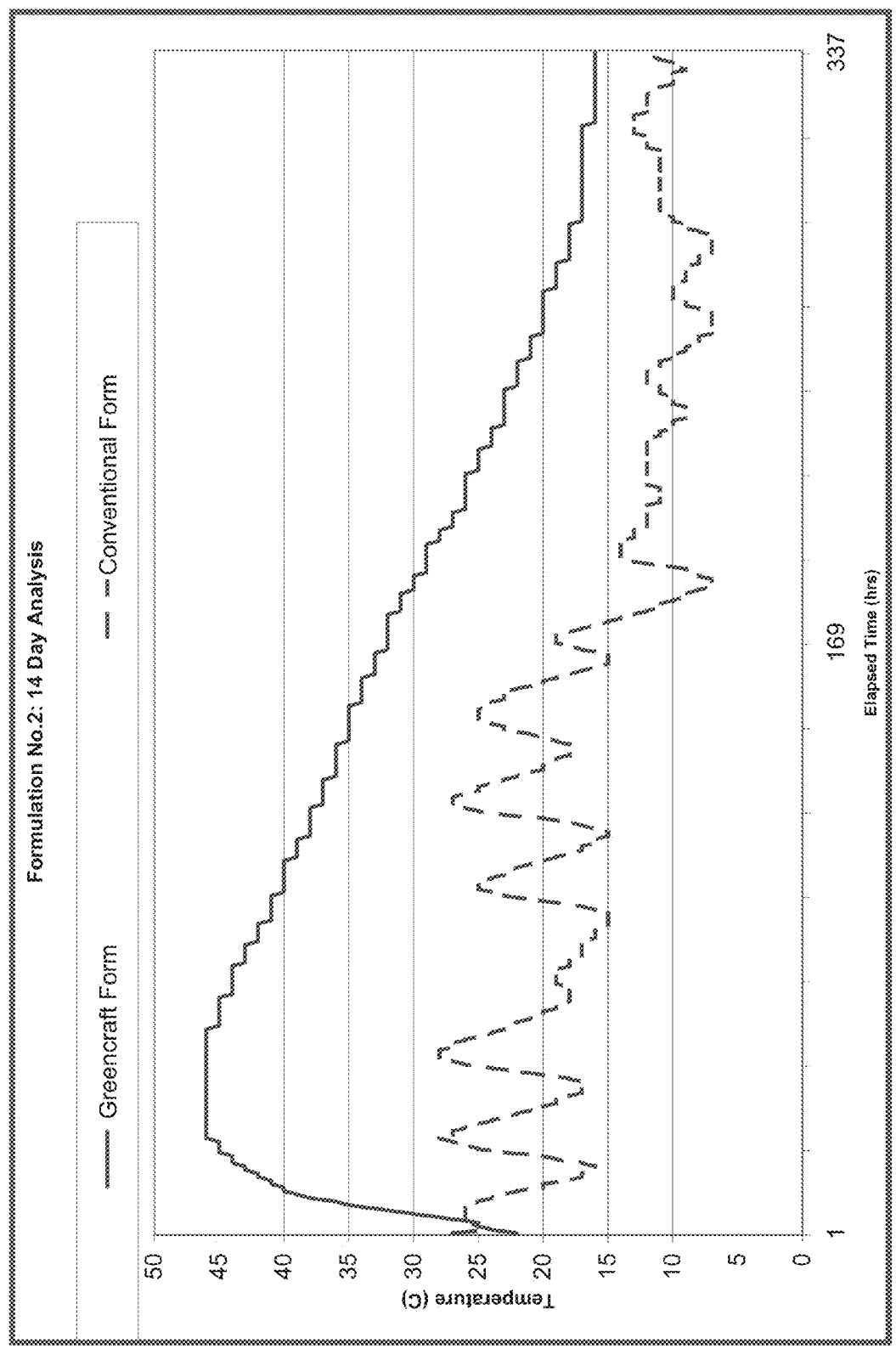
FIG. 2 is a graph of the internal concrete temperature of concrete having a cement mixture of approximately 325 lbs of portland cement (50% by weight) and 325 of lbs of fly ash (50% by weight) per cubic yard of concrete. The graph shows the internal temperature of this concrete in both a vertical insulated concrete form (i.e., a Greencraft form) and a vertical conventional form over a 14-day period.
Figure 5:
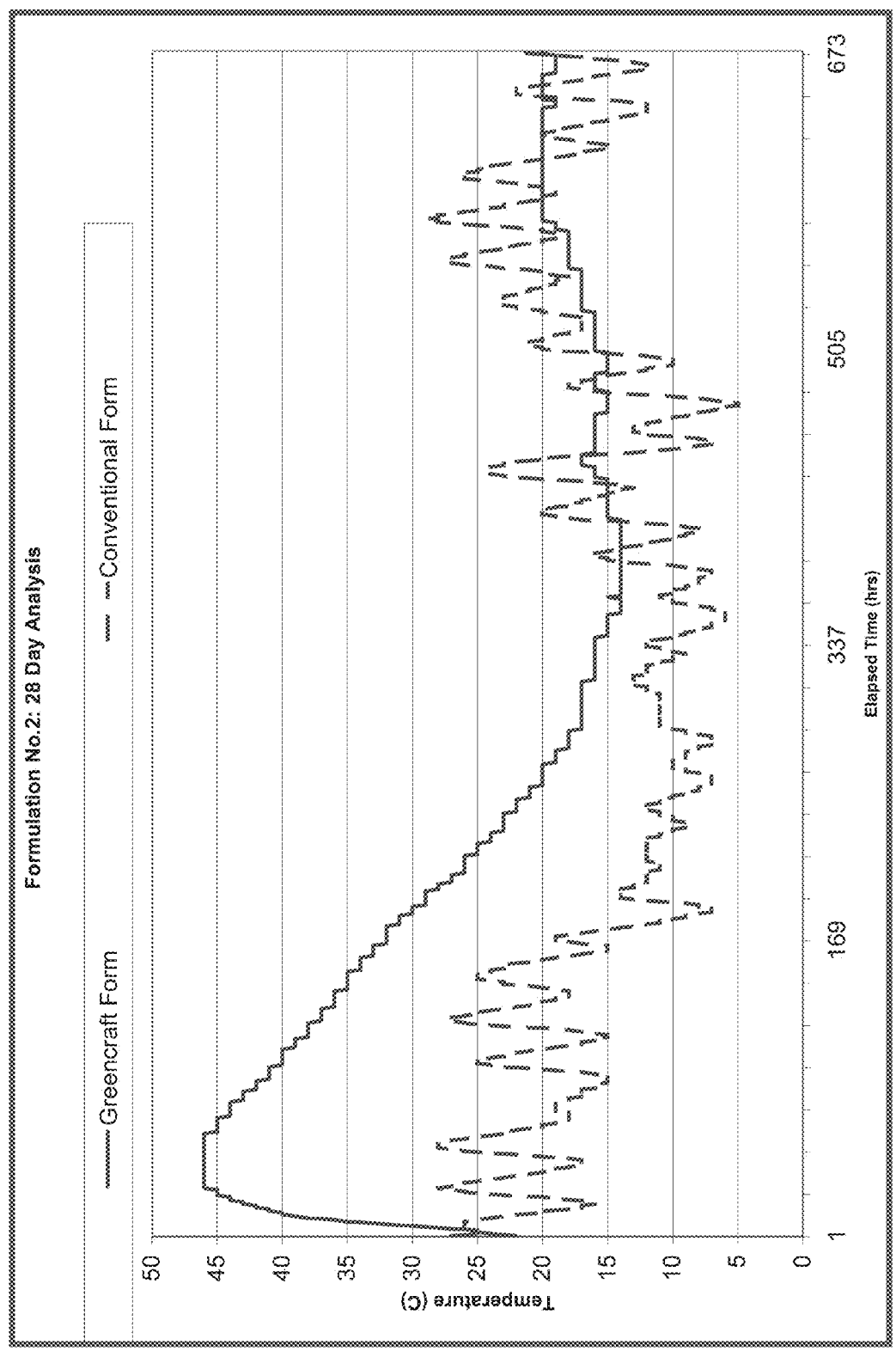
FIG. 5 is a graph of the internal concrete temperature of concrete having a cement mixture of approximately 325 lbs of portland cement (50% by weight) and 325 of lbs of fly ash (50% by weight) per cubic yard of concrete. The graph shows the internal temperature of this concrete in both a vertical insulated concrete form (i.e., a Greencraft form) and a vertical conventional form over a 28-day period.
Figure 8:
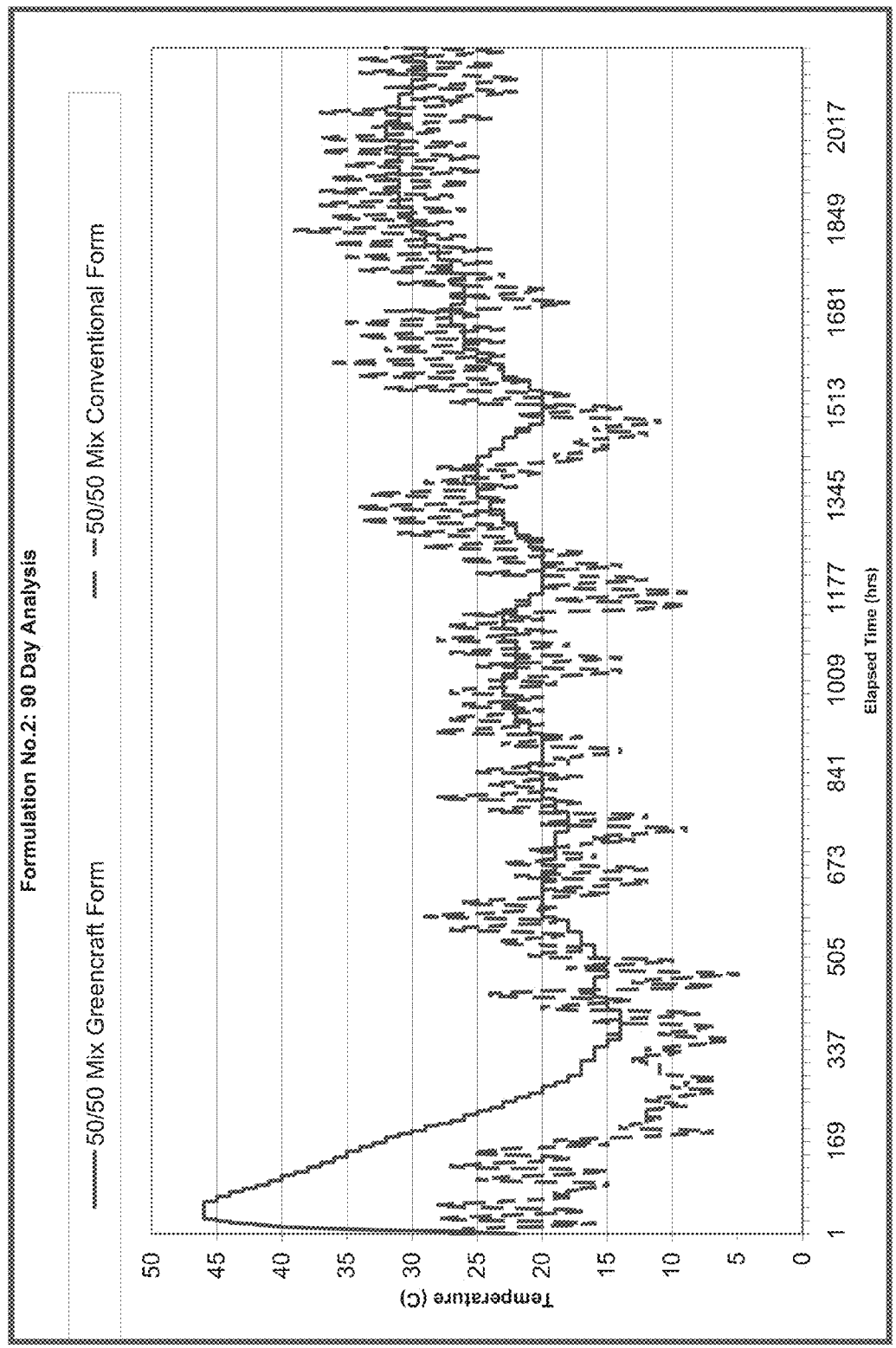
FIG. 8 is a graph of the internal concrete temperature of concrete having a cement mixture of approximately 325 lbs of portland cement (50% by weight) and 325 of lbs of fly ash (50% by weight) per cubic yard of concrete. The graph shows the internal temperature of this concrete in both a vertical insulated concrete form (i.e., a Greencraft form) and a vertical conventional form over a 90-day period.

FIGS. 2, 5 and 8 are graphs of the internal concrete temperature of the concrete made with Formulation No. 2 in both a vertical conventional concrete form and a vertical insulated concrete form over 14 day, 28 day and 90 day periods, respectively. The ambient temperature is not shown on this graph.

As can be seen from FIGS. 2, 5 and 8, the concrete made with Formulation No. 2 within the conventional form reached a maximum temperature of approximately 27° C. relatively quickly and returned to ambient temperature within approximately one day. The concrete in the conventional concrete form then fluctuated approximately 10° C. on a daily basis.

The concrete made with Formulation No. 2 within the insulated concrete form reached an internal temperature of 27° C. in about the same amount of time as the concrete in the conventional form. However, while the temperature of the concrete in the conventional form began to drop from its maximum temperature, the temperature of the concrete in the insulated concrete form continued to increase for a relatively long period of time until it reached a maximum temperature of approximately 46° C. The internal temperature of the concrete in the insulated concrete form maintained its maximum temperature for approximately 3 days and then slowly declined until it reached ambient temperature after approximately 16 days. For the remainder of the test period, the internal temperature of the concrete in the insulated concrete form fluctuated little.

Figure 3:
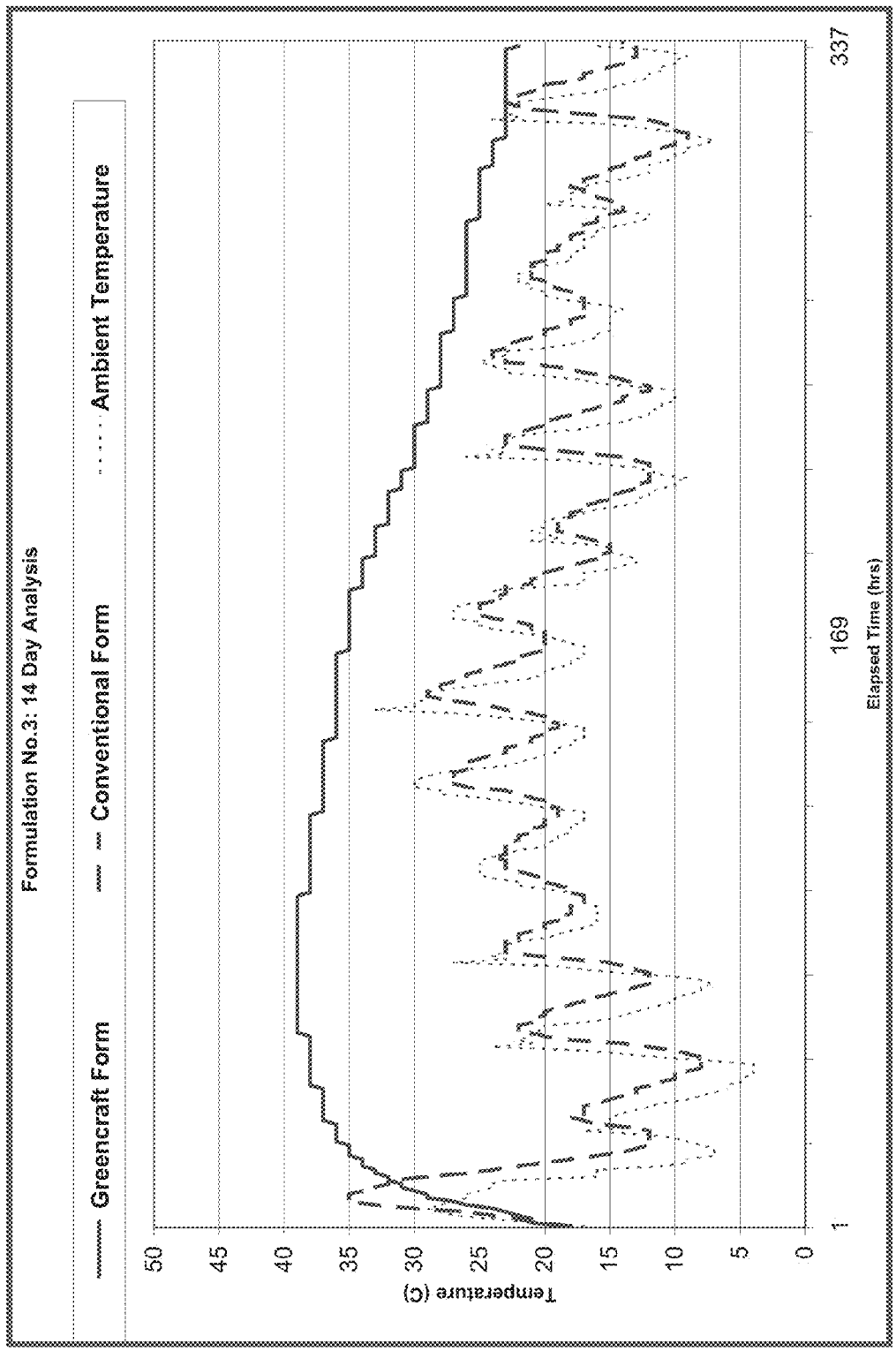
FIG. 3 is a graph of the internal concrete temperature of concrete having a cement mixture of approximately 220 lbs of portland cement (approximately 34% by weight), 215 lbs of slag cement (approximately 33% by weight) and 215 of lbs of fly ash (approximately 33% by weight) per cubic yard of concrete. The graph shows the internal temperature of this concrete in both a vertical insulated concrete form (i.e., a Greencraft form) and a vertical conventional form over a 14-day period. The ambient temperature is also shown.
Figure 6:
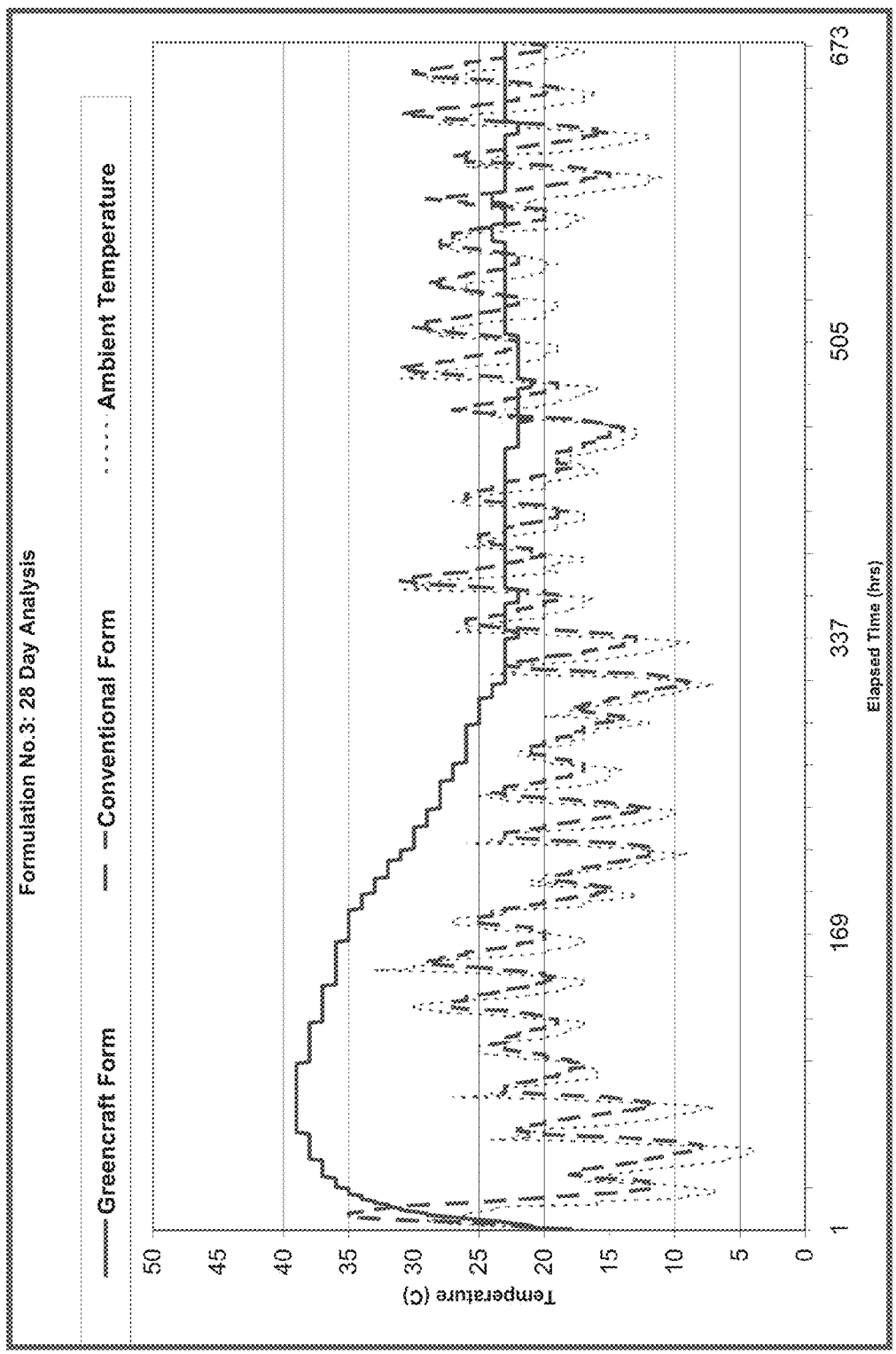
FIG. 6 is a graph of the internal concrete temperature of concrete having a cement mixture of approximately 220 lbs of portland cement (approximately 34% by weight), 215 lbs of slag cement (approximately 33% by weight) and 215 of lbs of fly ash (approximately 33% by weight) per cubic yard of concrete. The graph shows the internal temperature of this concrete in both a vertical insulated concrete form (i.e., a Greencraft form) and a vertical conventional form over a 28-day period. The ambient temperature is also shown.
Figure 9:
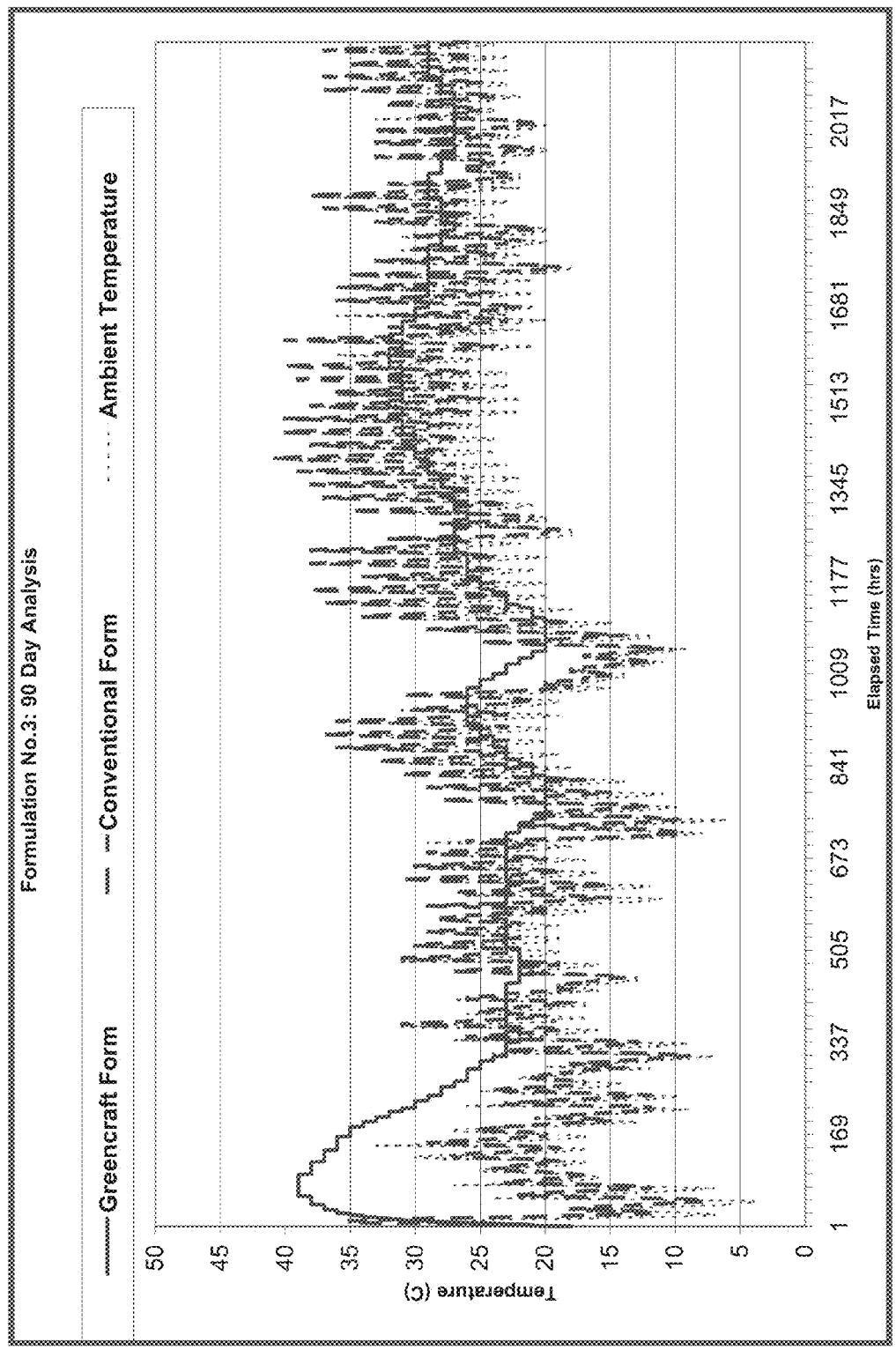
FIG. 9 is a graph of the internal concrete temperature of concrete having a cement mixture of approximately 220 lbs of portland cement (approximately 34% by weight), 215 lbs of slag cement (approximately 33% by weight) and 215 of lbs of fly ash (approximately 33% by weight) per cubic yard of concrete. The graph shows the internal temperature of this concrete in both a vertical insulated concrete form (i.e., a Greencraft form) and a vertical conventional form over a 90-day period. The ambient temperature is also shown.

FIGS. 3, 6 and 9 are graphs of the internal concrete temperature of concrete made with Formulation No. 3 in both a vertical conventional concrete form and a vertical insulated concrete form over 14 day, 28 day and 90 day periods, respectively. The ambient temperature is also shown on this graph.

approximately 14 days. For the remainder of the test period, the internal temperature of the concrete in the insulated concrete form fluctuated little.

Concrete maturity or "equivalent age" is graphically represented by the area under the curves of the graphs shown in FIGS. 1-27. Therefore, if the area under the curve has a greater area, it will also have a greater concrete maturity or equivalent age. For example, in FIG. 1 it can easily be seen that the area under the curve for Formulation No. 1 in the insulated Greencraft form is greater than the area under the curve for Formulation No. 1 in the non-insulated form. As similar analysis can easily be made for the other concrete formulations shown in FIGS. 1-27.

Example 2

As stated above, maturity of concrete is measured as "equivalent age" and is given in temperature degrees×hours (either ° C.-Hrs or ° F.-Hrs). The concrete maturity was measured by the Intellirock II™ maturity/temperature loggers used in each of the six vertical wall sections identified above in Example 1. A summary of this test data is shown in Table 2 below.

TABLE 2

| ASTM C-42 Vertical Forms Coring Conventional vs. Greencraft Forms Testing: Concrete Maturity (° C.-Hrs) | | | | | | | |
|---|---|---|---|---|---|---|---|
| | | Formulation No. 1 | | Formulation No. 2 | | Formulation No. 3 | |
| Actual Age | | Conventional Form | Insulated Greencraft | Conventional Form | Insulated Greencraft | Conventional Form | Insulated Greencraft |
| Age (days) | Age (hours) | Maturity ° C.-Hrs | Maturity ° C.-Hrs | Maturity ° C.-Hrs | Maturity ° C.-Hrs | Maturity ° C.-Hrs | Maturity ° C.-Hrs |
| 0.33 | 8 | 273 | 252 | 206 | 221 | 220 | 189 |
| 0.75 | 18 | 574 | 763 | 414 | 620 | 513 | 506 |
| 1 | 24 | 656 | 1096 | 530 | 883 | 602 | 715 |
| 2 | 48 | 954 | 2441 | 1060 | 1985 | 911 | 1606 |
| 3 | 72 | 1340 | 3683 | 1600 | 3071 | 1299 | 2535 |
| 7 | 168 | 3524 | 7589 | 3511 | 6705 | 3391 | 5441 |
| 14 | 336 | 6512 | 12116 | 5323 | 10415 | 6331 | 10848 |
| 28 | 672 | 13987 | 19620 | 10749 | 16077 | 13962 | 18500 |
| 56 | 1344 | 29610 | 35571 | 24630 | 30180 | 30034 | 34308 |
| 90 | 2160 | 52688 | 59632 | 46259 | 52356 | 53604 | 58166 |

As can be seen from FIGS. 3, 6 and 9, the concrete made with Formulation No. 3 within the conventional form reached a maximum temperature of approximately 35° C. relatively quickly and returned to ambient temperature within approximately one day. The concrete in the conventional concrete form then fluctuated approximately 5 to 15° C. on a daily basis.

The concrete made with Formulation No. 3 within the insulated concrete form reached an internal temperature of 35° C. in slightly slower than the concrete in the conventional form. However, while the temperature of the concrete in the conventional form began to drop from its maximum temperature, the temperature of the concrete in the insulated concrete form continued to increase for a relatively long period of time (approximately 2.5 days) until it reached a maximum temperature of approximately 39° C. The internal temperature of the concrete in the insulated concrete form maintained its maximum temperature for approximately 2 days and then slowly declined until it reached ambient temperature after This test data shows greater concrete maturity, i.e. equivalent age, for the concrete cured in the insulated concrete forms compared to the same concrete formulation cured in the conventional form. For example, at day 1 Formulation No. 1 in the conventional form had a maturity or equivalent age of 656° C.-Hrs; whereas, Formulation No. 1 in the insulated form had a maturity or equivalent age of 1096° C.-Hrs or greater concrete maturity or equivalent age for the concrete in the insulated concrete form. At day 2 Formulation No. 1 in the conventional form had a maturity or equivalent age of 954° C.-Hrs; whereas, Formulation No. 1 in the insulated form had a maturity or equivalent age of 2441° C.-Hrs or 155% greater concrete maturity or equivalent age for the concrete in the insulated concrete form. At day 3 Formulation No. 1 in the conventional form had a maturity or equivalent age of 1340° C.-Hrs; whereas, Formulation No. 1 in the insulated form had a maturity or equivalent age of 3683° C.-Hrs or 174% greater concrete maturity for the concrete in the insulated concrete form. Similarly, at day 7 Formulation No. 1 in the conventional form had a maturity or equivalent age of 3524° C.-Hrs; whereas, Formulation No. 1 in the insulated form had a maturity or equivalent age of 7589° C.-Hrs or 115% greater concrete maturity or equivalent age for the concrete in the insulated concrete form. At day 28 Formulation No. 1 in the conventional form had a maturity or equivalent age of 13987° C.-Hrs; whereas, Formulation No. 1 in the insulated form had a maturity or equivalent age of 19620° C.-Hrs or 40% greater concrete maturity for the concrete in the insulated concrete form. At day 90 Formulation No. 1 in the conventional form had a maturity or equivalent age of 52,688° C.-Hrs; whereas, Formulation No. 1 in the insulated form had a maturity or equivalent age of 59632° C.-Hrs or 13% greater concrete maturity or equivalent age for the concrete in the insulated concrete form.

At day 2 Formulation No. 2 in the conventional form had a maturity or equivalent age of 1060° C.-Hrs; whereas, Formulation No. 2 in the insulated form had a maturity or equivalent age of 1985° C.-Hrs or 87% greater concrete maturity for the concrete in the insulated concrete form. For example, at day 3 Formulation No. 2 in the conventional form had a maturity or equivalent age of 1600° C.-Hrs; whereas, Formulation No. 2 in the insulated form had a maturity or equivalent age of 3071° C.-Hrs or 91% greater concrete maturity for the concrete in the insulated concrete form. Similarly, at day 7 Formulation No. 2 in the conventional form had a maturity or equivalent age of 3511° C.-Hrs; whereas, Formulation No. 2 in the insulated form had a maturity or equivalent age of 6705° C.-Hrs or 90% greater concrete maturity for the concrete in the insulated concrete form. At day 28 Formulation No. 2 in the conventional form had a maturity or equivalent age of 10749° C.-Hrs; whereas, Formulation No. 2 in the insulated form had a maturity or equivalent age of 16077° C.-Hrs or 49% greater concrete maturity for the concrete in the insulated concrete form. At day 90 Formulation No. 2 in the conventional form had a maturity or equivalent age of 46259° C.-Hrs; whereas, Formulation No. 2 in the insulated form had a maturity or equivalent age of 52356° C.-Hrs or 13% greater concrete maturity for the concrete in the insulated concrete form.

At day 2 Formulation No. 3 in the conventional form had a maturity of 911° C.-Hrs; whereas, Formulation No. 3 in the insulated form had a maturity of 1606° C.-Hrs or 76% greater concrete maturity for the concrete in the insulated concrete form. For example, at day 3 Formulation No. 3 in the conventional form had a maturity of 1299° C.-Hrs; whereas, Formulation No. 3 in the insulated form had a maturity of 2535° C.-Hrs or 95% greater concrete maturity for the concrete in the insulated concrete form. Similarly, at day 7 Formulation No. 3 in the conventional form had a maturity of 3391° C.-Hrs; whereas, Formulation No. 3 in the insulated form had a maturity of 5441° C.-Hrs or 60% greater concrete maturity for the concrete in the insulated concrete form. At day 28 Formulation No. 3 in the conventional form had a maturity of 13962° C.-Hrs; whereas, Formulation No. 3 in the insulated form had a maturity of 18500° C.-Hrs or 32% greater concrete maturity for the concrete in the insulated concrete form. At day 90 Formulation No. 3 in the conventional form had a maturity of 53604° C.-Hrs; whereas, Formulation No. 3 in the insulated form had a maturity of 58166° C.-Hrs or 8% greater concrete maturity for the concrete in the insulated concrete form.

Example 3

In accordance with ASTM 42, cored samples of the concrete from each different form described above in Example 2 were cored and tested by an independent testing laboratory for determining compressive strength. The cored samples of the concrete were tested at 9 days, 28 days, 58 days, 90 days and 14 months. A summary of this test data is shown below in Table 3 below.

TABLE 3

| Formulation No. | Form Type | Compressive Strength (psi) | | | | |
|---|---|---|---|---|---|---|
| | | 9 Days | 28 Days | 58 Days | 90 Days | 14 Months |
| 1 | Insulated | 6,180 | 6,610 | 6,860 | 6,890 | 7,980 |
|   | Conventional | 3,240 | 4,660 | 5,640 | 6,190 | 6,810 |
| 2 | Insulated | 1,790 | 2,170 | 1,780 | 4,570 | 3,460 |
|   | Conventional | 660 | 1,190 | 2,120 | 2,090 | 2,180 |
| 3 | Insulated | 5,080 | 5,880 | 6,230 | 6,640 | 7,520 |
|   | Conventional | 1,470 | 3,930 | 4,850 | 5,635 | 5,830 |

The test data shown in Table 5 above surprisingly and unexpectedly shows that the formulations cured in insulated concrete forms achieved greater strength, and particularly higher early concrete strength, than the same concrete cured in conventional forms. Specifically, at day 9 Formulation No. 1 had 191% higher compressive strength in the insulated concrete form compared to Formulation No. 1 in the conventional concrete form. At day 9 Formulation 2 had 271% higher compressive strength in the insulated concrete form compared to Formulation No. 2 in the conventional concrete form. And, at day 9 Formulation 3 had 245% higher compressive strength in the insulated concrete form compared to Formulation No. 3 in the conventional concrete form.

At day 28, Formulation No. 1 had 90% higher compressive strength in the insulated concrete form compared to Formulation No. 1 in the conventional concrete form. At day 28, Formulation No. 2 had 82% higher compressive strength in the insulated concrete form compared to Formulation No. 2 in the conventional concrete form. And, at day 28, Formulation No. 3 had 49% higher compressive strength in the insulated concrete form compared to Formulation No. 3 in the conventional concrete form.

At day 58, Formulation No. 1 had 21% higher compressive strength in the insulated concrete form compared to Formulation No. 1 in the conventional concrete form. At day 58, Formulation No. 2 is an anomaly due to air voids in the concrete. And, at day 58, Formulation No. 3 had 28% higher compressive strength in the insulated concrete form compared to Formulation No. 3 in the conventional concrete form.

At day 90, Formulation No. 1 had 11% higher compressive strength in the insulated concrete form compared to Formulation No. 1 in the conventional concrete form. At day 90, Formulation No. 2 had 118% higher compressive strength in the insulated concrete form compared to Formulation No. 2 in the conventional concrete form. And, at day 90, Formulation No. 3 had 17% higher compressive strength in the insulated concrete form compared to Formulation No. 3 in the conventional concrete form.

At 14 months, Formulation No. 1 had 17% higher compressive strength in the insulated concrete form compared to Formulation No. 1 in the conventional concrete form. At 1 year, Formulation No. 2 had 58% higher compressive strength in the insulated concrete form compared to Formulation No. 2 in the conventional concrete form. And, at 1 year, Formulation No. 3 had 28% higher compressive strength in the insulated concrete form compared to Formulation No. 3 in the conventional concrete form.

Example 4

Sample test cylinders of each of the three concrete formulation listed in Example 1 above were prepared by an independent, accredited concrete testing laboratory, cured under laboratory conditions and tested for compressive strength according to ASTM C-39. Each of these test cylinders was prepared from the same concrete batch placed respectively in each of the test panel forms discussed above in Examples 2 and 3. A summary of this test data is shown below in Table 4 below, in addition to the numerous testing cylinders used for testing compressive strength at various points in time, for each of the three concrete formulations two cylinders were fitted each with an Intellirock II™ maturity/temperature loggers and cured with the testing cylinders. Therefore, all cylinders were made and cured under the same conditions. At each point in time two cylinders were tested for compressive strength and the results were averaged.

TABLE 4

ASTM C-39 Lab Curing and Testing: Compressive Strength

| Testing Age | | Formulation 1 (540 lbs OPC, 120 lbs FA) | | Formulation 2 (325 lbs OPC, 325 lbs FA) | | Formulation 3 (220 lbs OPC, 215 lbs SC, 215 lbs FA) | |
|---|---|---|---|---|---|---|---|
| Age (days) | Age (hours) | Compressive Strength (psi) | Average Compressive Strength (psi) | Compressive Strength (psi) | Average Compressive Strength (psi) | Compressive Strength (psi) | Average Compressive Strength (psi) |
| 0.33 | 8 | 290 | 300 | 140 | 140 | 0 | 0 |
| | | 310 | | 140 | | 0 | |
| 0.75 | 18 | 1190 | 1190 | 445 | 450 | 210 | 210 |
| | | 1190 | | 450 | | 210 | |
| 1 | 24 | 1190 | 1300 | 520 | 530 | 210 | 220 |
| | | 1410 | | 530 | | 220 | |
| 2 | 48 | 1760 | 1860 | 840 | 840 | 300 | 320 |
| | | 1950 | | 840 | | 330 | |
| 3 | 72 | 2560 | 2410 | 960 | 950 | 430 | 450 |
| | | 2260 | | 940 | | 470 | |
| 7 | 168 | 2800 | 2930 | 1140 | 1190 | 710 | 660 |
| | | 3060 | | 1240 | | 610 | |
| 14 | 336 | 3440 | 3370 | 1600 | 1560 | 1130 | 1100 |
| | | 3300 | | 1510 | | 1070 | |
| 28 | 672 | 5630 | 5555 | 2210 | 2180 | 3700 | 3830 |
| | | 5480 | | 2150 | | 3960 | |
| 56 | 1344 | 6010 | 5960 | 3050 | 3080 | 6430 | 6530 |
| | | 5910 | | 3100 | | 6620 | |
| 90 | 2160 | 7410 | 7360 | 3780 | 3695 | 7480 | 7310 |
| | | 7310 | | 3610 | | 7140 | |

The test results in Table 4 show that the concrete formulations in accordance with the present invention have very poor early strength when cured according to ASTM C-39; i.e., at 72° F. under water. For example, at day 3, the cylinders made from Formulation No. 1 had an average compressive strength of 2410 psi. At day 3, the cylinders made from Formulation No. 22 had an average compressive strength of 950 psi. At day 3, the cylinders made from Formulation No. 3 had an average compressive strength of 450 psi, Construction practice requires that concrete have at least 2,500 psi before concrete forms can be stripped and generally the specified compressive strength at 28 days until the full designed loads can be placed on concrete structures, such as walls, column, beams, slabs, and the like, without any additional shoring or re-shoring. While concrete made with Formulation 1 achieve the specified compressive strength before 28 days, neither concrete made with formulation 2 and 3 achieved the specified strength before 28 days. In fact concrete made with Formulation 2 did not seem to achieve the 4,000 psi specified strength even at 90 days. Concrete made with Formulation Nos. 2 and 3, cured in the laboratory at 72° F. under water and tested in accordance to the ASTM C-39, achieved the necessary compressive strength required for the form to be stripped at approximately 20 to 40 days depending on the mix. Also, concrete made with Formulation Nos. 2 and 3, cured in the laboratory at 72° F. under water and tested in accordance to the ASTM C-39, achieved the 4000 psi necessary compressive strength required to allow loads to be placed upon them at approximately 40 to over 90 days depending on the mix. Based on this data, a building would take many times longer to build and the cost associated with such schedule delays waiting for concrete to gain sufficient strength would increase significantly. While concrete mixes made of Formulation 1 may generally be specified and can be used in current construction practices, concrete made of Formulation Nos. 2 and 3 are usually never specified or used in conventional construction practice. Of course, concrete made of Formulation No. 1 placed in an insulated form will have a greater maturity or equivalent age and therefore strength gain at day 3 compared with the same concrete formulation placed in a conventional form. This increase in maturity or equivalent age, and corresponding increased in strength, will help accelerate construction schedules and it will replace additional costly additive used to otherwise achieve the same strength when placed in a state of the art form (conventional/non-insulated) used in current construction practice. These tests clearly demonstrate why the concrete formulations of the present invention, especially Formulation Nos. 2 and 3, are not often, if ever, used in current construction practice.

Example 5

The concrete maturity for each of the three concrete formulation test cylinders cured according to ASTM C-39 as shown in Example 4 above was measured by the Intellirock II™ maturity/temperature loggers. A summary of this test data is shown below in Table 5 below.

TABLE 5

ASTM C-39 Lab Curing and Testing: Concrete Maturity (° C.-Hrs)

| Maturity Age | | Formulation No. 1 (540 lbs OPC, 120 lbs FA) | | Formulation No. 2 (325 lbs OPC, 325 lbs FA) | | Formulation No. 3 (220 lbs PC, 215 lbs SC, 215 lbs FA) | |
|---|---|---|---|---|---|---|---|
| Age (days) | Age (hours) | Temp. ° C. | Maturity ° C.-Hrs | Temp. ° C. | Maturity ° C.-Hrs | Temp. ° C. | Maturity ° C.-Hrs |
| 0.33 | 8 | 32 | 218.5 | 28 | 205.5 | 26 | 199 |
| 0.75 | 18 | 22.5 | 495.5 | 22.5 | 459.5 | 22 | 464.5 |
| 1 | 24 | 21.5 | 623 | 21 | 586.5 | 21 | 570 |
| 2 | 48 | 18.5 | 1070.5 | 21.5 | 1091.5 | 19 | 1018.5 |
| 3 | 72 | 19 | 1523.5 | 21.5 | 1615.5 | 19 | 1474 |
| 7 | 168 | 17.5 | 3263.5 | 21 | 3570.5 | 18 | 3220 |
| 14 | 336 | 14 | 5918.5 | 21 | 7050 | 14 | 5882.5 |
| 28 | 672 | 23 | 13544.5 | 23 | 14277 | 23 | 13485 |
| 56 | 1344 | 24 | 29422.5 | 21 | 29117 | 24 | 29279 |
| 90 | 2160 | 22.5 | 48615 | 21 | 46671.5 | 22 | 48429 |

A comparison of the maturity, or the equivalent age, of three concrete formulations cured in the test cylinders according to ASTM C-39 and the maturity of the three concrete formulations cured in the insulated concrete form, shown in Example 2 above, dramatically demonstrate that the concrete cured in the insulated concrete form matured or aged much faster. For example, at day 3 for Formulation No. 1 the ASTM C-39 cylinder had a maturity, or equivalent age, of 1523.5° C.-Hrs; whereas, Formulation No. 1 in the insulated concrete form had a maturity, or equivalent age, of 3683° C.-Hrs (Table 2). At day 3 for Formulation No. 2 the ASTM C-39 cylinder had a maturity, or equivalent age, of 1615.5° C.-Hrs; whereas, Formulation No. 2 in the insulated concrete form had a maturity, or equivalent age, of 3071° C.-Hrs (Table 2). At day 3 for Formulation No. 3 the ASTM C-39 cylinder had a maturity, or equivalent age, of 1474° C.-Hrs; whereas, Formulation No. 3 in the insulated concrete form had a maturity, or equivalent age, of 2535° C.-Hrs (Table 2). Similarly, at day 7 for Formulation No. 1 the ASTM C-39 cylinder had a maturity, or equivalent age, of 3263.5° C.-Hrs; whereas, Formulation No. 1 in the insulated concrete form had a maturity, or equivalent age, of 7589° C.-Hrs (Table 2). At day 7 for Formulation No. 2 the ASTM C-39 cylinder had a maturity, or equivalent age, of 3570.5° C.-Hrs; whereas, Formulation No. 2 in the insulated concrete form had a maturity, or equivalent age, of 6705° C.-Hrs (Table 2). At day 7 for Formulation No. 3 the ASTM C-39 cylinder had a maturity, or equivalent age, of 3220° C.-Hrs; whereas, Formulation No. 3 in the insulated concrete form had a maturity, or equivalent age, of 5441° C.-Hrs (Table 2). Clearly, the insulated concrete form in accordance with the present invention accelerates the concrete curing process. This accelerated concrete curing or aging is believed to be caused by, inter alia, retaining the heat of hydration through the use of an insulated concrete form. The use of insulated concrete forms thus makes it practical to use concrete mixes and formulations using substantial amounts of recycled supplementary cementitious materials, such as fly ash and slag cement, while still being able to cure and achieve compressive strengths demanded by current construction projects and schedules which otherwise could not be obtained using state of the art concrete forms (i.e., conventional/non-insulated). Based on this data, a building would take many times longer to build and the cost associated with the schedule delays waiting for concrete to gain strength would increase significantly. While concrete mixes made of Formulation No. 1 may generally be specified and can be used in current construction practices, concrete made of Formulation Nos. 2 and 3 are never specified or used in current construction practices. Of course, concrete made of Formulation No. 1 placed in an insulated form will have a greater maturity or equivalent age and therefore strength gain at day 3 compared with the same concrete formulation placed in a conventional form. This increase in maturity or equivalent age, and corresponding increased in strength, will help accelerate construction schedules and it will replace additional costly additive used to otherwise achieve the same strength when placed in a state of the art form (conventional/non-insulated) used in current construction practice. These tests clearly demonstrate why the concrete formulations of the present invention, especially Formulation Nos. 2 and 3, are not often, if ever, used in current construction practice.

Example 6

Six vertical concrete forms were set up side-by-side to form vertical wall sections. The forms were erected outside and were subjected to ambient weather and temperature conditions. Three forms were conventional 4 feet×8 feet plywood forms. These forms were set for an eight-inch thick wall section. The other three forms were insulated concrete forms (i.e., Greencraft form). Each insulated concrete form was made from two 4 feet×8 feet panels of expanded polystyrene foam spaced eight inches from each other. The bottom and the sides of the forms were also insulated with expanded polystyrene foam and the top of the form was covered with the same amount of expanded polystyrene foam once the concrete was placed in the form. Three different concrete mixes were prepared. The concrete mixes employed three different cement formulations but were otherwise similar. No concrete additives of any kind were used in any of these formulations, except a water-reducing superplasticizer admixture. The three cement formulations are shown in Table 1 above. Ambient temperatures for this test were seasonally higher for this test than the test reported in Examples 2 and 3 above.

Concrete made with Formulation No. 1 was placed in both a vertical conventional form and a vertical insulated concrete form. Similarly, concrete made with Formulation No. 2 was placed in both a conventional form and an insulated concrete form. And, concrete made with Formulation No. 3 was placed in both a conventional form and an insulated concrete form.

Each concrete form was fitted with a temperature sensor with an internal memory and microchip placed at approximately the middle of the eight-inch concrete receiving space defined by the form and approximately four feet from the bottom of the form. Another temperature sensor was placed outside the form to record ambient temperatures adjacent the forms out of direct sunlight. The concrete temperature sensors were Intellirock II™ maturity/temperature loggers from Engius, LLC of Stillwater, Okla. The internal temperature of the concrete and the calculated maturity values (° C. Hrs) within each form was logged every hour for 90 days.

Figure 10:
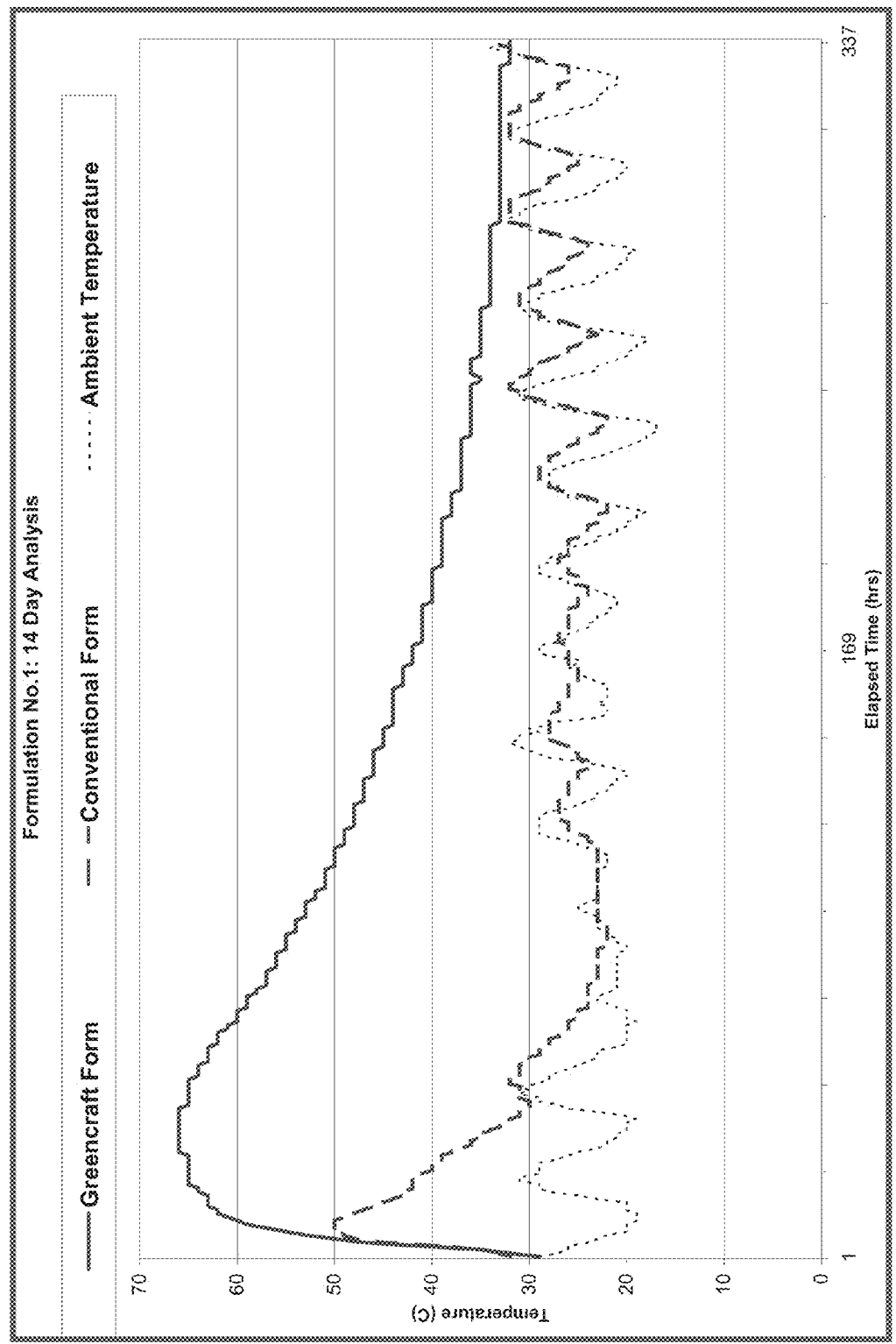
FIG. 10 is a graph of the internal concrete temperature of concrete having a cement mixture of approximately 540 lbs of portland cement (approximately 80% by weight) and 120 of lbs of fly ash (approximately 20% by weight) per cubic yard of concrete. The graph shows the internal temperature of this concrete in both a vertical insulated concrete form (i.e., a Greencraft form) and a conventional vertical form over a 14-day period.
Figure 13:
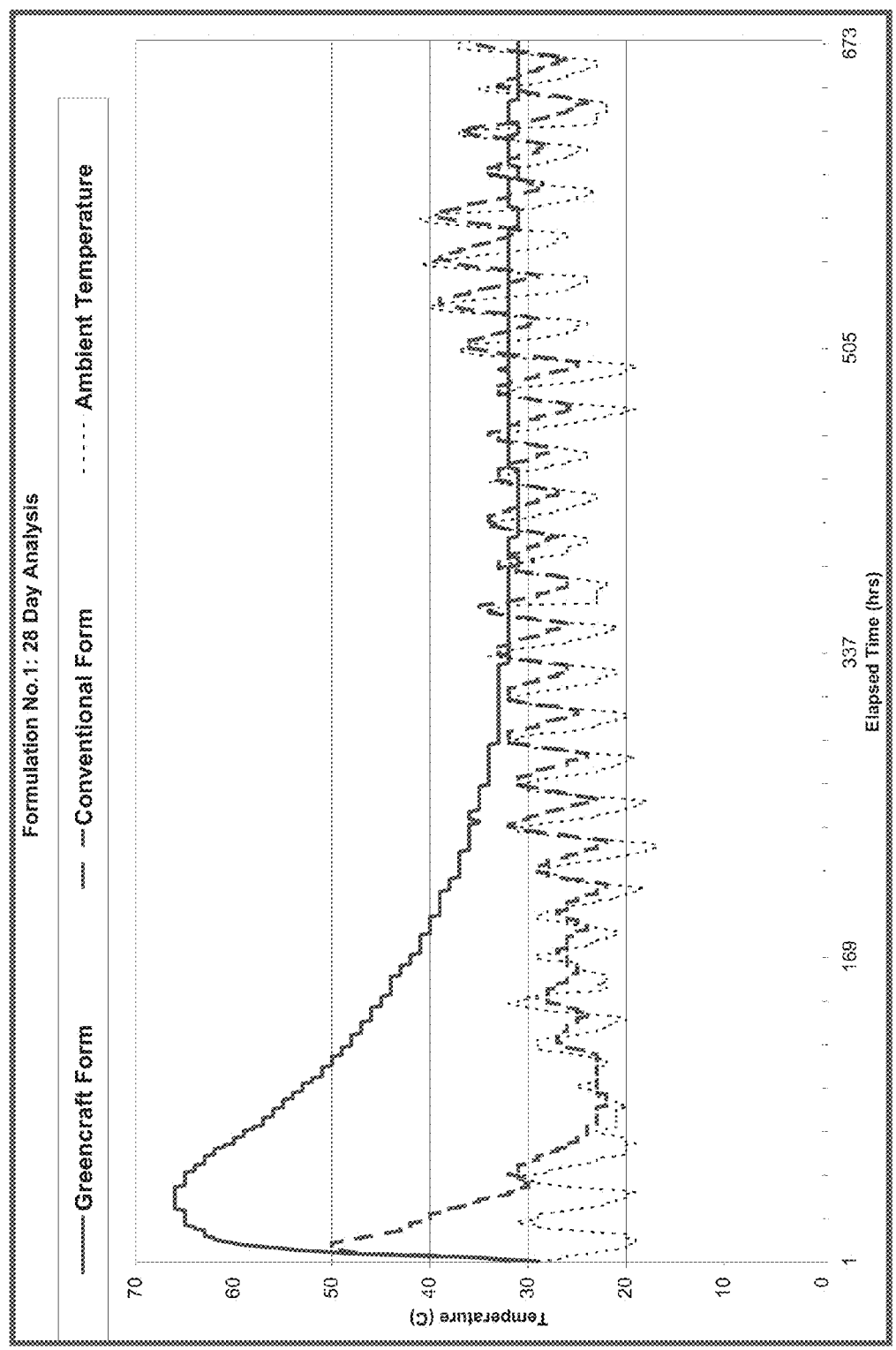
FIG. 13 is a graph of the internal concrete temperature of concrete having a cement mixture of approximately 540 lbs of portland cement (approximately 80% by weight) and 120 of lbs of fly ash (approximately 20% by weight) per cubic yard of concrete. The graph shows the internal temperature of this concrete in both a vertical insulated concrete form (i.e., a Greencraft form) and a conventional vertical form over a 28-day period.
Figure 16:
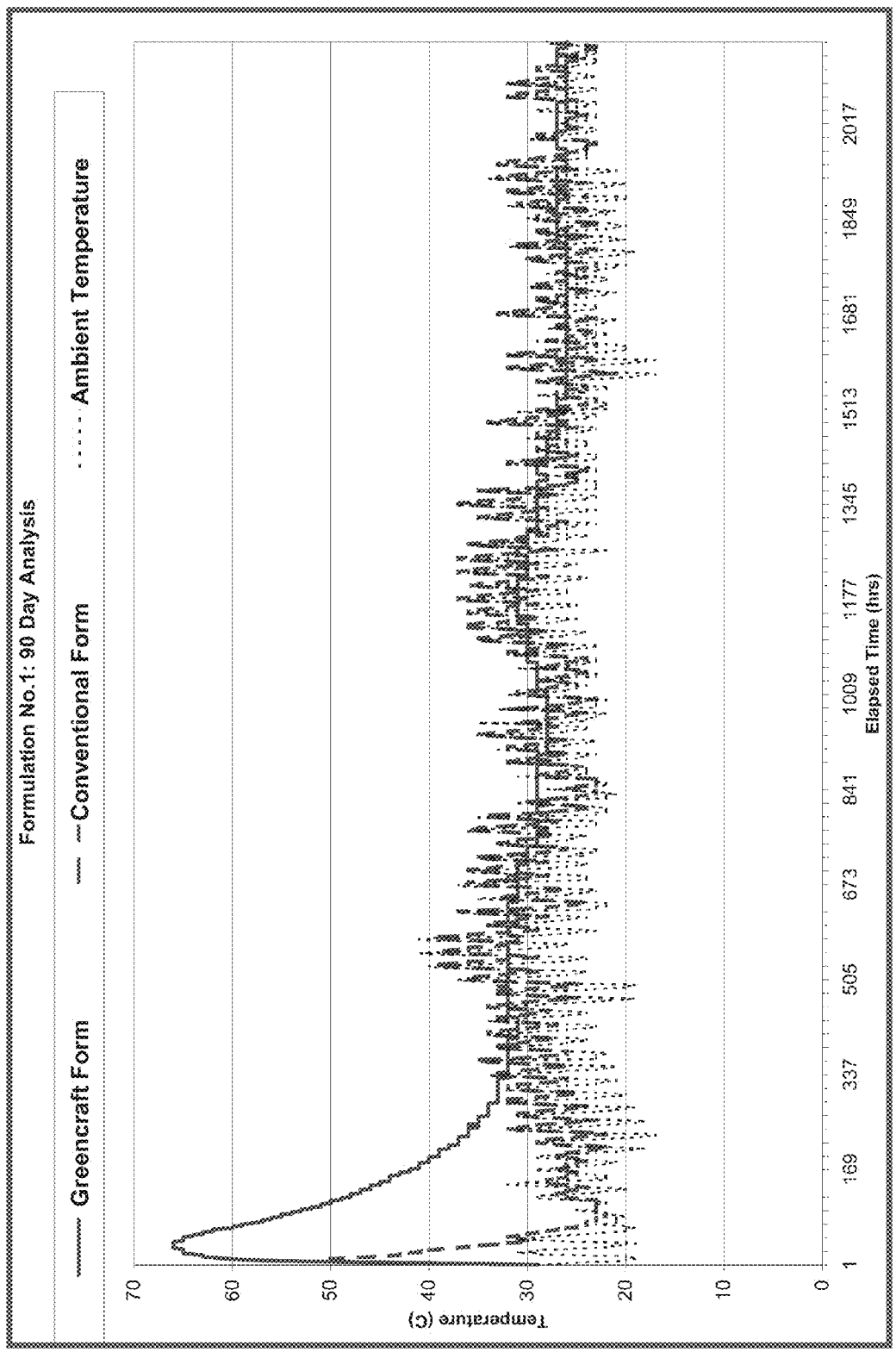
FIG. 16 is a graph of the internal concrete temperature of concrete having a cement mixture of approximately 540 lbs of portland cement (approximately 80% by weight) and 120 of lbs of fly ash (approximately 20% by weight) per cubic yard of concrete. The graph shows the internal temperature of this concrete in both a vertical insulated concrete form (i.e., a Greencraft form) and a conventional vertical form over a 90-day period.

FIGS. 10, 13 and 16 are graphs of the internal concrete temperature of Formulation No. 1 in both a vertical conventional concrete form and a vertical insulated concrete form, as described above, over 14 day, 28 day and 90 day periods, respectively. The ambient temperature is also shown on the graph.

As can be seen from FIGS. 10, 13 and 16, the concrete made with Formulation No. 1 within the conventional form reached a maximum temperature of approximately 50° C. on day 1 and returned to ambient temperature at the end of day 2. The concrete in the conventional concrete form then fluctuated from approximately 2 to 10° C. on a daily basis closely tracking the change in ambient temperature for the entire 90-day test period.

The concrete made with Formulation No. 1 within the horizontal insulated concrete form reached an internal temperature of approximately 67° C. over a period of about 24 hours. However, while the temperature of the concrete in the conventional form began to drop from its maximum temperature, the temperature of the concrete in the insulated concrete form maintained a higher temperature for a relatively long period of time (approximately 2 days). The internal temperature of the concrete in the insulated concrete form then slowly declined until it reached ambient temperature after approximately 14 days. For the remained of the 90 day test period, the internal temperature of the concrete in the insulated concrete form fluctuated little.

Figure 11:
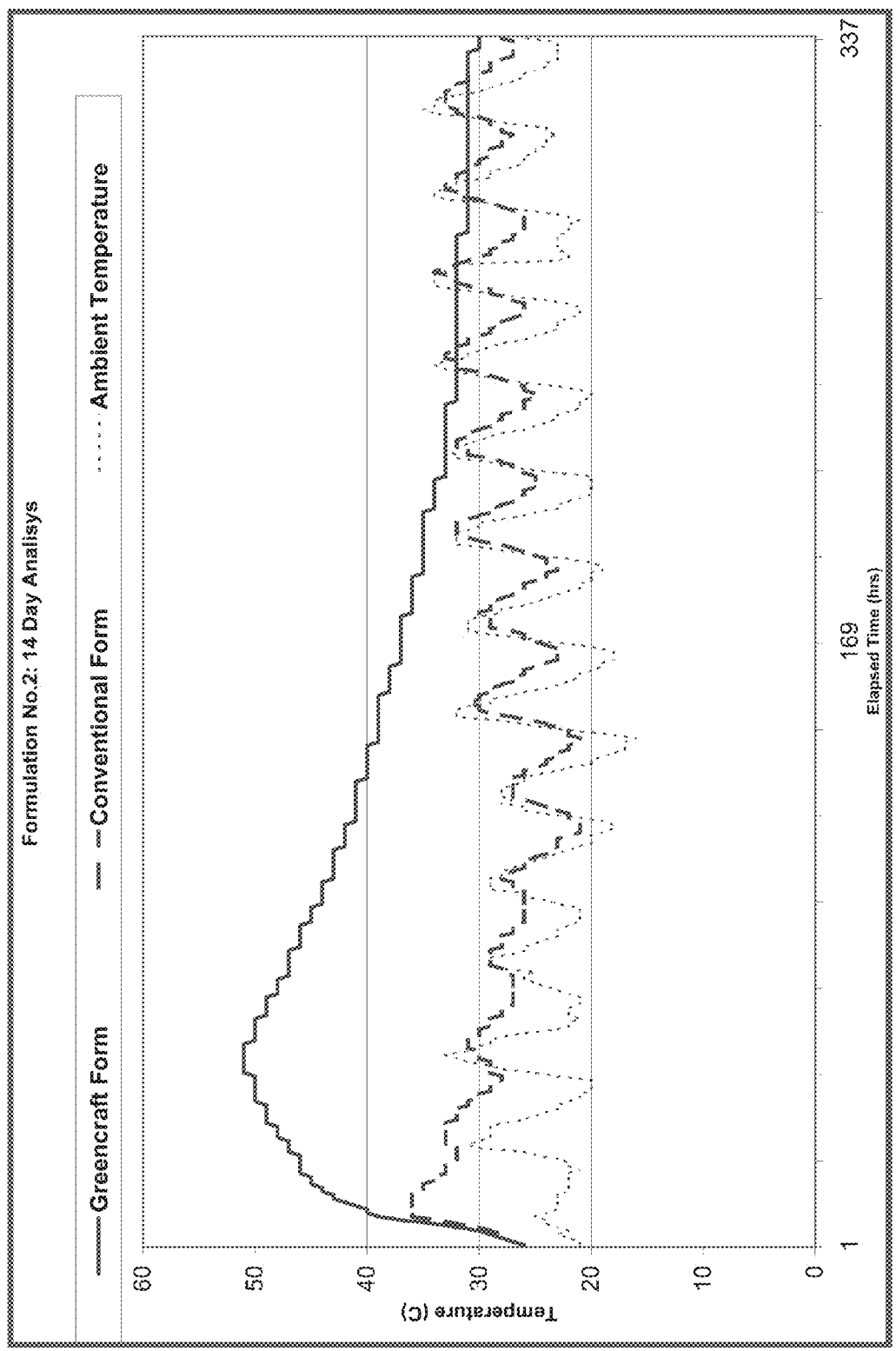
FIG. 11 is a graph of the internal concrete temperature of concrete having a cement mixture of approximately 325 lbs of portland cement (50% by weight) and 325 of lbs of fly ash (50% by weight) per cubic yard of concrete. The graph shows the internal temperature of this concrete in both a vertical insulated concrete form (i.e., a Greencraft form) and a vertical conventional form over a 14-day period.
Figure 14:
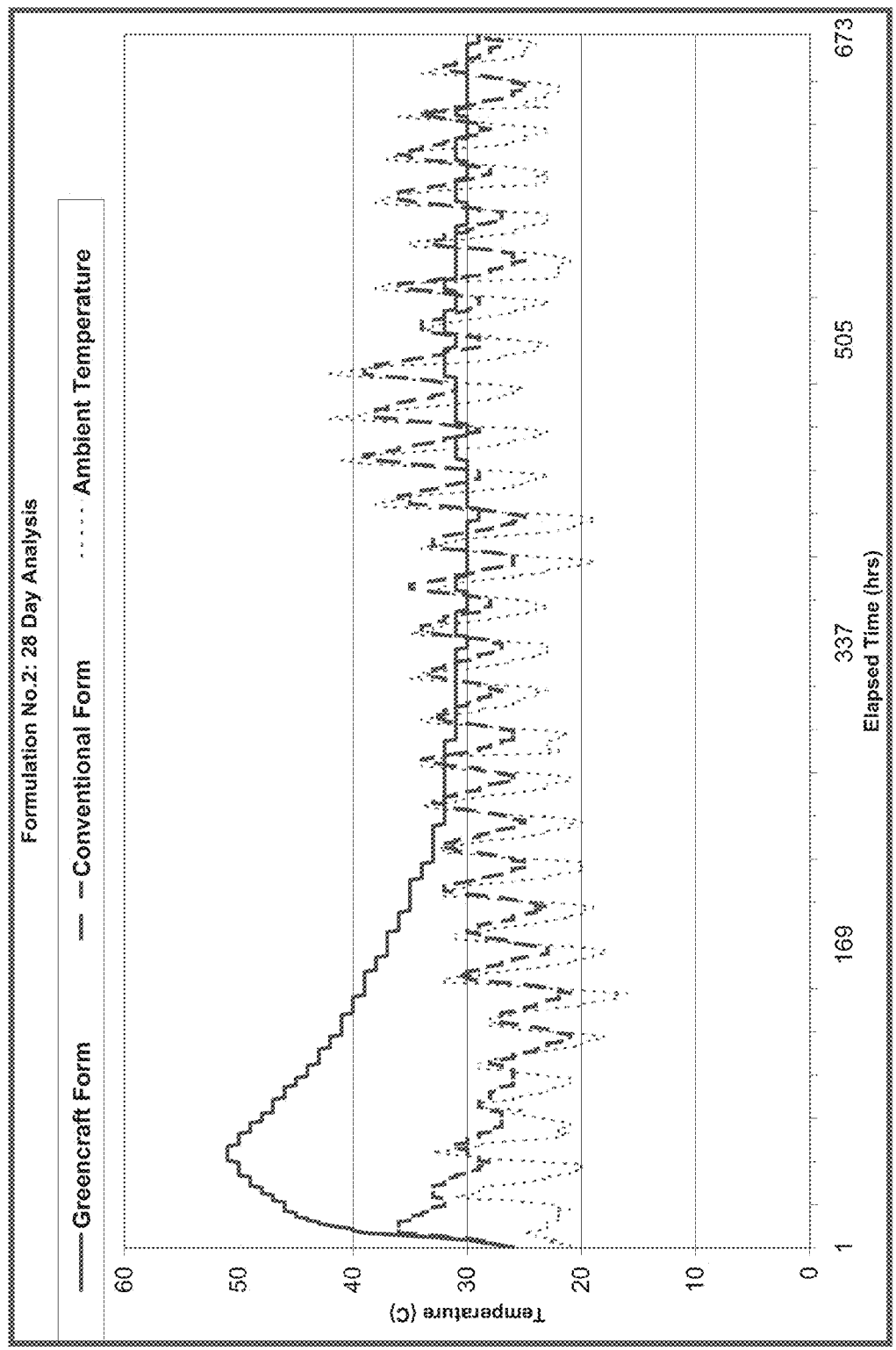
FIG. 14 is a graph of the internal concrete temperature of concrete having a cement mixture of approximately 325 lbs of portland cement (50% by weight) and 325 of lbs of fly ash (50% by weight) per cubic yard of concrete. The graph shows the internal temperature of this concrete in both a vertical insulated concrete form (i.e., a Greencraft form) and a vertical conventional form over a 28-day period.
Figure 17:
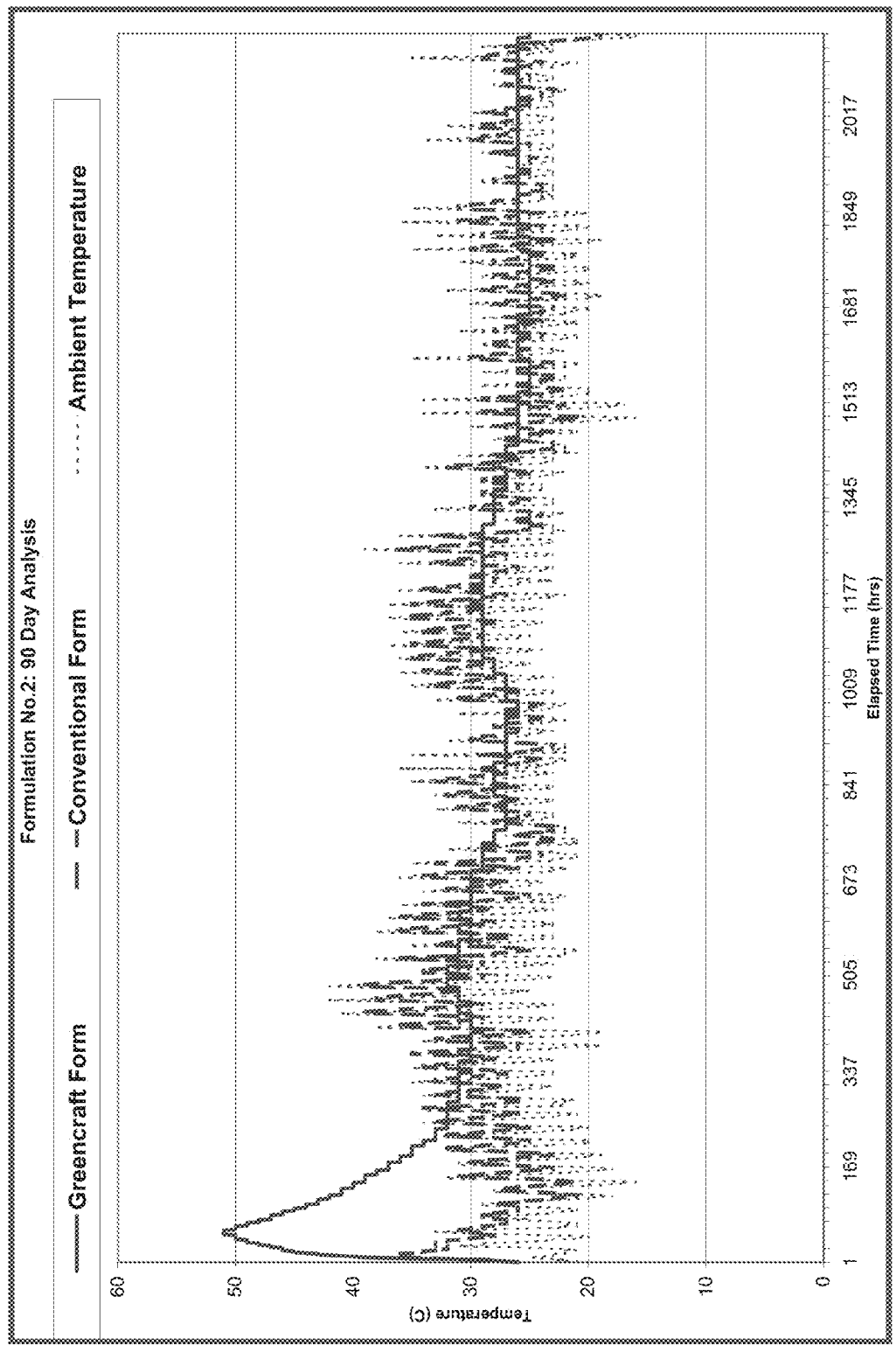
FIG. 17 is a graph of the internal concrete temperature of concrete having a cement mixture of approximately 325 lbs of portland cement (50% by weight) and 325 of lbs of fly ash (50% by weight) per cubic yard of concrete. The graph shows the internal temperature of this concrete in both a vertical insulated concrete form (i.e., a Greencraft form) and a vertical conventional form over a 90-day period.

FIGS. 11, 14 and 17 are graphs of the internal concrete temperature of the concrete made with Formulation No. 2 in both a conventional horizontal concrete form and a horizontal insulated concrete form, as described above, over 14 day, 28 day and 90 day periods, respectively. The ambient temperature is also shown on this graph.

As can be seen from FIGS. 11, 14 and 17, the concrete made with Formulation No. 2 within the conventional form reached a maximum temperature of approximately 37° C. relatively quickly and returned to approximately ambient temperature within approximately one day. The concrete in the conventional concrete form then fluctuated approximately 2 to 10° C. on a daily basis for the entire 90-day test period.

The concrete made with Formulation No. 2 within the insulated concrete form reached an internal temperature of 32° C. in about the same amount of time as the concrete in the conventional form. However, while the temperature of the concrete in the conventional form began to drop from its maximum temperature, the temperature of the concrete in the insulated concrete form continued to increase for a relatively long period of time until it reached a maximum temperature of approximately 51° C. The internal temperature of the concrete in the insulated concrete form then slowly declined until it reached ambient temperature after approximately 10 days. For the remainder of the 90-day test period, the internal temperature of the concrete in the insulated concrete form fluctuated little.

Figure 12:
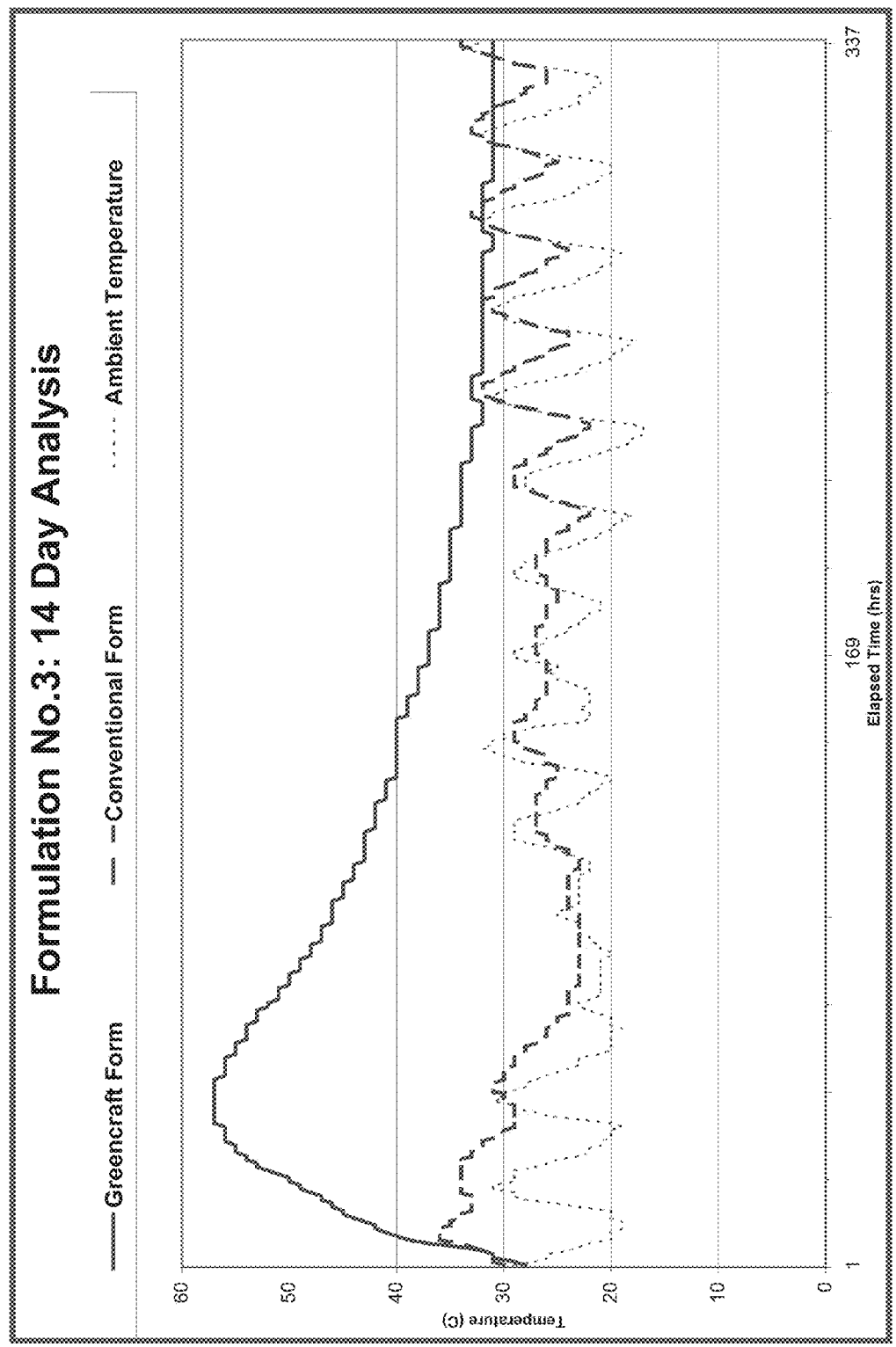
FIG. 12 is a graph of the internal concrete temperature of concrete having a cement mixture of approximately 220 lbs of portland cement (approximately 34% by weight), 215 lbs of slag cement (approximately 33% by weight) and 215 of lbs of fly ash (approximately 33% by weight) per cubic yard of concrete. The graph shows the internal temperature of this concrete in both a vertical insulated concrete form (i.e., a Greencraft form) and a vertical conventional form over a 14-day period.
Figure 15:
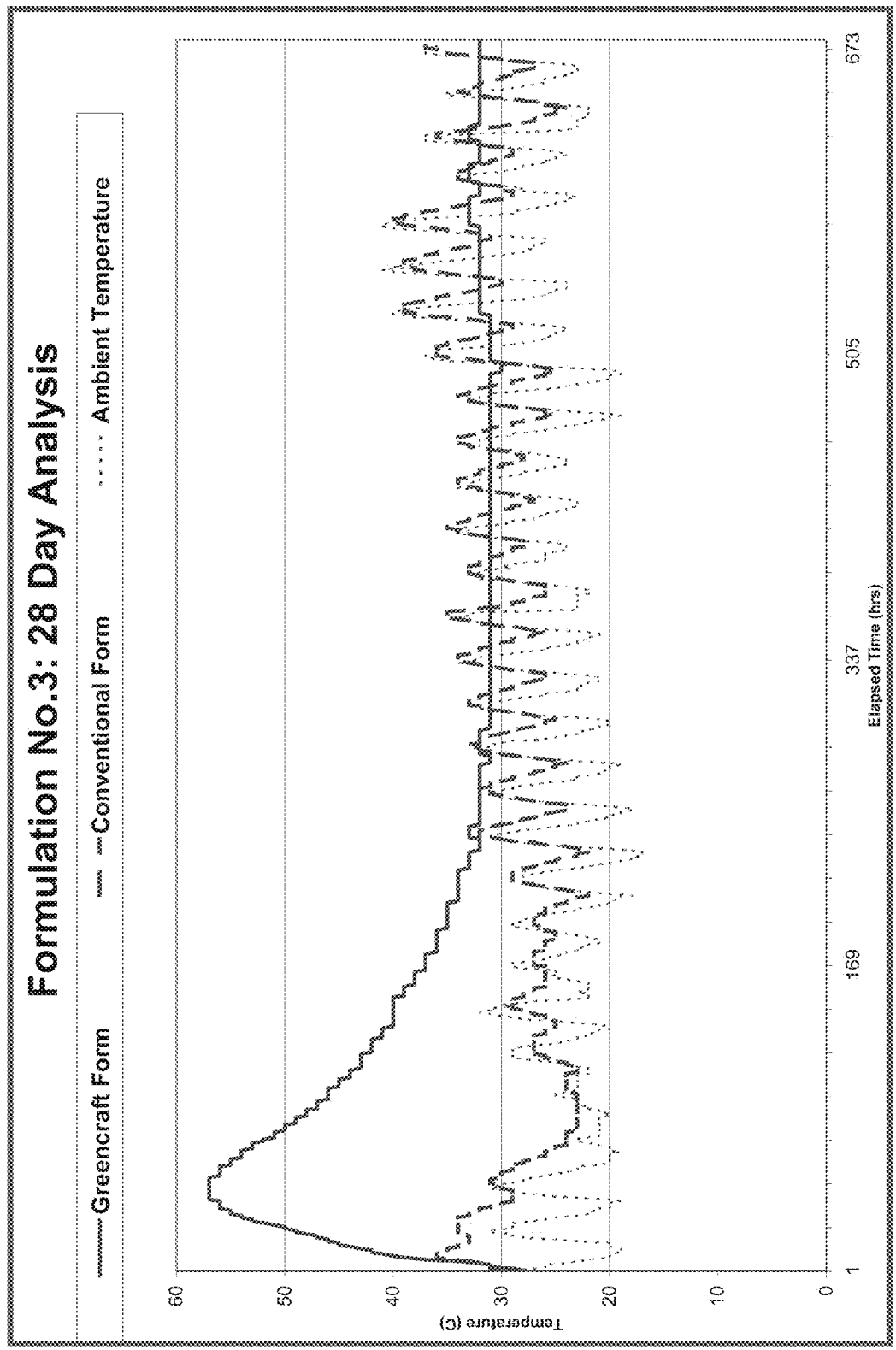
FIG. 15 is a graph of the internal concrete temperature of concrete having a cement mixture of approximately 220 lbs of portland cement (approximately 34% by weight), 215 lbs of slag cement (approximately 33% by weight) and 215 of lbs of fly ash (approximately 33% by weight) per cubic yard of concrete. The graph shows the internal temperature of this concrete in both a vertical insulated concrete form (i.e., a Greencraft form) and a vertical conventional form over a 28-day period.
Figure 18:
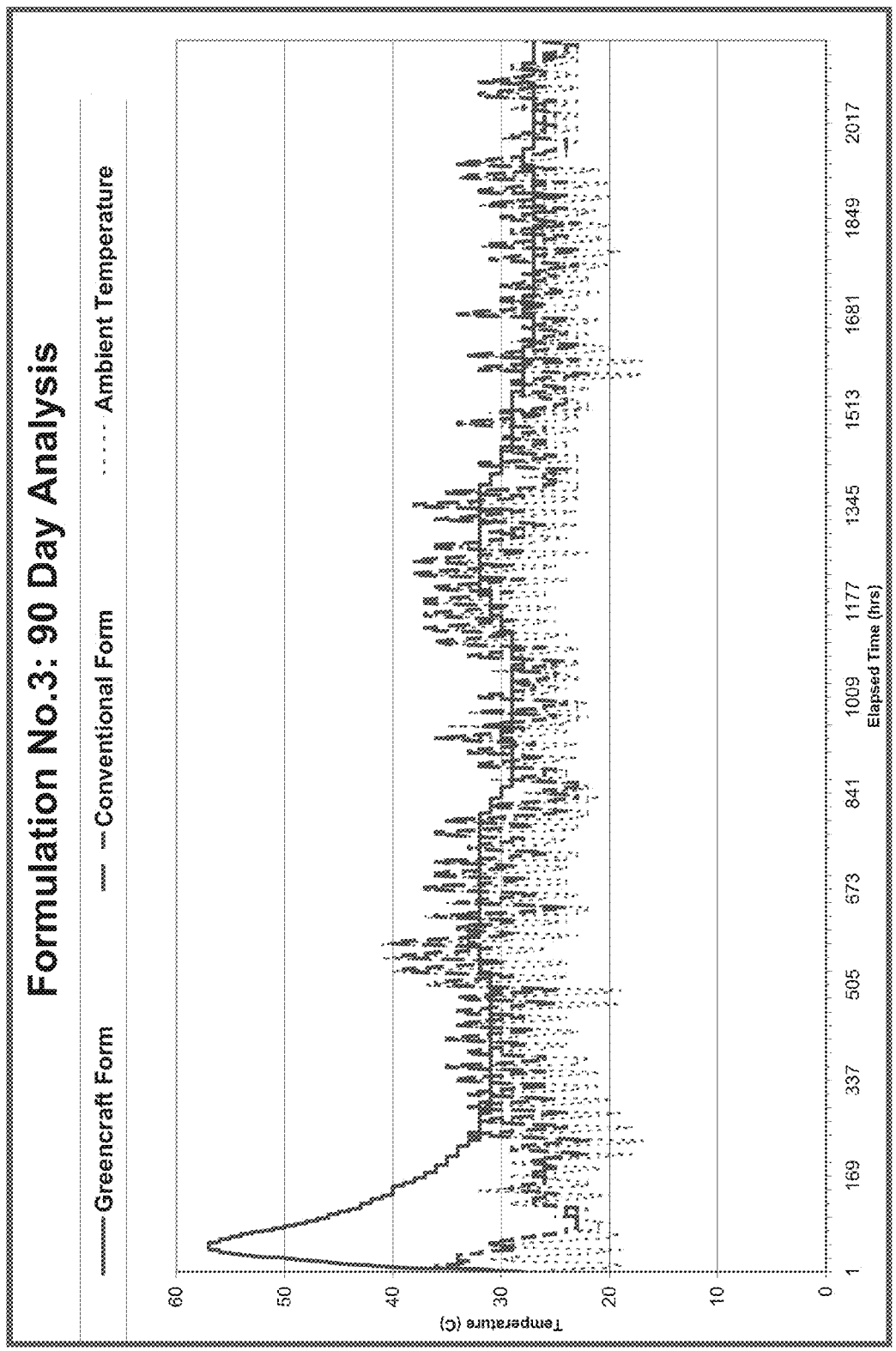
FIG. 18 is a graph of the internal concrete temperature of concrete having a cement mixture of approximately 220 lbs of portland cement (approximately 34% by weight), 215 lbs of slag cement (approximately 33% by weight) and 215 of lbs of fly ash (approximately 33% by weight) per cubic yard of concrete. The graph shows the internal temperature of this concrete in both a vertical insulated concrete form (i.e., a Greencraft form) and a vertical conventional form over a 90-day period.

FIGS. 12, 15 and 18 are graphs of the internal concrete temperature of concrete made with Formulation No. 3 in both a horizontal conventional concrete form and a horizontal insulated concrete form, as described above, over 14 day, 28 day and 90 day periods, respectively. The ambient temperature is also shown on this graph.

As can be seen from FIGS. 12, 15 and 18, the concrete made with Formulation No. 3 within the conventional form reached a maximum temperature of approximately 36° C. relatively quickly and returned to approximately ambient temperature within approximately two days. The concrete in the conventional concrete form then fluctuated approximately 2 to 10° C. on a daily basis for the remainder of the 90-day test period.

The concrete made with Formulation No. 3 within the insulated concrete form reached an internal temperature of 36° C. in about the same amount of time as the concrete in the conventional form. However, while the temperature of the concrete in the conventional form began to drop from its maximum temperature, the temperature of the concrete in the insulated concrete form continued to increase for a relatively long period of time (approximately 24 hours) until it reached a maximum temperature of approximately 58° C. The internal temperature of the concrete in the insulated concrete form then slowly declined until it reached ambient temperature after approximately 12 days. For the remained of the 90-day test period, the internal temperature of the concrete in the insulated concrete form fluctuated little.

Example 7

The concrete maturity for the six vertical wall sections identified above in Example 6 was measured by the Intellirock II™ maturity/temperature loggers. A summary of this test data is shown in Table 6 below.

TABLE 6

ASTM C-42 Vertical Forms Field Coring Conventional vs. Greencraft Forms Testing: Concrete Maturity (° C.-Hrs)

| Maturity Age | | Formulation No. 1 | | Formulation No. 2 | | Formulation No. 3 | |
|---|---|---|---|---|---|---|---|
| | | Conventional Form | Insulated Greencraft | Conventional Form | Insulated Greencraft | Conventional Form | Insulated Greencraft |
| Age (days) | Age (hours) | Maturity ° C.-Hrs | Maturity ° C.-Hrs | Maturity ° C.-Hrs | Maturity ° C.-Hrs | Maturity ° C.-Hrs | Maturity ° C.-Hrs |
| 0.33 | 8 | 340 | 370 | 244 | 256 | 261 | 267 |
| 0.75 | 18 | 807 | 990 | 599 | 683 | 604 | 705 |
| 1 | 24 | 1056 | 1379 | 796 | 958 | 807 | 996 |
| 2 | 48 | 1873 | 2952 | 1545 | 2129 | 1557 | 2325 |

TABLE 6-continued

ASTM C-42 Vertical Forms Field Coring Conventional vs. Greencraft Forms Testing:
Concrete Maturity (° C.-Hrs)

| Maturity Age | | Formulation No. 1 | | Formulation No. 2 | | Formulation No. 3 | |
|---|---|---|---|---|---|---|---|
| | | Conventional Form | Insulated Greencraft | Conventional Form | Insulated Greencraft | Conventional Form | Insulated Greencraft |
| Age (days) | Age (hours) | Maturity ° C.-Hrs | Maturity ° C.-Hrs | Maturity ° C.-Hrs | Maturity ° C.-Hrs | Maturity ° C.-Hrs | Maturity ° C.-Hrs |
| 3 | 72 | 2540 | 4434 | 2238 | 3325 | 2216 | 3640 |
| 7 | 168 | 4909 | 9133 | 4702 | 7334 | 4639 | 7776 |
| 14 | 336 | 9502 | 15131 | 9540 | 12823 | 9300 | 13288 |
| 28 | 672 | 20025 | 25785 | 20014 | 23102 | 19911 | 23877 |
| 56 | 1344 | 40049 | 45579 | 39217 | 41995 | 40286 | 44393 |
| 90 | 2160 | 62096 | 67395 | 60410 | 63119 | 62661 | 67143 |

This test data in Table 6 above shows greater concrete maturity, or equivalent age, for the concrete cured in the insulated concrete forms compared to the same concrete formulation cured in the conventional form. For example, at day 1 Formulation No. 1 in the conventional form had a maturity of 1056° C.-Hrs; whereas, Formulation No. 1 in the insulated form had a maturity of 1379° C.-Hrs or 30% greater concrete maturity for the concrete in the insulated concrete form. At day 2 Formulation No. 1 in the conventional form had a maturity of 1873° C.-Hrs; whereas, Formulation No. 1 in the insulated form had a maturity of 2952° C.-Hrs or 57% greater concrete maturity for the concrete in the insulated concrete form. At day 3 Formulation No. 1 in the conventional form had a maturity of 2540° C.-Hrs; whereas, Formulation No. 1 in the insulated form had a maturity of 4434° C.-Hrs or 74% greater concrete maturity for the concrete in the insulated concrete form. Similarly, at day 7 Formulation No. 1 in the conventional form had a maturity of 4909° C.-Hrs; whereas, Formulation No. 1 in the insulated form had a maturity of 9133° C.-Hrs or 86% greater concrete maturity for the concrete in the insulated concrete form. At day 28 Formulation No. 1 in the conventional form had a maturity of 20025° C.-Hrs; whereas, Formulation No. 1 in the insulated form had a maturity of 25785° C.-Hrs or 28% greater concrete maturity for the concrete in the insulated concrete form. At day 90 Formulation No. 1 in the conventional form had a maturity of 62096° C.-Hrs; whereas, Formulation No. 1 in the insulated form had a maturity of 67395° C.-Hrs or 8% greater concrete maturity for the concrete in the insulated concrete form.

At day 2 Formulation No. 2 in the conventional form had a maturity of 1545° C.-Hrs; whereas, Formulation No. 2 in the insulated form had a maturity of 2129° C.-Hrs or 37% greater concrete maturity for the concrete in the insulated concrete form. For example, at day 3 Formulation No. 2 in the conventional form had a maturity of 2238° C.-Hrs; whereas, Formulation No. 2 in the insulated form had a maturity of 3325° C.-Hrs or 48% greater concrete maturity for the concrete in the insulated concrete form. Similarly, at day 7 Formulation No. 2 in the conventional form had a maturity of 4702° C.-Hrs; whereas, Formulation No. 2 in the insulated form had a maturity of 7334° C.-Hrs or 56% greater concrete maturity for the concrete in the insulated concrete form. At day 28 Formulation No. 2 in the conventional form had a maturity of 20014° C.-Hrs; whereas, Formulation No. 2 in the insulated form had a maturity of 23102° C.-Hrs or 15% greater concrete maturity for the concrete in the insulated concrete form. At day 90 Formulation No. 2 in the conventional form had a maturity of 60410° C.-Hrs; whereas, Formulation No. 2 in the insulated form had a maturity of 63119° C.-Hrs or 4% greater concrete maturity for the concrete in the insulated concrete form.

At day 2 Formulation No. 3 in the conventional form had a maturity of 1557° C.-Hrs; whereas, Formulation No. 3 in the insulated form had a maturity of 2325° C.-Hrs or 49% greater concrete maturity for the concrete in the insulated concrete form. For example, at day 3 Formulation No. 3 in the conventional form had a maturity of 2216° C.-Hrs; whereas, Formulation No. 3 in the insulated form had a maturity of 3640° C.-Hrs or 64% greater concrete maturity for the concrete in the insulated concrete form. Similarly, at day 7 Formulation No. 3 in the conventional form had a maturity of 4639° C.-Hrs; whereas, Formulation No. 3 in the insulated form had a maturity of 7776° C.-Hrs or 67% greater concrete maturity for the concrete in the insulated concrete form. At day 28 Formulation No. 3 in the conventional form had a maturity of 19911° C.-Hrs; whereas, Formulation No. 3 in the insulated form had a maturity of 23877° C.-Hrs or 19% greater concrete maturity for the concrete in the insulated concrete form. At day 90 Formulation No. 3 in the conventional form had a maturity of 62661° C.-Hrs; whereas, Formulation No. 3 in the insulated form had a maturity of 67143° C.-Hrs or 7% greater concrete maturity for the concrete in the insulated concrete form.

Example 8

In accordance with ASTM 42, cored samples of the concrete from each different form described above in Example 7 were cored and tested by an independent testing laboratory for determining compressive strength according to ASTM C-42. The cored samples of the concrete were tested at 3 days, 7 days, 2.8 days and 90 days. A summary of this test data is shown below in Table 7 below.

TABLE 7

| Formulation No. | Vertical Form Type | Compressive Strength (psi) | | | |
|---|---|---|---|---|---|
| | | 3 Days | 7 Days | 28 Days | 90 Days |
| 1 | Insulated | 4,560 | 5,640 | 6,310 | 6,450 |
| | Conventional | 3,470 | 3,970 | 5,430 | 6,530 |
| 2 | Insulated | 2,660 | 3,700 | 5,080 | 5,510 |
| | Conventional | 1,320 | 1,670 | 4,300 | 5,390 |
| 3 | Insulated | 4,530 | 5,380 | 6,110 | 6,490 |
| | Conventional | 1,290 | 2,440 | 5,520 | 5,450 |

The test data from Table 7 above surprisingly and unexpectedly shows that the formulations cured in insulated concrete forms achieved greater strength, and particularly higher early concrete strength, than the same concrete cured in conventional forms. Specifically, at day 3 Formulation No. 1 had 31% higher compressive strength in the insulated concrete form compared to Formulation No. 1 in the conventional concrete form. At day 3 Formulation 2 had 101% higher compressive strength in the insulated concrete form compared to Formulation No. 2 in the conventional concrete form. And, at day 3 Formulation 3 had 251% higher compressive strength in the insulated concrete form compared to Formulation No. 3 in the conventional concrete form.

At day 7, Formulation No. 1 had 42% higher compressive strength in the insulated concrete form compared to Formulation No. 1 in the conventional concrete form. At day 7, Formulation No. 2 had 121% higher compressive strength in the insulated concrete form compared to Formulation No. 2 in the conventional concrete form. And, at day 7, Formulation No. 3 had 120% higher compressive strength in the insulated concrete form compared to Formulation No. 3 in the conventional concrete form.

At day 28, Formulation No. 1 had 16% higher compressive strength in the insulated concrete form compared to Formulation No. 1 in the conventional concrete form. At day 28, Formulation No. 2 had 18% higher compressive strength in the insulated concrete form compared to Formulation No. 2 in the conventional concrete form. And, at day 28, Formulation No. 3 had 10% higher compressive strength in the insulated concrete form compared to Formulation No. 3 in the conventional concrete form.

At day 90, the results for Formulation No. 1 appear to be an anomaly or incorrect. At day 90, Formulation No. 2 had 18% higher compressive strength in the insulated concrete form compared to Formulation No. 3 in the conventional concrete form. And, at day 90, Formulation No. 3 had 19% higher compressive strength in the insulated concrete form compared to Formulation No. 3 in the conventional concrete form.

The foregoing Examples 2 through 8 were all performed using vertical elevated concrete forms, such as are used to form vertical walls or columns. However, the present invention can also be used with horizontal forms, such as are used to form a slab on grade or a tilt-up concrete panel, or with a mold that is insulated on all sides. The following Example 9, 10 and 11 describe the present invention used in a horizontal insulated concrete form, such as for a slab on grade, as disclosed in applicant's co-pending patent application entitled "Concrete Runways, Roads, Highways And Slabs On Grade And Methods Of Making Same," Ser. No. 13/626,540 filed Sep. 25, 2012 and tilt-up precast panels, as disclosed in applicant's co-pending patent application Ser. No. 13/247,256 filed Sep. 28, 2011 (the disclosure of which are both incorporated herein by reference in their entirety). The present invention can also be used for making tilt-up concrete panels, such as disclosed in applicant's co-pending patent application Ser. No. 13/247,256 filed Sep. 28, 2011 (the disclosure of which is incorporated herein by reference in its entirety).

Example 9

Six horizontal concrete forms were set up side-by-side to form slabs on grade. The forms were erected outside, on the ground and were subjected to ambient weather and temperature conditions. Three forms were conventional 2 feet×8 feet wood forms. These forms were set for a six-inch thick slab on grade or precast such as tilt-up wall slab. Underneath each form a 6 mil polyethylene plastic sheeting was installed. Concrete placed in the conventional form was placed directly on the plastic sheeting and no covering was placed on the top surface of the concrete, except a 6 mil polyethylene plastic sheet to prevent moisture loss to the air. The other three forms were insulated concrete forms (i.e., Greencraft forms). The insulated concrete forms included conventional wood sides. However, each insulated concrete forms also included two 2 feet×8 feet panels of 4 inch thick expanded polystyrene foam. One of the expanded polystyrene foam panels was placed on the ground and formed the bottom of the form; the other expanded polystyrene foam panel was placed on the top surface of the concrete after the concrete was placed and finished and additional foam pieces were used to insulate the four sides of the 6 inch concrete slab. Thus, in the insulated concrete form, the concrete slab was insulated on the top, sides and bottom with 4 inches of expanded polystyrene foam. Ambient temperatures for this test were seasonally higher for this test than the test reported in Examples 2-3 and 6-8 above.

Three different concrete mixes were prepared; i.e., the same three formulations as shown in Example 1 above. Concrete made with Formulation No. 1 was placed in both a horizontal conventional form and a horizontal insulated concrete form. Similarly, concrete made with Formulation No. 2 was placed in both a horizontal conventional form and a horizontal insulated concrete form. And, concrete made with Formulation No. 3 was placed in both a horizontal conventional form and a horizontal insulated concrete form, as described above.

Each concrete form was fitted with a temperature sensor with an internal memory and microchip placed at approximately the middle of the six-inch concrete receiving space defined by the form and in the center of the 4 feet by 8 feet form.

Another temperature sensor was placed outside the form to record ambient temperatures adjacent the forms. The concrete temperature sensors were Intellirock II™ maturity/temperature loggers from Engius, LLC of Stillwater, Okla. The internal temperature of the concrete and calculated maturity values (° C. Hrs) within each form were logged every hour for 90 days.

Figure 19:
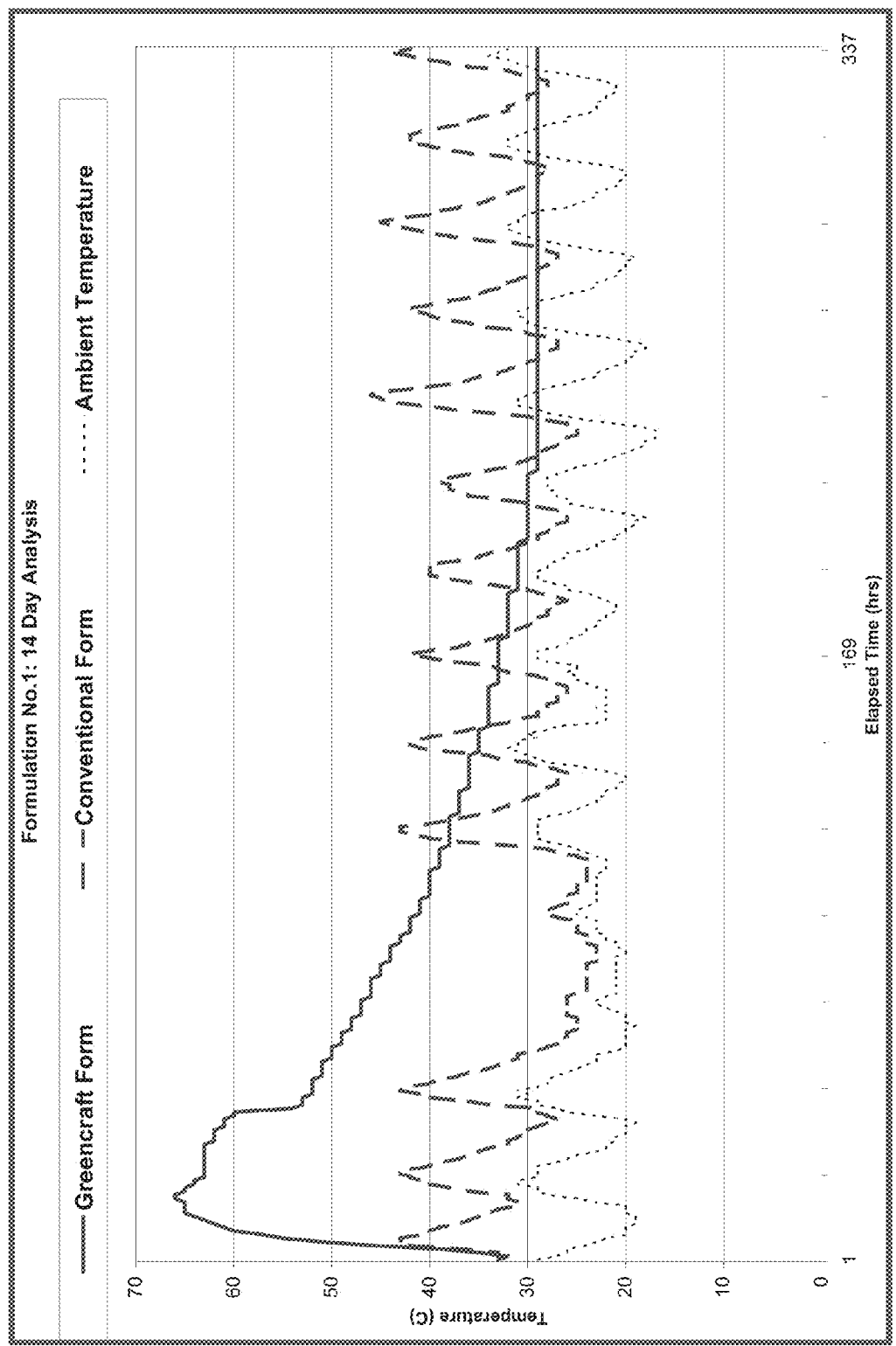
FIG. 19 is a graph of the internal concrete temperature of concrete having a cement mixture of approximately 540 lbs of portland cement (approximately 80% by weight) and 120 lbs of fly ash (approximately 20% by weight) per cubic yard of concrete. The graph shows the internal temperature of this concrete in both a horizontal insulated concrete form (i.e., a Greencraft form) and a horizontal conventional form over a 14-day period. The ambient temperature is also shown.
Figure 22:
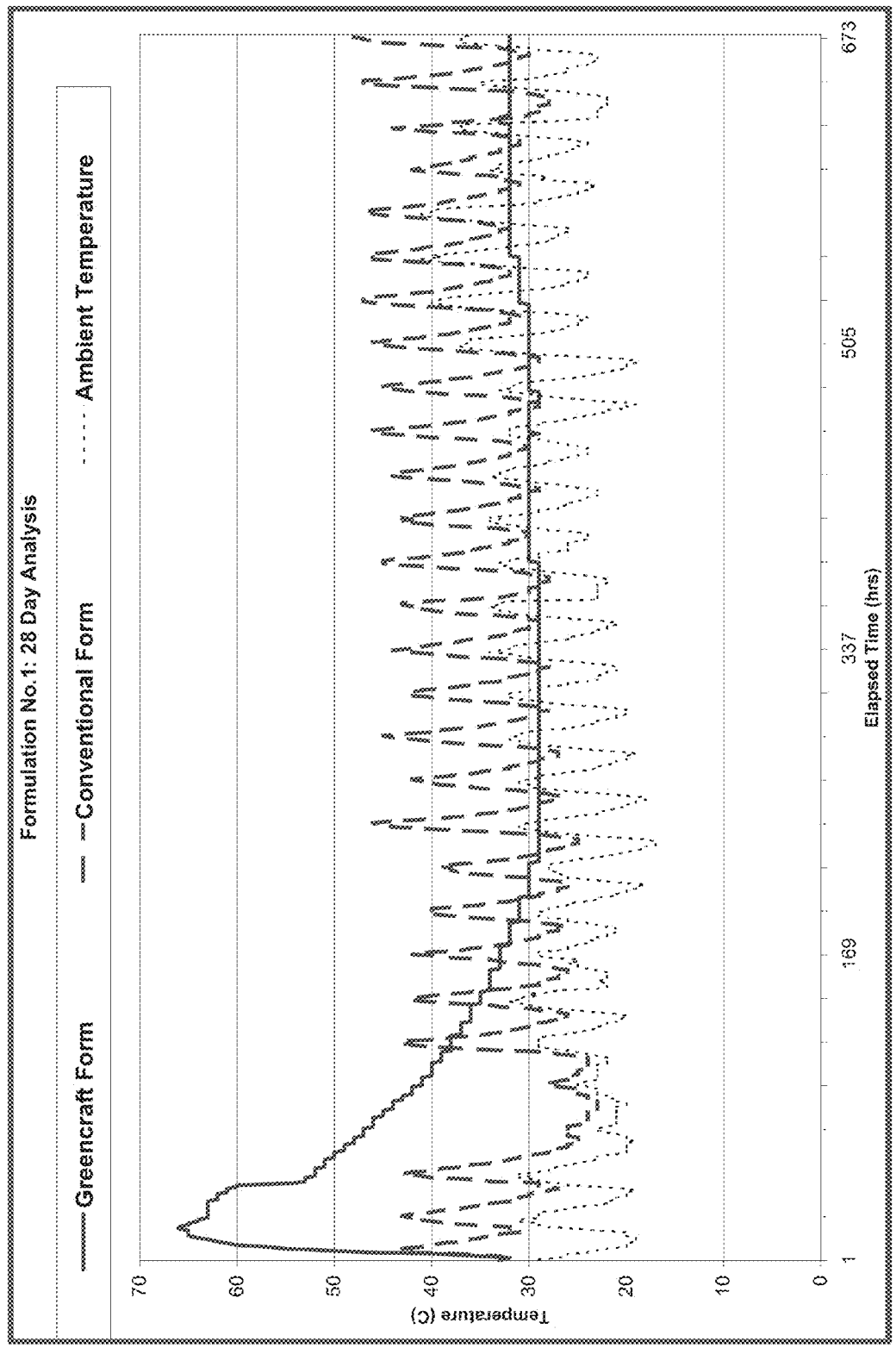
FIG. 22 is a graph of the internal concrete temperature of concrete having a cement mixture of approximately 540 lbs of portland cement (approximately 80% by weight) and 120 lbs of fly ash (approximately 20% by weight) per cubic yard of concrete. The graph shows the internal temperature of this concrete in both a horizontal insulated concrete form (i.e., a Greencraft form) and a horizontal conventional form over a 28-day period. The ambient temperature is also shown.
Figure 25:
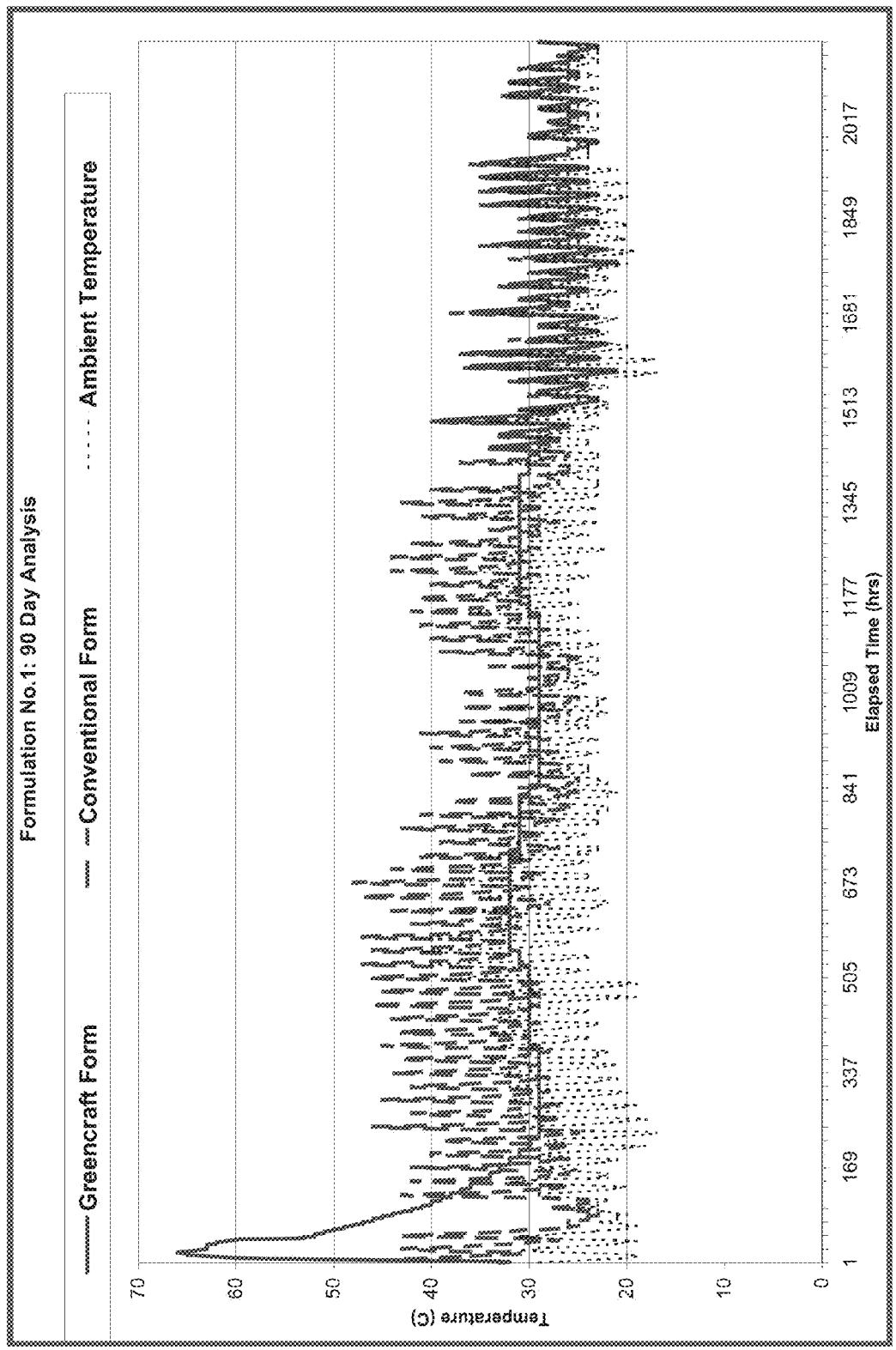
FIG. 25 is a graph of the internal concrete temperature of concrete having a cement mixture of approximately 540 lbs of portland cement (approximately 80% by weight) and 120 lbs of fly ash (approximately 20% by weight) per cubic yard of concrete. The graph shows the internal temperature of this concrete in both a horizontal insulated concrete form (i.e., a Greencraft form) and a horizontal conventional form over a 90-day period. The ambient temperature is also shown.

FIGS. 19, 22 and 25 are graphs of the internal concrete temperature of Formulation No. 1 in both a conventional horizontal concrete form and a horizontal insulated concrete form. The ambient temperature is also shown on the graph.

As can be seen from FIGS. 19, 22 and 25, the concrete made with Formulation No. 1 within the conventional form reached a maximum temperature of approximately 43° C. relatively quickly and returned to approximately ambient temperature within approximately one day. The concrete in the conventional concrete form then fluctuated approximately 3 to 20° C. on a daily basis closely tracking the change in ambient temperature.

The concrete made with Formulation No. 1 within the insulated concrete form reached an internal temperature of 43° C. in about the same amount of time as the concrete in the conventional form. However, while the temperature of the concrete in the conventional form began to drop from its maximum temperature, the temperature of the concrete in the insulated concrete form continued to increase for a relatively long period of time until it reached a maximum temperature of approximately 66° C. The internal temperature of the concrete in the insulated concrete form then slowly declined until it reached ambient temperature after approximately 10 days. For the remainder of the 90-day test period, the internal temperature of the concrete in the insulated concrete form fluctuated little.

Figure 20:
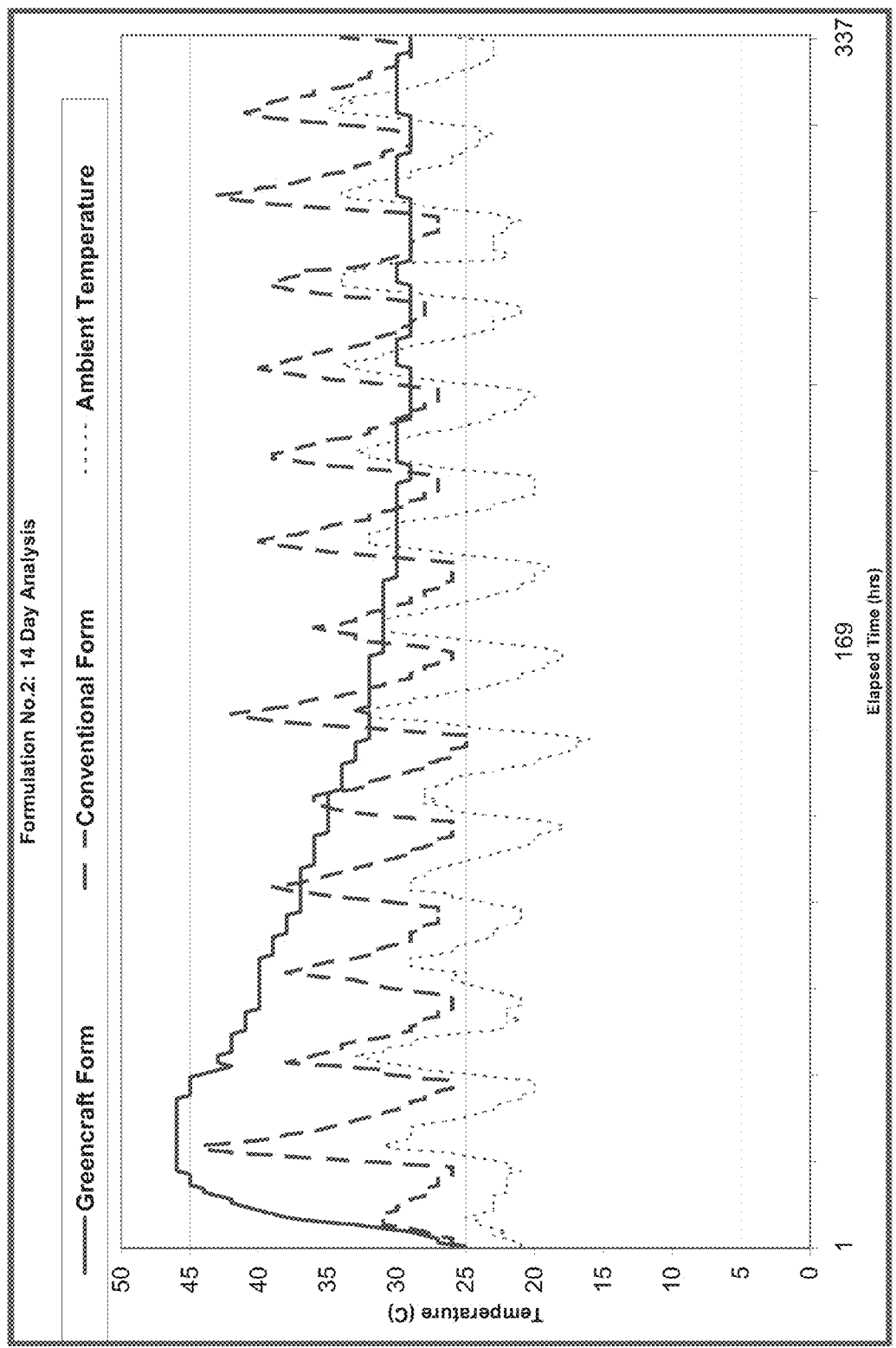
FIG. 20 is a graph of the internal concrete temperature of concrete having a cement mixture of approximately 325 lbs of portland cement (50% by weight) and 325 of lbs of fly ash (50% by weight) per cubic yard of concrete. The graph shows the internal temperature of this concrete in both a horizontal insulated concrete form (i.e., a Greencraft form) and a horizontal conventional form over a 14-day period.
Figure 23:
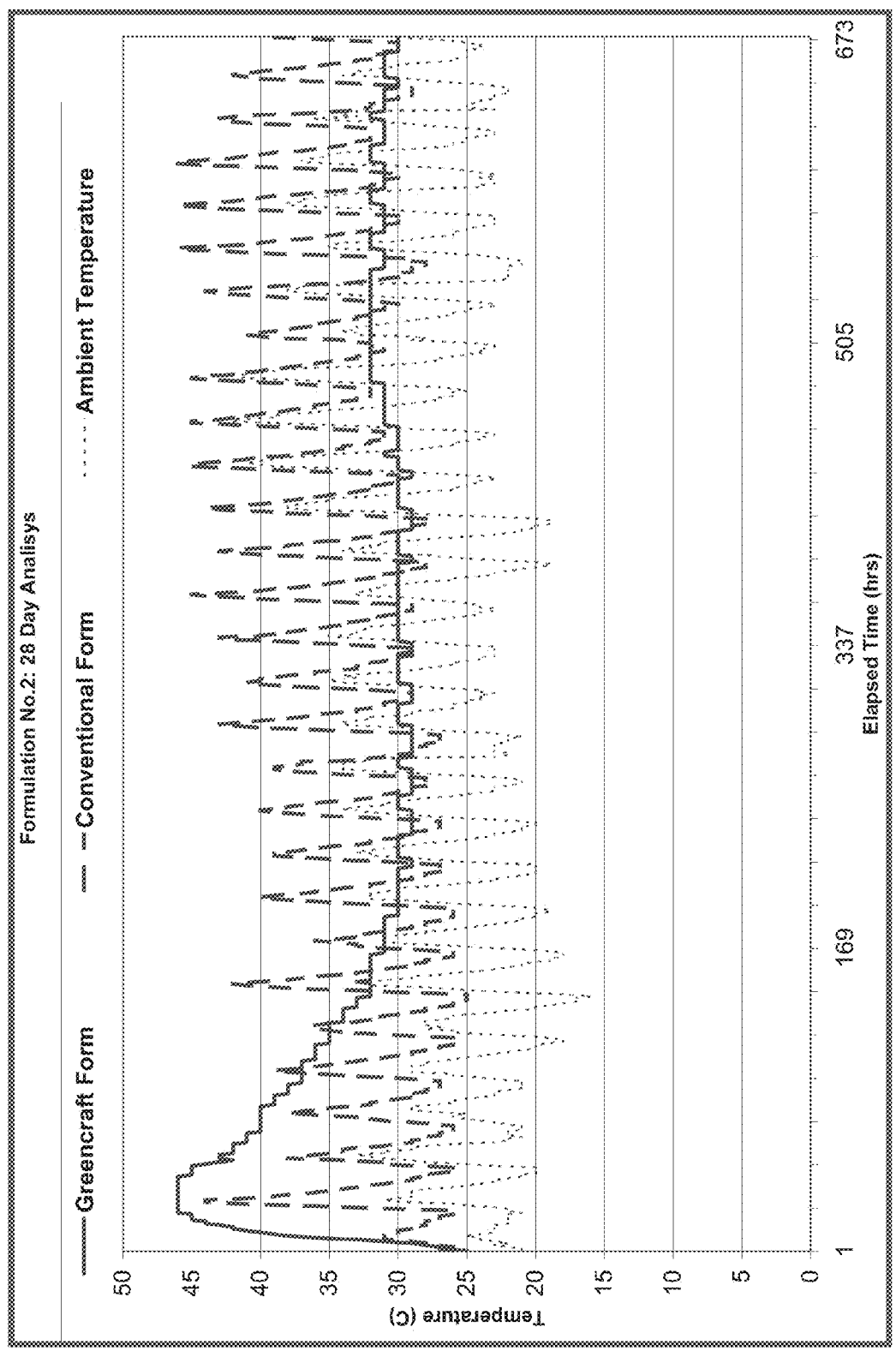
FIG. 23 is a graph of the internal concrete temperature of concrete having a cement mixture of approximately 325 lbs of portland cement (50% by weight) and 325 of lbs of fly ash (50% by weight) per cubic yard of concrete. The graph shows the internal temperature of this concrete in both a horizontal insulated concrete form (i.e., a Greencraft form) and a horizontal conventional form over a 28-day period.
Figure 26:
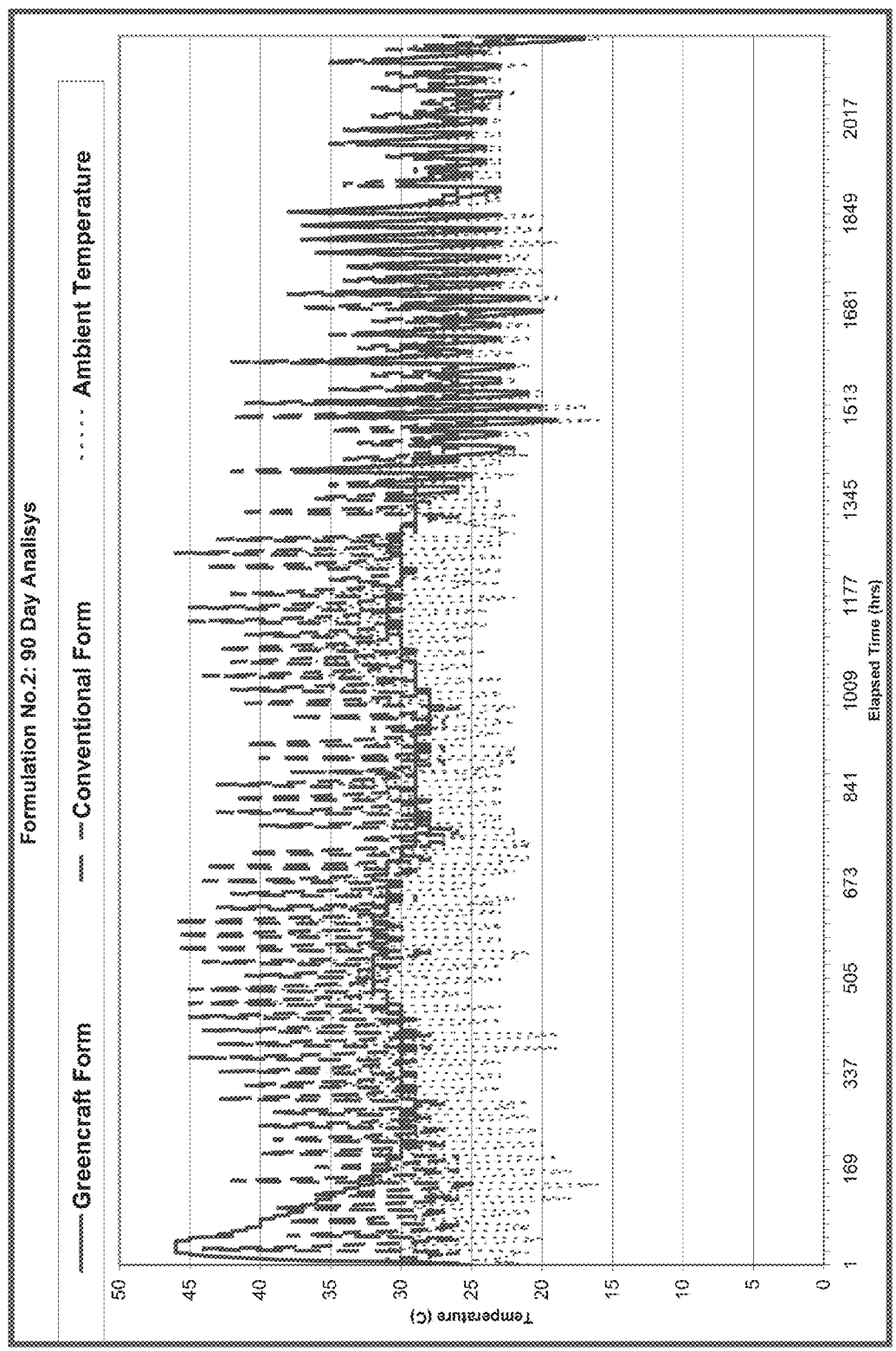
FIG. 26 is a graph of the internal concrete temperature of concrete having a cement mixture of approximately 325 lbs of portland cement (50% by weight) and 325 of lbs of fly ash (50% by weight) per cubic yard of concrete. The graph shows the internal temperature of this concrete in both a horizontal insulated concrete form (i.e., a Greencraft form) and a horizontal conventional form over a 90-day period.

FIGS. 20, 23 and 26 are graphs of the internal concrete temperature of the concrete made with Formulation No. 2 in both a conventional horizontal concrete form and a horizontal insulated concrete form in accordance with the present invention. The ambient temperature is also shown on this graph.

As can be seen from FIGS. 20, 23 and 26, the concrete made with Formulation No. 2 within the conventional form reached a maximum temperature of approximately 31° C. relatively quickly and returned to approximately ambient temperature within approximately one day. The concrete in the conventional concrete form then fluctuated approximately 5 to 18° C. on a daily basis.

The concrete made with Formulation No. 2 within the insulated concrete form reached an internal temperature of 31° C. in about the same amount of time as the concrete in the conventional form. However, while the temperature of the concrete in the conventional form began to drop from its maximum temperature, the temperature of the concrete in the insulated concrete form continued to increase for a relatively long period of time (approximately two days) until it reached a maximum temperature of approximately 46° C. The internal temperature of the concrete in the insulated concrete form then slowly declined until it reached ambient temperature after approximately 6 days. For the remainder of the 90-day test period, the internal temperature of the concrete in the insulated concrete form fluctuated little.

Figure 21:
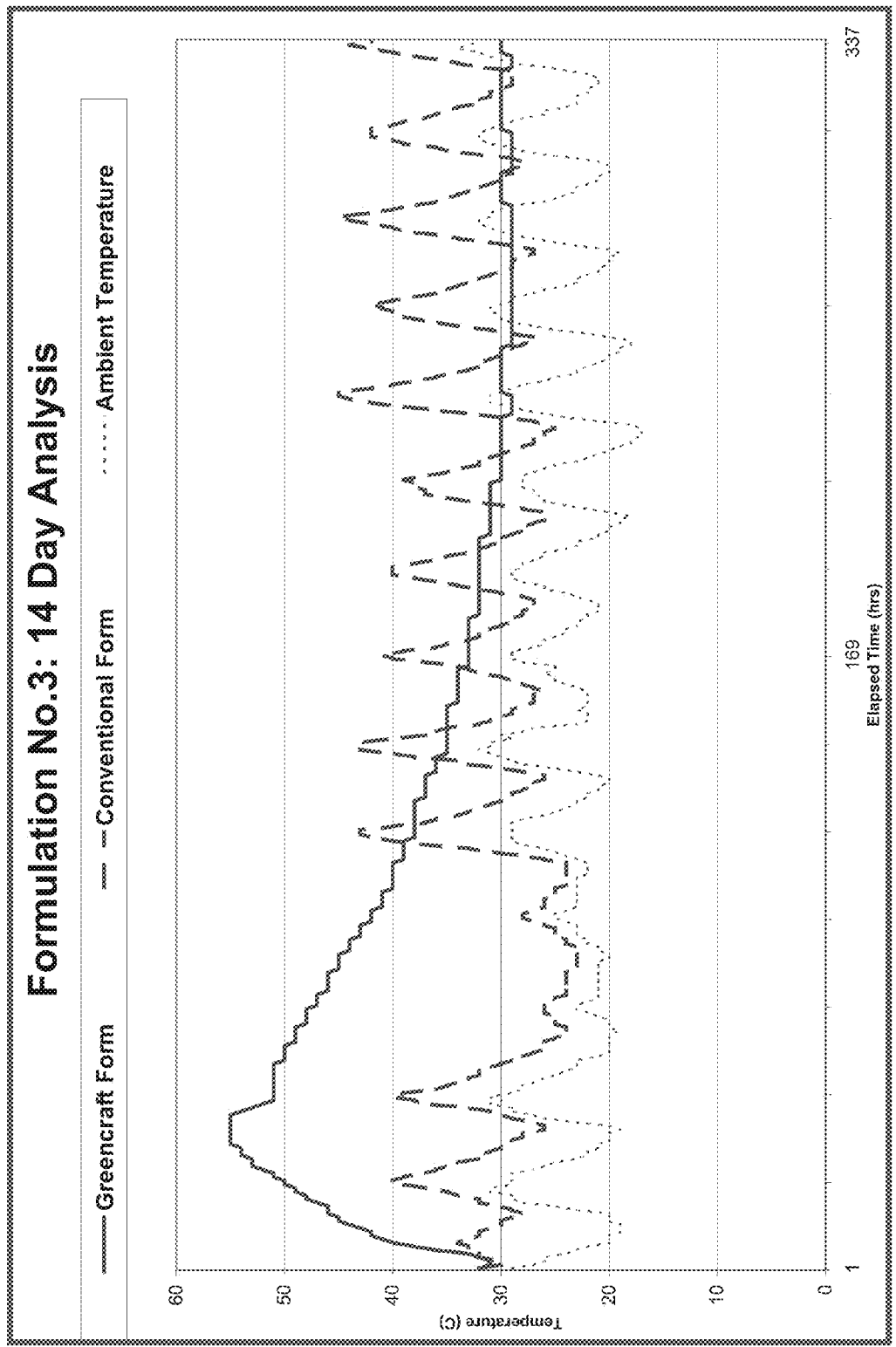
FIG. 21 is a graph of the internal concrete temperature of concrete having a cement mixture of approximately 220 lbs of portland cement (approximately 34% by weight), 215 lbs of slag cement (approximately 33% by weight) and 215 of lbs of fly ash (approximately 33% by weight) per cubic yard of concrete. The graph shows the internal temperature of this concrete in both a horizontal insulated concrete form (i.e., a Greencraft form) and a horizontal conventional form over a 14-day period. The ambient temperature is also shown.
Figure 24:
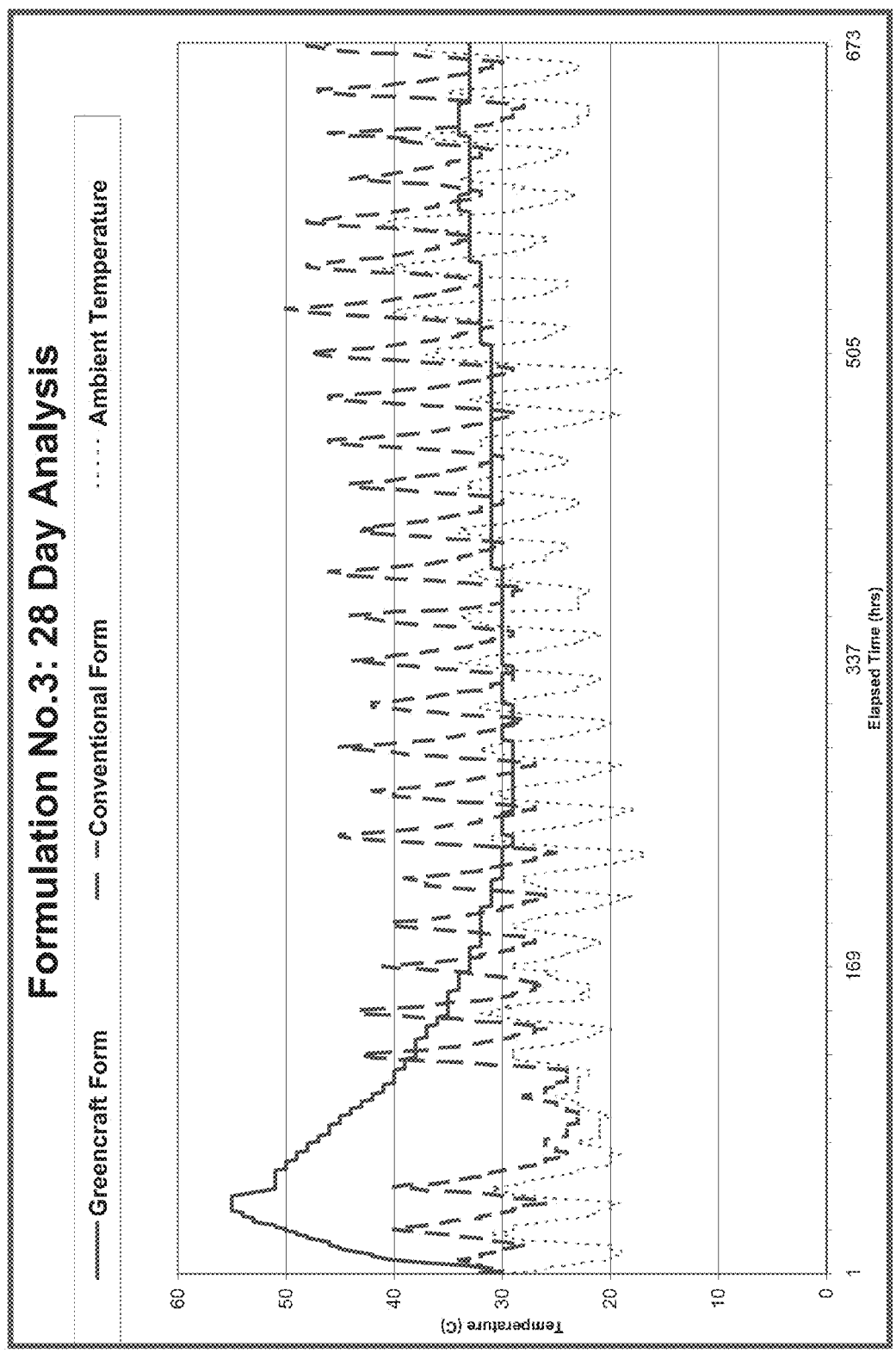
FIG. 24 is a graph of the internal concrete temperature of concrete having a cement mixture of approximately 220 lbs of portland cement (approximately 34% by weight), 215 lbs of slag cement (approximately 33% by weight) and 215 of lbs of fly ash (approximately 33% by weight) per cubic yard of concrete. The graph shows the internal temperature of this concrete in both a horizontal insulated concrete form (i.e., a Greencraft form) and a horizontal conventional form over a 28-day period. The ambient temperature is also shown.
Figure 27:
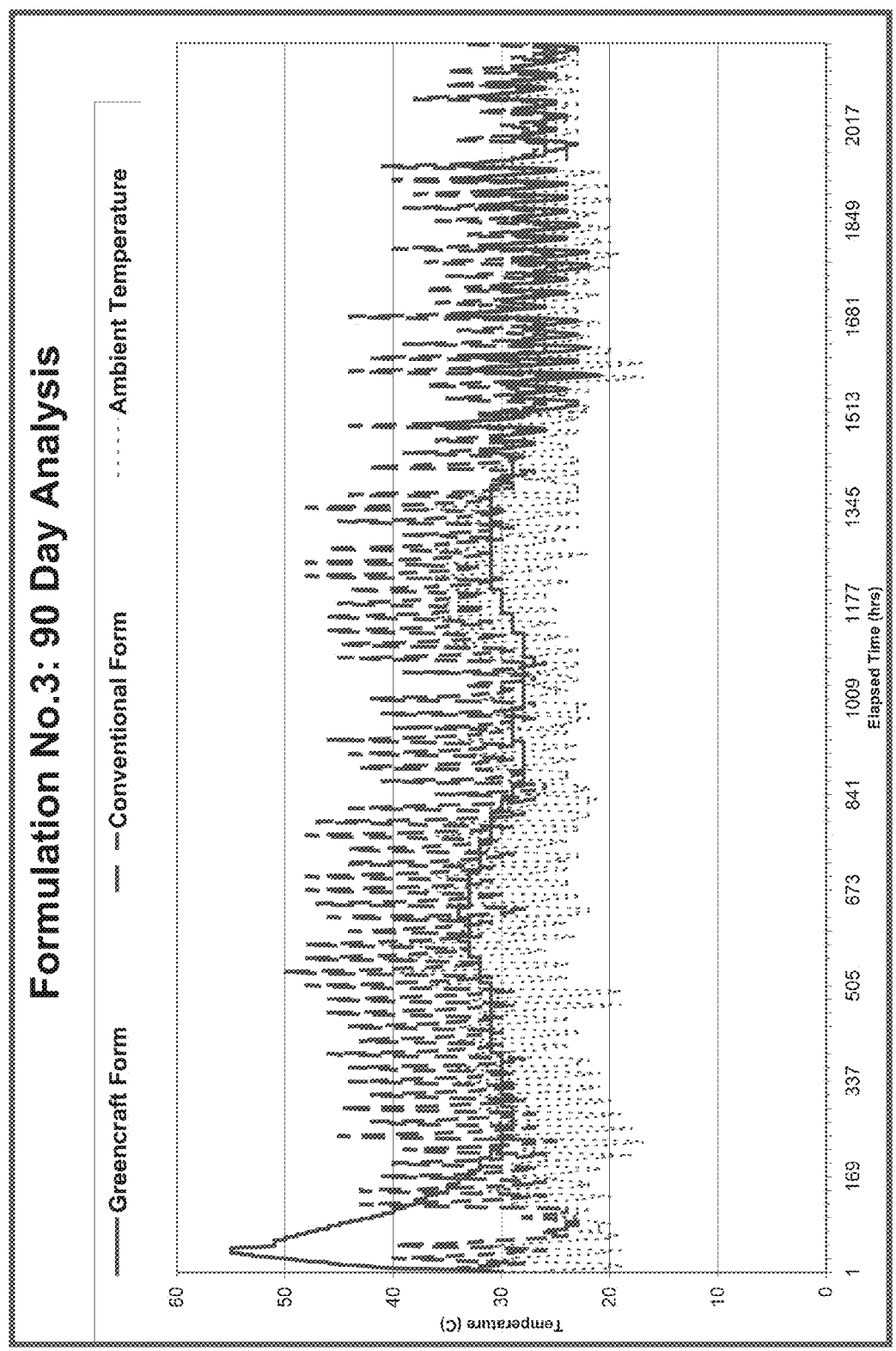
FIG. 27 is a graph of the internal concrete temperature of concrete having a cement mixture of approximately 220 lbs of portland cement (approximately 34% by weight), 215 lbs of slag cement (approximately 33% by weight) and 215 of lbs of fly ash (approximately 33% by weight) per cubic yard of concrete. The graph shows the internal temperature of this concrete in both a horizontal insulated concrete form (i.e., a Greencraft form) and a horizontal conventional form over a 90-day period. The ambient temperature is also shown.

FIGS. 21, 24 and 27 is a graph of the internal concrete temperature of concrete made with Formulation No. 3 in both a conventional horizontal concrete form and a horizontal insulated concrete form in accordance with the present invention. The ambient temperature is also shown on this graph.

As can be seen from FIGS. 21, 24 and 27, the concrete made with Formulation No. 3 within the conventional form reached a maximum temperature of approximately 35° C. relatively quickly and returned to approximately ambient temperature within approximately one day. The concrete in the conventional concrete form then fluctuated approximately 3 to 20° C. on a daily basis.

The concrete made with Formulation No. 3 within the insulated concrete form reached an internal temperature of 35° C. in about the same amount of time as the concrete in the conventional form. However, while the temperature of the concrete in the conventional form began to drop from its maximum temperature, the temperature of the concrete in the insulated concrete form continued to increase for a relatively long period of time (approximately 1.5 days) until it reached a maximum temperature of approximately 55° C. The internal temperature of the concrete in the insulated concrete form then slowly declined until it reached ambient temperature after approximately 10 days. For the remainder of the 90-day test period, the internal temperature of the concrete in the insulated concrete form fluctuated little.

Example 10

The concrete maturity for the six horizontal slabs identified above in Example 9 was measured by the Intellirock II™ maturity/temperature loggers. A summary of this test data is shown in Table 8 below.

TABLE 8

| ASTM C-42 Horizontal Forms Field Coring Conventional vs. Greencraft Forms Testing: Concrete Maturity (° C.-Hrs) | | | | | | | |
|---|---|---|---|---|---|---|---|
| | | Formulation No. 1 | | Formulation No. 2 | | Formulation No. 3 | |
| Actual Age | | Conventional Form | Insulated Greencraft | Conventional Form | Insulated Greencraft | Conventional Form | Insulated Greencraft |
| Age (days) | Age (hours) | Maturity ° C.-Hrs | Maturity ° C.-Hrs | Maturity ° C.-Hrs | Maturity ° C.-Hrs | Maturity ° C.-Hrs | Maturity ° C.-Hrs |
| 0.33 | 8 | 308 | 362 | 229 | 249 | 256 | 276 |
| 0.75 | 18 | 652 | 1001 | 516 | 674 | 558 | 720 |
| 1 | 24 | 886 | 1386 | 685 | 948 | 772 | 1012 |
| 2 | 48 | 1711 | 2774 | 1481 | 2044 | 1550 | 2293 |
| 3 | 72 | 2424 | 3959 | 2213 | 3036 | 2232 | 3484 |
| 7 | 168 | 5237 | 7650 | 5232 | 6406 | 5066 | 7226 |
| 14 | 336 | 10822 | 12625 | 10629 | 11395 | 10701 | 12297 |
| 28 | 672 | 22912 | 22919 | 22449 | 21752 | 22999 | 22969 |
| 56 | 1344 | 44396 | 43137 | 44655 | 41532 | 46295 | 42944 |
| 90 | 2160 | 67038 | 65879 | 68541 | 63373 | 71066 | 65303 |

The test data in Table 8 above shows greater concrete maturity for the concrete cured in the insulated concrete forms compared to the same concrete formulation cured in the conventional form. For example, at day 1 Formulation No. 1 in the conventional form had a maturity of 886° C.-Hrs; whereas, Formulation No. 1 in the insulated form had a maturity of 1386° C.-Hrs or 56% greater concrete maturity for the concrete in the insulated concrete form. At day 2 Formulation No. 1 in the conventional form had a maturity of 1711° C.-Hrs; whereas, Formulation No. 1 in the insulated form had a maturity of 2774° C.-Hrs or 62% greater concrete maturity for the concrete in the insulated concrete form. At day 3 Formulation No. 1 in the conventional form had a maturity of 2424° C.-Hrs; whereas, Formulation No. 1 in the insulated form had a maturity of 3959° C.-Hrs or 63% greater concrete maturity for the concrete in the insulated concrete form. Similarly, at day 7 Formulation No. 1 in the conventional form had a maturity of 5237° C.-Hrs; whereas, Formulation No. 1 in the insulated form had a maturity of 7650° C.-Hrs or 46% greater concrete maturity for the concrete in the insulated concrete form.

At day 2 Formulation No. 2 in the conventional form had a maturity of 1481° C.-Hrs; whereas, Formulation No. 2 in the insulated form had a maturity of 2044° C.-Hrs or 38% greater concrete maturity for the concrete in the insulated concrete form. For example, at day 3 Formulation No. 2 in the conventional form had a maturity of 2213° C.-Hrs; whereas, Formulation No. 2 in the insulated form had a maturity of 3036° C.-Hrs or 37% greater concrete maturity for the concrete in the insulated concrete form. Similarly, at day 7 Formulation No. 2 in the conventional form had a maturity of 5232° C.-Hrs; whereas, Formulation No. 2 in the insulated form had a maturity of 6404° C.-Hrs or 22% greater concrete maturity for the concrete in the insulated concrete form.

At day 2 Formulation No. 3 in the conventional form had a maturity of 1550° C.-Hrs; whereas, Formulation No. 3 in the insulated form had a maturity of 2293° C.-Hrs or 13% greater concrete maturity for the concrete in the insulated concrete form. For example, at day 3 Formulation No. 3 in the conventional form had a maturity of 2232° C.-Hrs; whereas, Formulation No. 3 in the insulated form had a maturity of 3484° C.-Hrs or 56% greater concrete maturity for the concrete in the insulated concrete form. Similarly, at day 7 Formulation No. 3 in the conventional form had a maturity of 5066° C.-Hrs; whereas, Formulation No. 3 in the insulated form had a maturity of 7226° C.-Hrs or 42% greater concrete maturity for the concrete in the insulated concrete form.

Example 11

In accordance with ASTM 42, cored samples of the concrete from each different form described above in Example 10 were cored and tested by an independent, accredited concrete testing laboratory for determining compressive strength according to ASTM C-39. The cored samples of the concrete were tested at 3 days, 7 days, 28 days and 90 days. A summary of this test data is shown below in Table 9 below.

TABLE 9

| Formulation No. | Horizontal Form Type | Compressive Strength (psi) | | | |
| --- | --- | --- | --- | --- | --- |
| | | 3 days | 7 days | 28 days | 90 days |
| 1 | Insulated | 4,080 | 4,700 | 4,530 | 5,640 |
|   | Conventional | 3,130 | 3,510 | 4,840 | 5,490 |
| 2 | Insulated | 2,220 | 2,830 | 3,670 | 4,860 |
|   | Conventional | 1,360 | 1,900 | 4,920 | 5,830 |
| 3 | Insulated | 3,020 | 3,780 | 4,390 | 4,860 |
|   | Conventional | 1,150 | 2,570 | 4,200 | 4,390 |

The test data in Table 9 above surprisingly and unexpectedly shows that the formulations in the insulated concrete forms achieved better strength, and particularly much better early concrete strength, than the same concrete in the conventional forms. Specifically, at day 3 Formulation No. 1 had 30% higher compressive strength in the insulated concrete form compared to Formulation No. 1 in the conventional concrete form. At day 3 Formulation No. 2 had 63% higher compressive strength in the insulated concrete form compared to Formulation No. 2 in the conventional concrete form. And, at day 3 Formulation No. 3 had 162% higher compressive strength in the insulated concrete form compared to Formulation No. 3 in the conventional concrete form.

At day 7 Formulation No. 1 had 34% higher compressive strength in the insulated concrete form compared to Formulation No. 1 in the conventional concrete form. At day 7 Formulation 2 had 49% higher compressive strength in the insulated concrete form compared to Formulation No. 2 in the conventional concrete form. And, at day 7 Formulation No. 3 had 47% higher compressive strength in the insulated concrete form compared to Formulation No. 3 in the conventional concrete form.

At day 28 the results for Formulation Nos. 1 and 2 appear to be an anomaly or incorrect. At day 28 Formulation No. 3 had 4.5% higher compressive strength in the insulated concrete form compared to Formulation No. 3 in the conventional concrete form.

At day 90 Formulation No. 1 had 2.7% higher compressive strength in the insulated concrete form compared to Formulation No. 1 in the conventional concrete form. At day 90 the results for Formulation No. 2 appear to be an anomaly or incorrect. And, at day 90 Formulation No. 3 had 10% higher compressive strength in the insulated concrete form compared to Formulation No. 3 in the conventional concrete form.

Although the foregoing examples illustrate that method of curing the concrete formulation disclosed above in an insulated concrete form, it is specifically contemplated that the foregoing concrete formulation can be cured in a precast concrete form or mold where additional heat is applied to the concrete, such as steam curing, or as disclosed in applicant's co-pending patent application entitled "Method for Electronic Temperature Controlled Curing of Concrete and Accelerating Concrete Maturity or Equivalent Age, Precast Concrete Structures and Objects and Apparatus for Same," Ser. No. 13/626,075, filed Sep. 25, 2012 (the disclosure of which is incorporated herein by reference in its entirety).

Example 12

It is worth noting that the testing/experiments of each concrete formulation from Examples 6, 7 and 8 were performed concurrently with the testing/experiments of Examples 9, 10 and 11. Therefore each different concrete formulation was cured in the same summer time ambient temperature for both the vertical forms and the horizontal forms. When comparing the temperature charts and maturity data for each concrete formulation from the vertical forms to the respective concrete formulation temperature and maturity data for each of the horizontal forms, an unexpected, non-obvious occurrence is taking place. The internal temperature and maturity of concrete for each corresponding concrete formulation is significantly greater for the vertical forms than for the horizontal forms. This is true not only for the non-insulated forms but also for the insulated forms. This is completely unexpected since the same amount of four inches of insulation on all sides was used to encapsulate the concrete in the vertical forms as for the horizontal insulated forms. This is further unexpected since the testing was performed during the elevated ambient temperatures of the summer months. The following data was taken from Tables 7 and 9 above.

At day 3 Formulation No. 1 in a vertical insulated form had a compressive strength of 4560 psi, while Formulation No. 1 in a horizontal insulated form had a compressive strength of 4080 psi, which is a 10% reduction in strength for the horizontal insulated form compared to the vertical insulated form. At day 7 Formulation No. 1 in a vertical insulated form had a compressive strength of 5460 psi, while Formulation No. 1 in horizontal insulated form had a compressive strength of 4700 psi, which is a 14% reduction in strength for the horizontal insulated form compared to the vertical insulated form. At day 28 Formulation No. 1 in a vertical insulated form had a compressive strength of 6310 psi, while Formulation No. 1 in a horizontal insulated form had a compressive strength of 4530 psi, which is a 28% reduction in strength for the horizontal insulated form compared to the vertical insulated form. At day 90 Formulation No. 1 in a vertical insulated form had a compressive strength of 6490 psi, while Formulation No. 1 in horizontal insulated form a compressive strength of 5490 psi, which is a 15% reduction in strength for the horizontal insulated form compared to the vertical insulated form.

At 3 day Formulation No. 1 in a vertical conventional form had a compressive strength of 3470 psi, while Formulation No. 1 in a horizontal conventional form had a compressive strength of 3130 psi, which is a 10% reduction in strength for the horizontal insulated form compared to the vertical insulated form. At day 7 Formulation No. 1 in a vertical conventional form had a compressive strength of 3970 psi, while Formulation No. 1 in horizontal conventional form had a compressive strength of 3510 psi, which is an 11% reduction in strength for the horizontal insulated form compared to the vertical insulated form. At day 28 Formulation No. 1 in a vertical conventional form had a compressive strength of 5430 psi, while Formulation No. 1 in a horizontal conventional form had a compressive strength of 4840 psi, which is an 11% reduction in strength for the horizontal insulated form compared to the vertical insulated form. At day 90 Formulation No. 1 in a vertical conventional form had a compressive strength of 6530 psi, while Formulation No. 1 in a horizontal conventional form had a compressive strength of 5490 psi, which is an 16% reduction in strength for the horizontal insulated form compared to the vertical insulated form.

At day 3 Formulation No. 2 in a vertical insulated form had a compressive strength of 2660 psi, while Formulation No. 2 in a horizontal insulated form had a compressive strength of 2220 psi, which is an 16% reduction in strength for the horizontal insulated form compared to the vertical insulated form. At day 7 Formulation No. 2 in a vertical insulated form had a compressive strength of 3700 psi, while Formulation No. 2 in a horizontal insulated form had a compressive strength of 2830 psi, which is an 16% reduction in strength for the horizontal insulated form compared to the vertical insulated form. At day 28 Formulation No. 2 in a vertical insulated form had a compressive strength of 5080 psi, while Formulation No. 2 in a horizontal insulated form had a compressive strength of 3670 psi, which is an 28% reduction in strength for the horizontal insulated form compared to the vertical insulated form. At day 90 Formulation No. 2 in a vertical insulated form had a compressive strength of 5510 psi, while Formulation No. 2 in horizontal insulated form had a compressive strength of 4860 psi, which is an 16% reduction in strength for the horizontal insulated form compared to the vertical insulated form.

At day 3 Formulation No. 3 in a vertical insulated form had a compressive strength of 4530 psi, while Formulation No. 3 in horizontal insulated form had a compressive strength of 3020 psi, which is a 33% reduction in strength for the horizontal insulated form compared to the vertical insulated form. At day 7 Formulation No. 3 in vertical insulated form had a compressive strength of 5380 psi, while Formulation No. 3 in a horizontal insulated form had a compressive strength of 3780 psi, which is an 30% reduction in strength for the horizontal insulated form compared to the vertical insulated form.

At day 28 Formulation No. 3 in a vertical insulated form had a compressive strength of 6100 psi, while Formulation No. 3 in a horizontal insulated form had a compressive strength of 4390 psi, which is an 28% reduction in strength for the horizontal insulated form compared to the vertical insulated form. At day 90 Formulation No. 3 in vertical insulated form had a compressive strength of 6490 psi, while Formulation No. 3 in a horizontal insulated form had a compressive strength of 4860 psi, which is an 25% reduction in strength for the horizontal insulated form compared to the vertical insulated form.

At 3 day Formulation No. 3 in a vertical conventional form had a compressive strength of 1290 psi, while Formulation No. 3 in a horizontal conventional form had a compressive strength of 1150 psi, which is an 10% reduction in strength for the horizontal insulated form compared to the vertical insulated form. At day 7 Formulation No. 3 in a vertical conventional form had a compressive strength of 2440 psi, while Formulation No. 3 in a horizontal conventional form was 2570 psi, which is an 5% increase in strength for the horizontal insulated form compared to the vertical insulated form. At day 28 Formulation No. 3 in a vertical conventional form had a compressive strength of 5520 psi, while Formulation No. 3 in a horizontal conventional form had a compressive strength of 4200 psi, which is an 24% reduction in strength for the horizontal insulated form compared to the vertical insulated form. At day 90 Formulation No. 1 in a vertical conventional form had a compressive strength of 5440 psi, while Formulation No. 3 in a horizontal conventional form had a compressive strength of 4390 psi, which is an 19% reduction in strength for the horizontal insulated form compared to the vertical insulated form.

This internal temperature and concrete maturity difference points to the fact that the ground acts as a heat sink, removing heat from objects that are in contact with it. Therefore, in the case of the slabs on grade, or any object cast on the ground or on a concrete slab that is on the ground, such as precast tilt-up concrete panels cast on a building slab, the heat of hydration is lost even faster from the concrete compared to the loss of the heat of hydration from concrete placed in elevated or vertical forms surrounded by air at ambient temperatures. The ground has an infinite thermal mass and, especially during the summer, will usually be colder than the air and especially colder than the internal temperature of concrete cast on it. This lower temperature of the ground, coupled with the infinite thermal mass of the Earth, absorbs the heat of hydration from any concrete cast on the ground at a much faster rate even though the four inches of expanded polystyrene foam insulation were used for the Greencraft forms used in these tests. The heat loss of the concrete for any objects cast on the ground to the ground is regardless of the ambient temperature, but is even more dramatic during the spring or fall seasons and especially during the cold winter months than during the hot summer days. Therefore the use of these concrete formulations, for any slab cast on the ground or for any panel, such as precast tilt-up panels, cast on a slab on grade, are completely impossible since the concrete may never achieve the necessary strength for loads to be placed upon it. Therefore the method of curing concrete for slabs on grade, or panels cast on concrete slabs, such as precast tilt-up concrete panels, and the like, by using insulation at the bottom of the concrete and temporarily insulating the top of the concrete is the only effective way to make use of these types of concrete formulation.

Example 13

A comparison of the concrete maturity, or equivalent age, data from the actual cored test for the vertical forms shown in Tables 2, 6 and 8 above and the C-39 laboratory cylinder test data shown in Table 5 at Day 3 is summarized in Tables 10-12 below.

TABLE 10

Concrete Maturity (° C.-Hrs) at Day 3: Vertical Forms vs. Laboratory Test Cylinders

| Day 3 | Formulation No. 1 | | Formulation No. 2 | | Formulation No. 3 | |
|---|---|---|---|---|---|---|
| | Conventional Form Maturity ° C.-Hrs | Insulated Greencraft Maturity ° C.-Hrs | Conventional Form Maturity ° C.-Hrs | Insulated Greencraft Maturity ° C.-Hrs | Conventional Form Maturity ° C.-Hrs | Insulated Greencraft Maturity ° C.-Hrs |
| Table 2 | 1340 | 3683 | 1600 | 3071 | 1299 | 2535 |
| Table 5 | 1523 | | 1615 | | 1474 | |
| % Difference | −12% | 141% | −1% | 90% | −12% | 71% |

This data clearly shows that the three concrete formulations in the vertical insulated concrete forms all had improved maturity ranging from 71% to 141% compared to the three concrete formulations in the cylinders cured according to ASTM C-39. Conversely, all three formulations cured in the vertical non-insulated forms (i.e., Greencraft forms) had poorer maturity ranging from −1% to −12% compared to the same three formulations cured in the laboratory cylinders in accordance with ASTM C-39.

This data clearly shows that the three concrete formulations in the horizontal insulated concrete forms all had improved maturity ranging from 88% to 160% compared to the three concrete formulations in the cylinders cured according to ASTM C-39. Conversely, all three formulations cured in the horizontal non-insulated forms (i.e., Greencraft forms) had improved maturity ranging from only 37% to 59% compared to the same three formulations cured in the laboratory cylinders in accordance with ASTM C-39.

TABLE 11

Concrete Maturity (° C.-Hrs) at Day 3: Vertical Forms vs. Laboratory Test Cylinders

| Day 3 | Formulation No. 1 | | Formulation No. 2 | | Formulation No. 3 | |
|---|---|---|---|---|---|---|
| | Conventional Form Maturity ° C.-Hrs | Insulated Greencraft Maturity ° C.-Hrs | Conventional Form Maturity ° C.-Hrs | Insulated Greencraft Maturity ° C.-Hrs | Conventional Form Maturity ° C.-Hrs | Insulated Greencraft Maturity ° C.-Hrs |
| Table 6 | 2540 | 4434 | 2238 | 3325 | 2216 | 3640 |
| Table 5 | 1523 | | 1615 | | 1474 | |
| % Difference | 68% | 191% | 38% | 105% | 50% | 147% |

This data clearly shows that the three concrete formulations in the vertical insulated concrete forms all had improved maturity ranging from 105% to 191% compared to the three concrete formulations in the cylinders cured according to ASTM C-39. Conversely, all three formulations cured in the vertical non-insulated forms (i.e., Greencraft forms) had improved maturity ranging from only 38% to 68% compared to the same three formulations cured in the laboratory cylinders in accordance with ASTM C-39.

Tables 2, 6 and 8 above and the C-39 laboratory cylinder test data shown in Table 5 at Day 3 is summarized in Tables 10-12 below.

A comparison of the concrete maturity, or equivalent age, data from the actual cored test for the vertical forms shown in Tables 2, 6 and 8 above and the C-39 laboratory cylinder test data shown in Table 5 at Day 7 is summarized in Tables 13-15 below.

TABLE 12

Concrete Maturity (° C.-Hrs) at Day 3: Horizontal Forms vs. Laboratory Test Cylinders

| Day 3 | Formulation No. 1 | | Formulation No. 2 | | Formulation No. 3 | |
|---|---|---|---|---|---|---|
| | Conventional Form Maturity ° C.-Hrs | Insulated Greencraft Maturity ° C.-Hrs | Conventional Form Maturity ° C.-Hrs | Insulated Greencraft Maturity ° C.-Hrs | Conventional Form Maturity ° C.-Hrs | Insulated Greencraft Maturity ° C.-Hrs |
| Table 8 | 2424 | 3959 | 2213 | 3036 | 2232 | 3484 |
| Table 5 | 1523 | | 1615 | | 1474 | |
| % Difference | 59% | 160% | 37% | 88% | 51% | 136% |

TABLE 13

Concrete Maturity (° C.-Hrs) at Day 7: Vertical Forms vs. Laboratory Test Cylinders

| Day 7 | Formulation No. 1 | | Formulation No. 2 | | Formulation No. 3 | |
|---|---|---|---|---|---|---|
| | Conventional Form Maturity ° C.-Hrs | Insulated Greencraft Maturity ° C.-Hrs | Conventional Form Maturity ° C.-Hrs | Insulated Greencraft Maturity ° C.-Hrs | Conventional Form Maturity ° C.-Hrs | Insulated Greencraft Maturity ° C.-Hrs |
| Table 2 | 3524 | 7589 | 3511 | 6705 | 3391 | 5441 |
| Table 5 | 3263 | | 3570 | | 3220 | |
| % Difference | 8% | 132% | −1% | 87% | 5% | 69% |

This data clearly shows that the three concrete formulations in the vertical insulated concrete forms all had improved maturity ranging from 69% to 132% compared to the three concrete formulations in the cylinders cured according to ASTM C-39. Conversely, all three formulations cured in the vertical non-insulated forms (i.e., Greencraft forms) had poorer/improved maturity ranging from only −1% to 8% compared to the same three formulations cured in the laboratory cylinders in accordance with ASTM C-39.

TABLE 14

Concrete Maturity (° C.-Hrs) at Day 7: Vertical Forms vs. Laboratory Test Cylinders

| Day 7 | Formulation No. 1 | | Formulation No. 2 | | Formulation No. 3 | |
|---|---|---|---|---|---|---|
| | Conventional Form Maturity ° C.-Hrs | Insulated Greencraft Maturity ° C.-Hrs | Conventional Form Maturity ° C.-Hrs | Insulated Greencraft Maturity ° C.-Hrs | Conventional Form Maturity ° C.-Hrs | Insulated Greencraft Maturity ° C.-Hrs |
| Table 6 | 4909 | 9133 | 4702 | 7334 | 4639 | 7779 |
| Table 5 | 3263 | | 3570 | | 3220 | |
| % Difference | 50% | 180% | 32% | 105% | 44% | 141% |

This data clearly shows that the three concrete formulations in the vertical insulated concrete forms all had improved maturity ranging from 105% to 180% compared to the three concrete formulations in the cylinders cured according to ASTM C-39. Conversely, all three formulations cured in the vertical non-insulated forms (i.e., Greencraft forms) had improved maturity ranging from only 32% to 50% compared to the same three formulations cured in the laboratory cylinders in accordance with ASTM C-39.

TABLE 15

Concrete Maturity (° C.-Hrs) at Day 7: Horizontal Forms vs. Laboratory Test Cylinders

| Day 7 | Formulation No. 1 | | Formulation No. 2 | | Formulation No. 3 | |
|---|---|---|---|---|---|---|
| | Conventional Form Maturity ° C.-Hrs | Insulated Greencraft Maturity ° C.-Hrs | Conventional Form Maturity ° C.-Hrs | Insulated Greencraft Maturity ° C.-Hrs | Conventional Form Maturity ° C.-Hrs | Insulated Greencraft Maturity ° C.-Hrs |
| Table 8 | 5237 | 7650 | 5232 | 6406 | 5066 | 7226 |
| Table 5 | 3263 | | 3570 | | 3220 | |
| % Difference | 60% | 134% | 46% | 79% | 57% | 124% |

This data clearly shows that the three concrete formulations in the horizontal insulated concrete forms all had improved maturity ranging from 79% to 134% compared to the three concrete formulations in the cylinders cured according to ASTM C-39. Conversely, all three formulations cured in the horizontal non-insulated forms (i.e., Greencraft forms) had improved maturity ranging from only 46% to 60% compared to the same three formulations cured in the laboratory cylinders in accordance with ASTM C-39.

Although the slab on grade insulated concrete form disclosed above, can use the concrete formulations disclosed above, it is specifically contemplated that other horizontal insulated concrete forms, such as used for slab on grade, precast panels or objects or tilt-up panels, can use conventional concrete; i.e., concrete where portland cement comprises all, or at least 80% by weight of the cement, can be used with the concrete curing method of the present invention. That is, any concrete formulation, including conventional portland cement concrete, can be cured in a horizontal insulated concrete form or in a concrete mold that is insulated on all sides to the same extent as described herein, and as disclosed in applicant's co-pending patent application entitled "Concrete Runways, Roads, Highways and Slabs on Grade and Methods of Making Same," Ser. No. 13/626,540, filed Sep. 25, 2012 and applicant's co-pending patent application entitled "Precast Concrete Structures, Precast Tilt-Up Concrete Structures and Methods of Making Same," Ser. No. 13/247,256 filed Sep. 28, 2011 (the disclosures of which are both incorporated herein by reference in their entirety).

All foregoing references to prior printed publications, published patent applications and issued patents are incorporated herein by reference in their entirety.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method of making cementitious-based material having a compressive strength greater than about 1,000 psi, the method comprising:
   placing a plastic cementitious-based material in an insulated concrete form or mold wherein the insulated concrete form or mold has an R-value of at least 1.5 whereby at least a portion of the initial heat of hydration of the cementitious-based material is retained in the insulated concrete form or mold;
   wherein the cementitious-based material comprises:
      aggregate;
      cementitious material, wherein the cementitious material consists essentially of approximately 30% to approximately 80% by weight portland cement, approximately 0% to approximately 50% by weight slag cement, and 20% to approximately 50% by weight fly ash; and
      water sufficient to hydrate the cementitious-based material.

2. The method of claim 1 further comprising allowing the cementitious-based material to at least partially cure in the insulated concrete form.

3. The method of claim 1, wherein the cementitious-based material comprises approximately one-third by weight portland cement, approximately one-third by weight slag cement and approximately one-third by weight fly ash.

4. The method of claim 1, wherein the insulated concrete form has an R-value of at least 4.

5. The method of claim 4, wherein the weight ratio of portland cement to slag cement to fly ash is approximately 1 to 1 to 1.

6. The method of claim 4, wherein the weight ratio of portland cement to slag cement to fly ash is approximately 0.85-1.15:0.85-1.15:0.85-1.15.

7. The method of claim 4, wherein the weight ratio of portland cement to slag cement to fly ash is approximately 0.9-1.1:0.9-1.1:0.9-1.1.

8. The method of claim 4, wherein the weight ratio of portland cement to slag cement to fly ash is approximately 0.95-1.05:0.95-1.05:0.95-1.05.

9. The method of claim 1, wherein the insulated concrete form has an R-value of at least 8.

10. The method of claim 1, wherein the weight ratio of portland cement to slag cement to fly ash is approximately 1 to 1 to 1.

11. The method of claim 1, wherein the weight ratio of portland cement to slag cement to fly ash is approximately 0.85-1.15:0.85-1.15:0.85-1.15.

12. The method of claim 1, wherein the weight ratio of portland cement to slag cement to fly ash is approximately 0.9-1.1:0.9-1.1:0.9-1.1.

13. The method of claim 1, wherein the weight ratio of portland cement to slag cement to fly ash is approximately 0.95-1.05:0.95-1.05:0.95-1.05.

14. The method of claim 1, wherein the insulated concrete form or mold comprises a pair of rectangular vertically oriented insulating layers horizontally spaced from each other.

15. The method of claim 1, wherein the insulated concrete form or mold comprises a pair of rectangular horizontally oriented insulating layers vertically spaced from each other.

16. The method of claim 1, wherein the insulated concrete form or mold comprises a first portion comprising an insulating layer and a second portion comprising an insulated blanket.

17. The method of claim 1, wherein the insulated concrete form or mold comprises a first portion comprising an insulating foam panel and a second portion comprising an electrically heated blanket.

18. The method of claim 1, wherein the insulated concrete form or mold comprises a conventional concrete form having insulating material on a side opposite a concrete contacting portion.

19. The method of claim 1, wherein the cementitious-based material consists essentially of:
   approximately 30% to approximately 70% by weight portland cement, approximately 0% to approximately 50% by weight slag cement, and 20% to approximately 50% by weight fly ash.

20. The method of claim 1, wherein the cementitious-based material consists essentially of:
   approximately 30% to approximately 60% by weight portland cement, approximately 0% to approximately 50% by weight slag cement, and 20% to approximately 50% by weight fly ash.

21. The method of claim 1, wherein the cementitious-based material consists essentially of:
   approximately 30% to approximately 50% by weight portland cement, approximately 0% to approximately 50% by weight slag cement, and 20% to approximately 50% by weight fly ash.

22. A method of making a cementitious-based object or structure having a compressive strength greater than about 1,000 psi, the method comprising:
   placing a plastic cementitious-based material in an insulated concrete form, wherein the insulated concrete form has an R-value of at least 1.5 whereby at least a portion of the initial heat of hydration of the cementitious-based material is retained in the insulated concrete form or mold;
   wherein the cement-based material comprises:
      aggregate;
      cementitious material, wherein the cementitious material consists essentially of approximately 30% to approximately 80% by weight portland cement, and the approximately 5% by weight to approximately 50% by weight slag cement and 0% to approximately 50% by weight fly ash; and
      water sufficient to hydrate the cementitious material.

23. The method of claim 22, wherein the cementitious-based material consists essentially of:
   approximately 30% to approximately 70% by weight portland cement, approximately 5% to approximately 50% by weight slag cement, and 0% to approximately 50% by weight fly ash.

24. The method of claim 22, wherein the cementitious-based material consists essentially of:
   approximately 30% to approximately 60% by weight portland cement, approximately 5% to approximately 50% by weight slag cement, and 0% to approximately 50% by weight fly ash.

25. The method of claim 22, wherein the cementitious-based material consists essentially of:

approximately 30% to approximately 50% by weight portland cement, approximately 5% to approximately 50% by weight slag cement, and 0% to approximately 50% by weight fly ash.

26. The method of claim 22, wherein the insulated concrete form has an R-value of at least 4.

27. The method of claim 26, wherein the cementitious-based material consists essentially of:
approximately 30% to approximately 70% by weight portland cement, approximately 0% to approximately 50% by weight slag cement, and 20% to approximately 50% by weight fly ash.

28. The method of claim 26, wherein the cementitious-based material consists essentially of:
approximately 30% to approximately 60% by weight portland cement, approximately 0% to approximately 50% by weight slag cement, and 20% to approximately 50% by weight fly ash.

29. The method of claim 26, wherein the cementitious-based material consists essentially of:
approximately 30% to approximately 50% by weight portland cement, approximately 0% to approximately 50% by weight slag cement, and 20% to approximately 50% by weight fly ash.

30. The method of claim 22, wherein the insulated concrete form has an R-value of at least 8.

\* \* \* \* \*